US011425762B2

United States Patent
Li et al.

(10) Patent No.: US 11,425,762 B2
(45) Date of Patent: Aug. 23, 2022

(54) SMALL DATA TRANSFER, DATA BUFFERING, AND DATA MANAGEMENT AS A SERVICE IN A COMMUNICATIONS NETWORK

(71) Applicant: IPLA HOLDINGS INC., New York, NY (US)

(72) Inventors: Hongkun Li, Malvern, PA (US); Michael F. Starsinic, Newtown, PA (US); Rocco Di Girolamo, Laval (CA); Mahmoud Watfa, Quebec (CA); Catalina Mihaela Mladin, Hatboro, PA (US); Dale N. Seed, Allentown, PA (US); Chonggang Wang, Princeton, NJ (US); Quang Ly, North Wales, PA (US)

(73) Assignee: IPLA HOLDINGS INC., New York, NY (US)

( * ) Notice: Subject to any disclaimer, the term of this patent is extended or adjusted under 35 U.S.C. 154(b) by 44 days.

(21) Appl. No.: 16/622,477

(22) PCT Filed: Jun. 15, 2018

(86) PCT No.: PCT/US2018/037756
§ 371 (c)(1),
(2) Date: Dec. 13, 2019

(87) PCT Pub. No.: WO2018/232241
PCT Pub. Date: Dec. 20, 2018

(65) Prior Publication Data
US 2020/0146077 A1    May 7, 2020

Related U.S. Application Data

(60) Provisional application No. 62/570,332, filed on Oct. 10, 2017, provisional application No. 62/520,896, filed on Jun. 16, 2017.

(51) Int. Cl.
*H04W 76/10*   (2018.01)
*H04W 88/18*   (2009.01)

(52) U.S. Cl.
CPC ............ *H04W 76/10* (2018.02); *H04W 88/18* (2013.01)

(58) Field of Classification Search
CPC ..... H04W 76/10; H04W 88/18; H04W 76/11; H04W 40/02
See application file for complete search history.

(56) References Cited

U.S. PATENT DOCUMENTS 9,692,567 B1   6/2017 Vaidya et al.
2010/0046410 A1   2/2010 So et al.
(Continued)

FOREIGN PATENT DOCUMENTS

EP          2768251 A1     8/2014
WO    WO-2018059401 A  *  4/2018  ............ H04W 36/00

OTHER PUBLICATIONS

3rd Generation Partnership Project; (3GPP), TR 23.799 VI.0.2, "3rd Generation Partnership Project; Technical Specification Group Services and System Aspects; Study on Architecture for Next Generation System (Release 14)", Sep. 30, 2016, pp. 1-423.
(Continued)

*Primary Examiner* — Michael K Phillips
(74) *Attorney, Agent, or Firm* — Chip Law Group

(57) ABSTRACT

A 5G non-IP data delivery (NIDD) architecture is described including different options of data paths for non-IP data delivery through a 5G core network. A registration procedure is provided with new parameters for enabling the NIDD. Also, mechanisms are described for establishing a PDU session between a UE and SCS/AS for non-IP delivery. For example, the PDU session may pass through an AMF, SMF, and User Plane Function (UPF)/NEF. Additionally, (Continued)

methods of Mobile Originated (MO) and Mobile Terminated (MT) non-IP data transfer are described. Data buffering methods are also disclosed.

14 Claims, 33 Drawing Sheets

(56) References Cited

U.S. PATENT DOCUMENTS

| | | | | |
|---|---|---|---|---|
| 2017/0374694 | A1* | 12/2017 | Kotecha | H04W 4/70 |
| 2018/0042057 | A1* | 2/2018 | Johansson | H04W 76/10 |
| 2018/0192471 | A1* | 7/2018 | Li | H04W 36/14 |
| 2018/0220478 | A1* | 8/2018 | Zhu | H04L 45/306 |
| 2018/0227743 | A1* | 8/2018 | Faccin | H04W 8/08 |
| 2018/0279115 | A1* | 9/2018 | Tanna | H04W 8/22 |
| 2018/0324060 | A1* | 11/2018 | Chaponniere | H04W 80/02 |
| 2018/0324652 | A1* | 11/2018 | Ryu | H04W 8/08 |
| 2019/0028337 | A1* | 1/2019 | Ryu | H04W 4/70 |
| 2019/0159072 | A1* | 5/2019 | Zhu | H04W 28/0263 |
| 2019/0174573 | A1* | 6/2019 | Velev | H04W 76/12 |
| 2019/0364420 | A1* | 11/2019 | Rommer | H04L 63/08 |

OTHER PUBLICATIONS

3rd Generation Partnership Project; (3GPP), TS 23.682 V15.1.0,, "3rd Generation Partnership Project; Technical Specification Group Services and System Aspects; Architecture enhancements to facilitate communications with packet data networks and applications (Release 15)",Mobile Competence Centre, 650, Route Des Lucioles, F-06921, Jun. 12, 2017, pp. 1-118.

Convida Wireless et al., "SCEF Behavior in the Mobile Originated NIDO Procedure", 3GPP DRAFT; S2-171399 REV 1388 and 0942 MO NIDD, 3rd Generation Partnership Project, Mobile Competence Centre; 650, Route Des Lucioles Sophia-Antipolis Cedex; France, vol. SA WG2, No. Dubrovnik, Croatia, Feb. 18, 2017, Feb. 13, 2017-Feb. 17, 2017.

Convida Wireless: "Clarification of MTC-IWF and SCEF connection possibilities", 3GPP DRAFT; S2-164532, 3rd Generation Partnership Project (3GPP), Mobile Competence Centre; 650, Route Des Lucioles ; F-06921 Sophia-Antipolis Cedex ; France vol. SA WG2, No. Sanya, P R. China; Aug. 27, 2016 Aug. 29, 2016-Sep. 2, 2016.

* cited by examiner

SMALL DATA TRANSFER, DATA BUFFERING, AND DATA MANAGEMENT AS A SERVICE IN A COMMUNICATIONS NETWORK

CROSS-REFERENCE TO RELATED APPLICATIONS

This application is the National Stage Application of International Patent Application No. PCT/US2018/037756, filed Jun. 15, 2018, which claims the benefit of U.S. Provisional Patent Application No. 62/520,896, filed Jun. 16, 2017 and U.S. Provisional Patent Application No. 62/570,332, filed Oct. 10, 2017, the disclosures of which are hereby incorporated by reference in their entireties.

BACKGROUND

When a UE registers with a mobile core network, the UE may provide Network Slice Selection Assistance Information (NSSAI) to indicate to the network what services the UE would like to obtain. The NSSAI may be a collection of S-NSSAIs (Single Network Slice Selection Assistance Information). An S-NSSAI may be comprised of a Slice/Service Type (SST) and a Slice Differentiator (SD). An SST may refer to the expected Network Slice behaviour with regard to terms of features and services, and an SD may be optional information that complements the SST(s) to differentiate amongst multiple Network Slices of the same SST. Standardized SST values may include eMBB, URLLC, and MIoT, as defined by 3GPP. SD values are not currently standardized.

A UE may have Protocol Data Unit (PDU) sessions with a slice. Such PDU sessions may be used to send data to/from application servers. A PDU session may be a user plane PDU session where data is signaled directly between a UE and a UPF, or a PDU session may be a control plane PDU session where data is signaled between the UE and an NF, such as the AMF, and then forwarded by the AMF towards its destination. When a PDU session is requested by a UE, the UE may indicate what slice the PDU session is associated with by providing an S-NSSAI in the request.

The term (S)Gi-LAN may refer to a packet data network between a GGSN or P-GW of a Mobile Core network and the Internet. The (S)Gi-LAN may be under control of the Mobile Network Operator (MNO) hosting the Mobile Core network. When uplink data packets leave the (S)Gi-LAN, the packets may no longer be under control of the MNO and may be generally considered to have gone to the public internet. This is shown in FIG. 1.

A (S)Gi-LAN may include Value Added Services (VAS). Examples of VAS may include NATs, Firewalls, Video Compression, Data Compression, load balancers, HTTP Header Enrichment functions, TCP optimizers, etc. Generally, Deep Packet Inspection (DPI) techniques may determine if each VAS should operate on a data flow. Traffic may be routed to/from an (S)Gi-LAN and Servers in the public Internet, such as an M2M Server. Moreover, the M2M server may be deployed inside the (S)Gi-LAN by an operator or service provider to provision a set of value added services for M2M/IoT use cases.

Network Slicing is a mechanism that may be used by a mobile network operator to support multiple 'virtual' networks behind an air interface across the fixed part of the mobile operator's network, both backhaul and core network. Network Slicing involves 'slicing' the network into multiple virtual networks to support different RANs or different service types running across a single RAN. Network slicing enables the mobile network operator to create networks customized to provide optimized solutions for different market scenarios that demand diverse requirements, e.g., in the areas of functionality, performance and isolation. FIG. 2 illustrates a conceptual architecture of network slicing. A network slice instance may be comprised of a set of network functions and the resources to run such network functions. In FIG. 2, separate boxes are used to indicate different network slice instances. A sub-network slice instance may comprise a set of network functions and resources to run those network functions, but may not in itself be a complete logical network. A sub-network slice instance may be shared by multiple network slice instances, as shown by the sub-network instance shared between Network Slice Instance 3 and Network Slice Instance 4 of FIG. 2.

3GPP is currently designing a 5G network and is considering to incorporate network slicing technology into the network. Such technology is a good fit for the 5G network because 5G use cases (e.g., massive IoT, critical communications, and enhanced mobile broadband) demand very diverse and sometimes extreme requirements. The existing pre-5G architecture utilizes a relatively monolithic network and transport framework to accommodate a variety of services, such as mobile traffic from smart phones, OTT content, feature phones, data cards, and embedded M2M devices. The current architecture may not be flexible and scalable enough to efficiently support a wider range of business needs when each service has its own specific set of performance, scalability and availability requirements. Furthermore, introduction of new network services should be made more efficient. Nevertheless, several use cases are anticipated to be active concurrently in the same operator network, thus requiring a high degree of flexibility and scalability of the 5G network.

Network slicing may enable an operator to create networks customized to provide optimized solutions for different market scenarios that demand diverse requirements, e.g., in the areas of functionality, performance and isolation. However, there are various challenges to overcome to support network slicing in the future 5G network. For example, the following challenges exist to support networking slicing: How to achieve isolation/separation between network slice instances, and which levels and types of isolation/separation will be required; How and what type of resource and network function sharing may be used between network slice instances; How to enable a UE to simultaneously obtain services from one or more specific network slice instances of one operator; What is within 3GPP scope with regards to Network Slicing (e.g., network slice creation/composition, modification, deletion); Which network functions may be included in a specific network slice instance, and which network functions are independent of network slices; The procedure(s) for selection of a particular Network Slice for a UE; How to support Network Slicing Roaming scenarios; and How to enable operators to use the network slicing concept to efficiently support multiple 3rd parties (e.g., enterprises, service providers, content providers, etc.) that require similar network characteristics.

FIG. 3 depicts an example non-roaming reference architecture with service-based interfaces within the Control Plane.

FIG. 4 depicts an example 5G System architecture in the non-roaming case, using a reference point representation illustrating how various network functions interact with each other. It should be appreciated that the mobility management and session management functions are separated. A single N1 NAS connection may be used for both Registration Management and Connection Management (RM/CM) and for SM-related messages and procedures for a UE. A single N1 termination point is located in AMF. The AMF may forward SM related NAS information to the SMF. The AMF may handle the Registration Management and Connection Management part of NAS signaling exchanged with the UE. The SMF may handle the Session management part of NAS signaling exchanged with the UE. User plane data may traditionally flow between the UE and UPF via the N3 interface. Control plane data between the UE and core network may flow between the UE and AMF via the N1 interface.

Connection management comprises the functions of establishing and releasing a signaling connection between a UE and the AMF over N1. This signaling connection is used to enable NAS signaling exchange between the UE and the core network. It comprises both the AN signaling connection between the UE and the Access Network (AN) (e.g. Radio Resource Control (RRC) connection over 3GPP access) and the N2 connection for this UE between the AN and the AMF. Two CM states are defined that reflect the NAS signaling connectivity of the UE with the AMF: CM-IDLE and CM-CONNECTED.

A Service Request procedure may be used by a 5G UE in CM IDLE state to request the establishment of a secure connection to an AMF. The UE in CM IDLE state initiates the Service Request procedure in order to send uplink signaling messages, user data, or response to a network paging request. After receiving the Service Request message, the AMF may perform authentication, and shall perform the security procedure. After the establishment of a secure signaling connection to an AMF, the UE or network may send signaling messages, e.g. packet data unit (PDU) session establishment from UE to the network, or the SMF, via the AMF, may start the user plane resource establishment for the PDU sessions. The Service Request procedure is also used by a 5G UE in CM-CONNECTED to request establishment of user plane resources for the PDU sessions.

A procedure may be used when the network needs to signal (e.g. N1 signaling to UE, Mobile-terminated Short Message Service (SMS), PDU session User Plane resource establishment to deliver mobile terminated (MT) user data) with a UE. If the UE is in CM-IDLE state or CM-CONNECTED state, the network initiates a network triggered Service Request procedure. If the UE is in CM-IDLE state, and Asynchronous Communication is not activated, the network sends a Paging Request to (R)AN/UE. The Paging Request triggers the Service Request procedure in the UE. If Asynchronous Communication is activated, the network suspends the Service Request procedure with (R)AN and UE, and continues the Service Request procedure with the (R)AN and the UE (i.e. synchronizes the session context with the (R)AN and the UE) when the UE enters CM-CONNECTED state.

In the proposed 5G network, two types of Data Storage Network Functions (DSFs) are defined: an unstructured DSF (UDSF) and a structured DSF (SDSF). As illustrated in FIG. 5, the 5G system architecture allows any network function (NF) to store and retrieve its unstructured data into/from a UDSF. The UDSF belongs to the same public land mobile network (PLMN) where the network function is located. CP NFs may share a UDSF for storing their respective unstructured data or may each have their own UDSF (e.g. a UDSF may be located close to the respective NF). The UDSF is an optional function that supports storage and retrieval of information as unstructured data by any NF.

As shown in FIG. 6, the 5G system architecture allows the network exposure function (NEF) to store structured data in the SDSF intended for network external and network internal exposure by the NEF. SDSF belongs to the same PLMN where the NEF is located. The SDSF is an optional function that supports storage and retrieval of information as structured data by the NEF.

In the 4G evolved packet core (EPC), session management mechanisms are provided to establish the IP based PDN connection for 3GPP EPC. In traditional 3GPP CN, the session is created when a UE is attached to the network to connect the UE with a PDN. Specifically, in 4G EPC, a PDU session may consist of multiple bearers, each of which may carry different types of data flows with different QoS. A default bearer is established when a session is created.

One of the solutions for non-IP data delivery (NIDD) in 3GPP utilizes the control plane to transfer the infrequent small non-IP data for various IoT applications. Specifically, the non-IP data could be delivered via Mobility Management Entity (MME)-Service Capability Exposure Function (SCEF) control plane between the UE and SCS/AS. Non-IP data delivery (NIDD) via the SCEF may be handled using a PDN connection to the SCEF. The UE may obtain a Non-IP PDN connection to the SCEF either during an Attach procedure or via UE requested PDN connectivity.

When the UE performs an Evolved Packet System (EPS) attach procedure with PDN type of "Non-IP", and the subscription information corresponding to either the default Access Point Name (APN) for PDN type of "Non-IP" or the UE requested APN includes the "Invoke SCEF Selection" indicator, then the MME initiates a T6a connection towards the SCEF corresponding to the "SCEF ID" indicator for that APN. FIG. 7 shows the T6a connection establishment procedure, including the roaming scenario. FIG. 8 illustrates the procedure of configuring necessary information at the SCEF, and Home Subscriber Server (HSS), and MME for transferring non-IP data. The procedure can also be used for replacing and deleting configuration information.

SUMMARY

As described above, control plane optimization has been defined for NIDD in 3GPP TS 23.682, where the MME is the main entity to handle the NIDD. However, in 5G, the concept of network functions is applied based on the network slice technology, and consequently functionality of the MME is separated into an AMF and an SMF. The AMF is responsible for access and mobility management, while the SMF is responsible for session management. The SMF should be the main control plane function responsible for NIDD in 5G assuming no roaming. It has been proposed that NAS signaling may be established between the AMF and UE over the N1 interface, while the NAS information related to the SM may be forwarded by the AMF to the SMF over the N11 interface.

Furthermore, in many IoT use cases, the NIDD mechanism may be used to transfer small infrequent data packets, thus it is not efficient to perform the connection management (service request) process and session management process separately since the control signaling overhead is too much compared to the amount of traffic data, especially for the cases that an IoT device (i.e., UE) stays in the power saving mode (i.e., CM-IDLE state) for most of the time.

Thus, in 5G, there is a need to efficiently establish the PDU session for NIDD.

Also, with SDSF and UDSF defined in the 5G network, it may be possible to use these data storage functions for data buffering. However, when data is stored in a SDSF or UDSF, there needs to be some way to handle the case where data, or control of the data, can be transferred from one NF to another NF. In addition, the UDR/UDM may be used alternatively as the SDSF to store the structured data. Therefore, in some embodiments, the SDSF used in the procedures and methods proposed can be replaced with UDR/UDM.

In addition, suspending the network triggered service request procedure for a UE in IDLE state may make operation more efficient. However, in case that the UE is moving/roaming when in CM-IDLE state, it is not clear how to resume the service request procedure when UE switches to the CM-CONNECTED state.

These and other problems are addressed by various aspects of the present disclosure.

In one aspect, a 5G NIDD architecture is proposed including different options of data paths for non-IP data delivery (NIDD) through the 5G core network. In connection with this aspect, a registration procedure is proposed with some new parameters for enabling the NIDD. Also, mechanisms are proposed for establishing the PDU session between a UE and SCS/AS for non-IP delivery. For example, the PDU session may go through AMF, SMF, and User Plane Function (UPF)/NEF. Additionally, methods of Mobile Originated (MO) and Mobile Terminated (MT) non-IP data transfer are described.

In another aspect, methods of downlink data buffering at UDSF and SDSF, respectively, are described. For example, when a UE is in IDLE state (i.e., not reachable, or user plane path is not established), the downlink data from SCS/AS may be buffered by different NFs in the network.

In a further aspect, a method of resuming suspended network triggered service request process in the roaming scenario is described. According to this aspect, when a UE is in IDLE state, the AMF may suspend the network triggered service request procedure by not contacting the RAN and UE until the UE is trying to go to CONNECTED state. The proposed method addresses how to perform the service request if the UE is roaming during this time period.

Many IoT devices may capture data that may be distributed and/or sold to multiple Data Consumers. Example deployments may involve constructing a system where an IoT device sends its measurements to an M2M Server, and the Data Consumers all obtain data from the M2M Server. However, it is not practical to assume that all IoT devices will be controlled by a central M2M Server. Some devices may be deployed in a stand-alone manner where Data Consumers may come to the sensor and consume data on an as needed basis. Such a deployment may be implemented for many reasons. For example, the device owner may not have an M2M Server deployed, the device may not support protocols that talk to an M2M Server such as HTTP/TCP/IP, oneM2M, OCF, or LWM2M, or the generated data may be sensitive and the device may wish to limit the number of nodes that contact the device directly.

The following problems may arise when an IoT device needs to interact with multiple Data Consumers. Each time data is consumed, the IoT device may be required to send its reading to all interested parties, thus increasing battery consumption. Each time data is consumed, the IoT device may be required to connect and authenticate with all interested parties, thus increasing complexity. If the IoT device is going to charge for the data, then the sensor may be required to establish a business/payment relationship with all interested parties. If historical data is required, the IoT device may be required to store its readings for some arbitrary period of time, thus increasing storage requirements. A relatively long latency may be introduced when obtaining data from a sleeping device.

Embodiments described herein also provide methods and systems to enable solutions to the problems discussed above, among others. Embodiments may enable a UE to store data (e.g., sensor readings) in a mobile core network such that the data may be retrieved by Data Consumers and reduce the number of "over-the-air" transactions that a UE may execute. Several aspects are introduced to enable such embodiments.

In an aspect, systems and methods are introduced to enable a UE to send data to a network, via a user plane or via control plane NAS messaging, to be stored in a DSF. Embodiments described herein describe how the UE may request the service from the network slice when the UE registers with the network, may establish the PDU session to send data to the DSF, and may send data to be stored in the DSF (e.g., via the user or control plane).

In another aspect, systems and methods are introduced to enable Data Consumers to interact with a UE to determine what data is generated by the UE, determine where the data is stored, and gain permission to access the data. The Data Consumer may then access the stored data via APIs that may be exposed on an NEF or via IP addressing (e.g., by reading addressable resources in a server that is hosted by the network operator).

In an additional aspect, systems and methods are introduced to enable Data Consumers to read the information stored in the DSF directly from the DSF rather than interfacing with the UE. The decrease in over-the-air activity may save bandwidth and increase battery life. For example, the DSF may connect to a message bus using protocols such as MQTT. Data Consumers may then retrieve the data by accessing the message bus.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

A more detailed understanding may be had from the following description, given by way of example in conjunction with accompanying drawings wherein.

and

Figure 34:
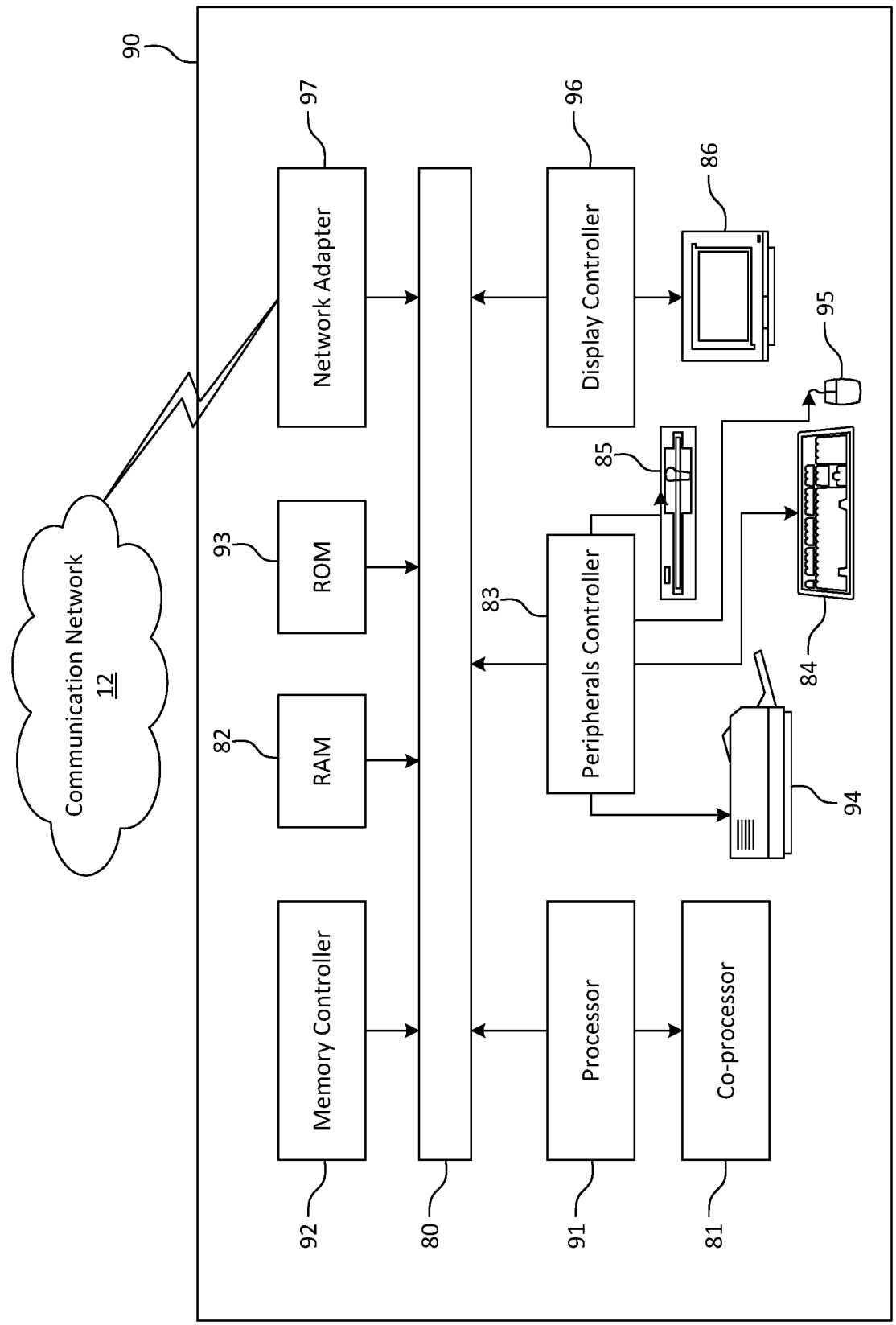

FIG. 34 is a block diagram of an example computing system in which a node of a communication system may be embodied.

DETAILED DESCRIPTION OF ILLUSTRATIVE EMBODIMENTS

In the following description, the following terms may have the following general meanings.

A Network Function (NF) may be a processing function in a network, which has defined functional behavior and defined interfaces. An NF can be implemented either as a network element on a dedicated hardware, or as a software instance running on a dedicated hardware, or as a virtualized function instantiated on an appropriate platform, e.g. on a cloud infrastructure.

A Network Slice Template may refer to a set of NW functions that support certain application profile(s). A Network Slice Instance may mean instantiation of a NW Slice Template. A PDU session may be an association between a user equipment (UE) and a data network that provides a PDU Connectivity Service. Two types of PDU sessions may be defined: (1) an Internet Protocol (IP) Type-data network is IP type; and a Non-IP type-data network is non-IP.

Session Management in the 3GPPcore network (CN) refers to the management of the end-to-end PDN connection (IP or non-IP type) between a UE and a packet data network for the data transfer through the core network with policy (e.g., QoS) and charging control enforced.

A Data Consumer may refer to an IoT Server, an Application Server, an Application Function, an M2M Server, an MTC Server, a CSE, a Service Layer, or an Application.

Note that the term Service Capability Server (SCS)/Application Server (AS) may be used throughout this document, however, the term may be used interchangeably with the following terms: Application Function (AF), Application Server (AS), Service Capability Server (SCS), Common Services Entity (CSE), M2M Server, machine-type communication (MTC) Server, or IoT Server.

As described above, control plane optimization has been defined for NIDD in 3GPP TS 23.682, where the MME is the main entity to handle the NIDD. However, in 5G, the concept of network functions is applied based on the network slice technology, and consequently functionality of the MME is separated into AMF and SMF. AMF is responsible for access and mobility management, while SMF is responsible for session management. SMF should be the main control plane function responsible for NIDD in 5G assuming no roaming. It has been proposed that NAS signaling may be established between the AMF and UE over the N1 interface, while the NAS information related to the SM may be forwarded by the AMF to the SMF over the N11 interface.

Furthermore, in many IoT use cases, the NIDD mechanism may be used to transfer small infrequent data packets, thus it is not efficient to perform the connection management (service request) process and session management process separately since the control signaling overhead is too much compared to the amount of traffic data, especially for the cases that an IoT device (i.e., UE) stays in the power saving mode (i.e., CM-IDLE state) for most of the time.

Thus, in 5G, there is a need to efficiently establish the PDU session for NIDD.

Systems (e.g., architectures) and methods are described for non-IP data delivery (NIDD) through the 5G core network, including different options of data paths for the NIDD. In connection with this aspect, a registration procedure is proposed with some new parameters for enabling the NIDD. Also, mechanisms are proposed for establishing the PDU session between a UE and SCS/AS for non-IP delivery. For example, the PDU session may go through AMF, SMF, and User Plane Function (UPF)/NEF. Additionally, methods of Mobile Originated (MO) and Mobile Terminated (MT) non-IP data transfer are described.

Many IoT devices may capture data that may be distributed and/or sold to multiple Data Consumers. For example, an environmental sensor may want to make its measurements available to multiple groups of researchers. In another example, a home appliance may want provide electricity consumption statistics to the energy company and to the homeowner's home automation provider. In yet another example, roadside sensors may want to make their data available to drivers, navigation apps, or other consumers. Such examples may be deployed by constructing a system where the IoT device sends its measurements to an M2M Server, and the Data Consumers all obtain data from the M2M Server.

However, it is not practical to assume that all devices will be controlled by a central M2M Server. Some devices may be deployed in a stand-alone manner where Data Consumers may come to the device and consume data on an as needed basis. Such a deployment may be implemented for many reasons. For example, the device owner may not have an M2M Server deployed, the device may not support protocols that talk to an M2M Server such as HTTP/TCP/IP, oneM2M, OCF, or LWM2M, or the generated data may be sensitive and the device may wish to limit the number of nodes that contact the device directly.

The following problems may arise when an IoT device needs to interact with multiple Data Consumers. Each time data is consumed, the IoT device may be required to send its reading to all interested parties, thus increasing battery consumption. Each time data is consumed, the IoT device may be required to connect and authenticate with all interested parties, thus increasing complexity. If the IoT device is going to charge for the data, then the device may be required to establish a business/payment relationship with all interested parties. If historical data is required, the IoT device may be required to store its readings for some arbitrary period of time, thus increasing storage requirements. A relatively long latency may be introduced when obtaining data from a sleeping device.

Embodiments described herein provide methods and systems to enable solutions to the problems discussed above, among others. Embodiments may enable a UE to store data (e.g., sensor readings) in a mobile core network such that the data may be retrieved by Data Consumers and reduce the number of "over-the-air" transactions that a UE may execute. Several aspects are introduced to enable such embodiments.

For the methods described hereinafter, it is assumed that the UE is already registered with the network, i.e., is in the RM-REGISTERED state. If a UE is not registered with the network, it could initiate a registration procedure, such as the procedures described in 3GPP TS 23.502, Procedures for the 5G System, before performing any of the methods described below. The term "non-IP data" used throughout is synonymous with the term "unstructured data."

Figure 1:
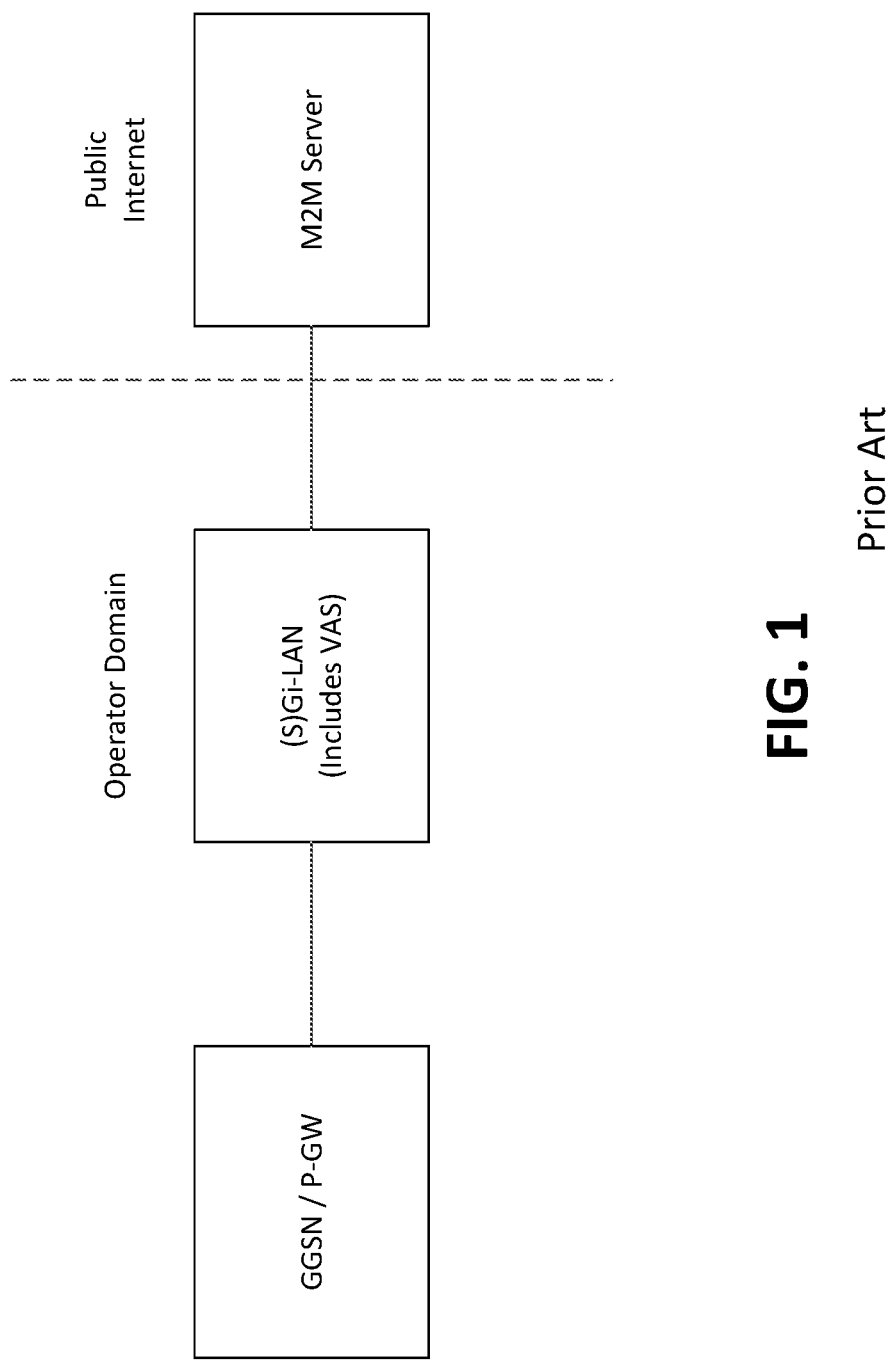
FIG. 1 illustrates an example of a packet data network between a GGSN or P-GW of a Mobile Core network and the Internet.
Figure 2:
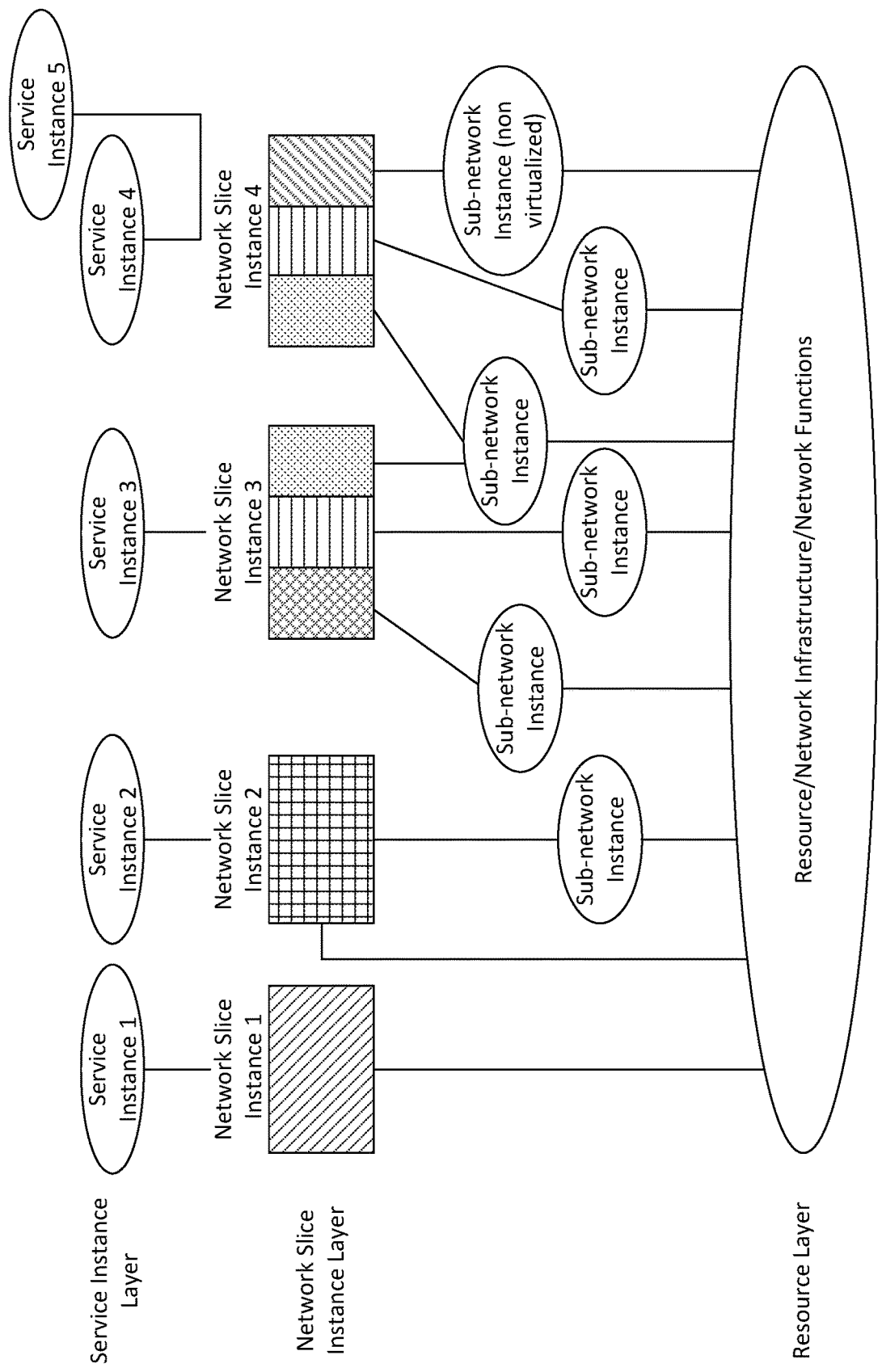
FIG. 2 illustrates the concept of network slicing.
Figure 3:
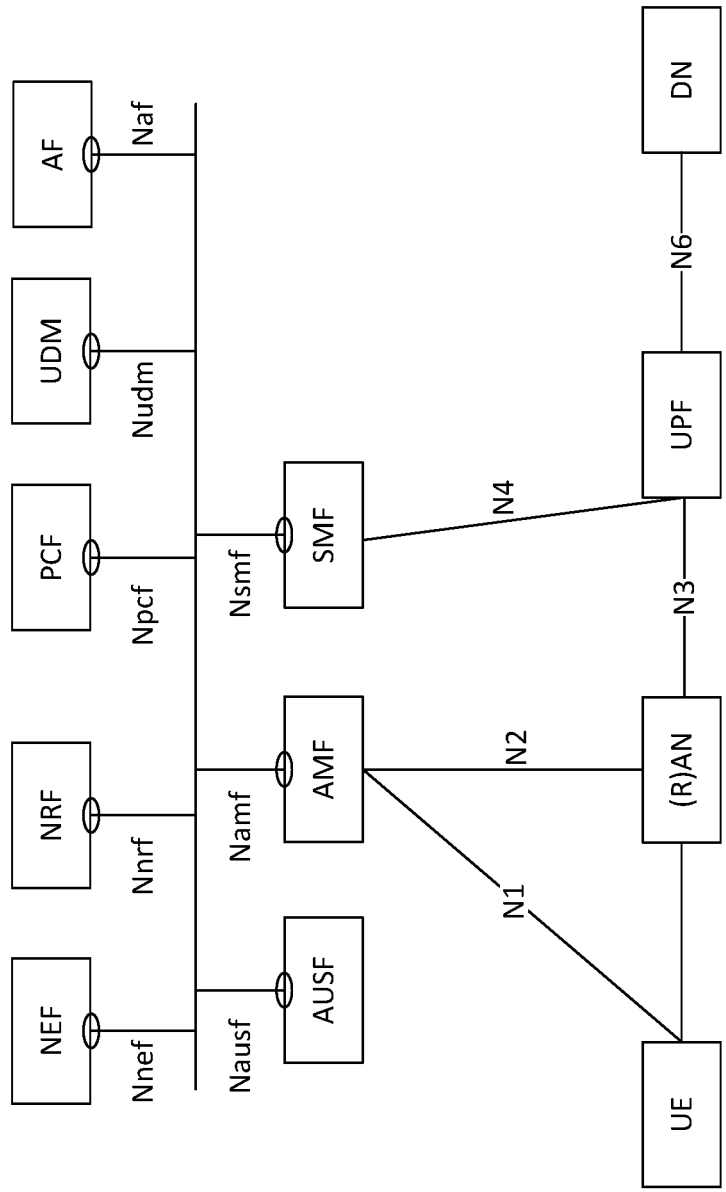
FIG. 3 is a block diagram illustrating a 5G system service-based architecture.
Figure 4:
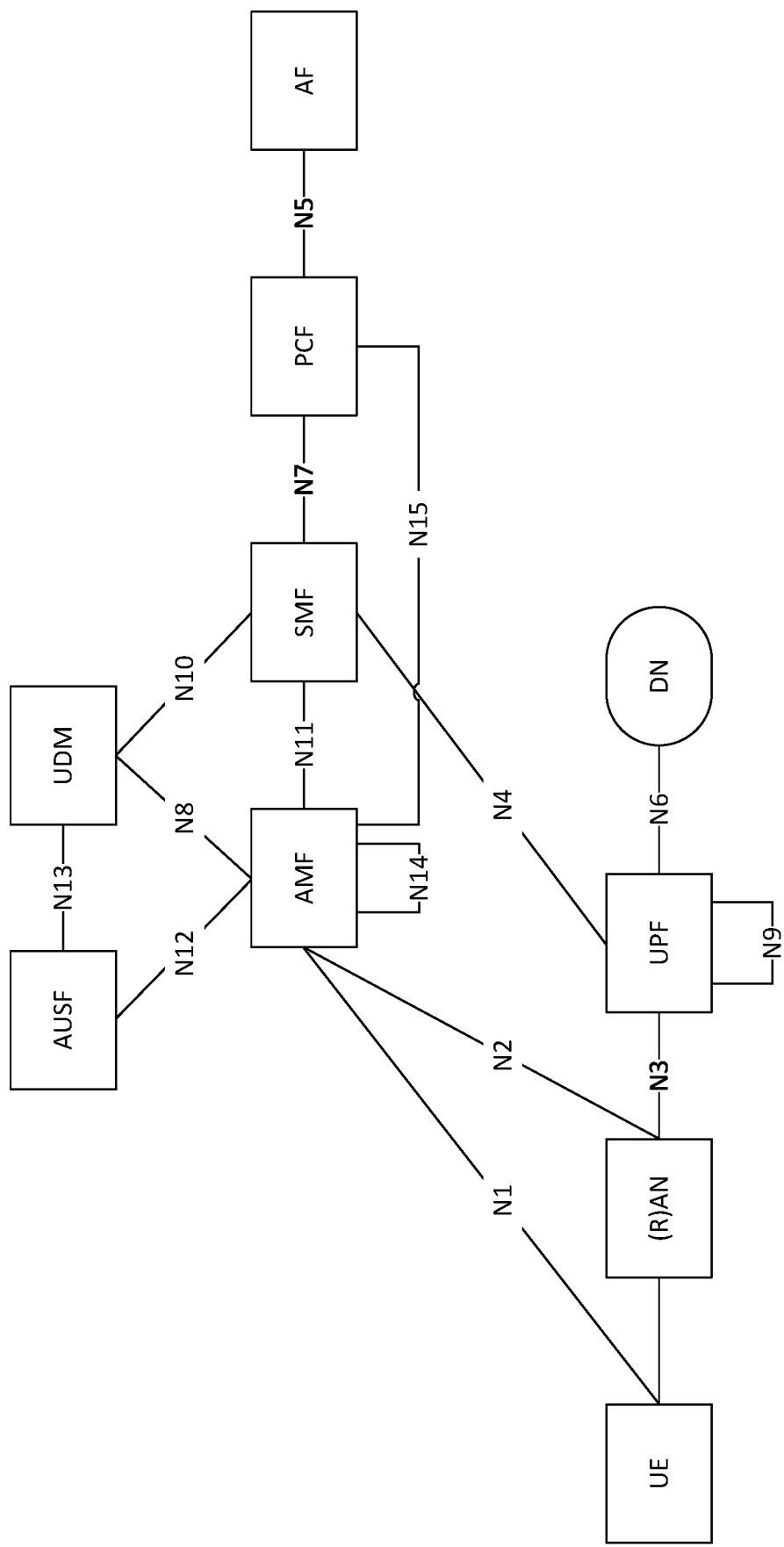
FIG. 4 is a block diagram illustrating a non-roaming 5G system architecture in reference point representation.
Figure 5:
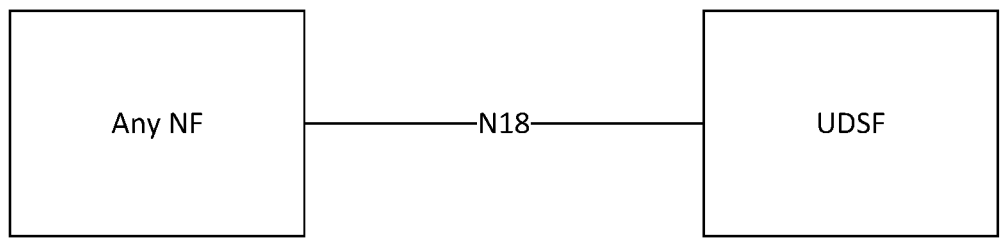
FIG. 5 illustrates a data storage architecture for unstructured data from any NF.
Figure 6:
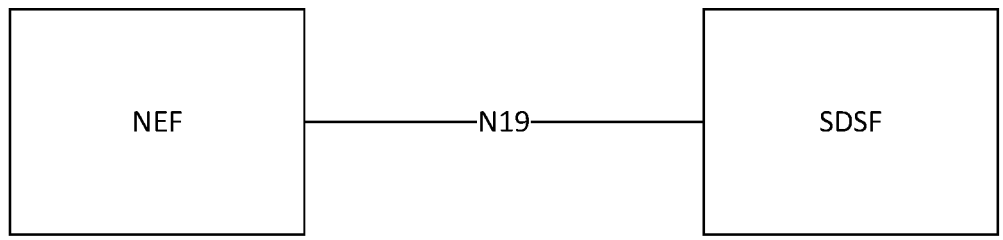
FIG. 6 illustrates a data storage architecture for structured data from the NEF.
Figure 7:
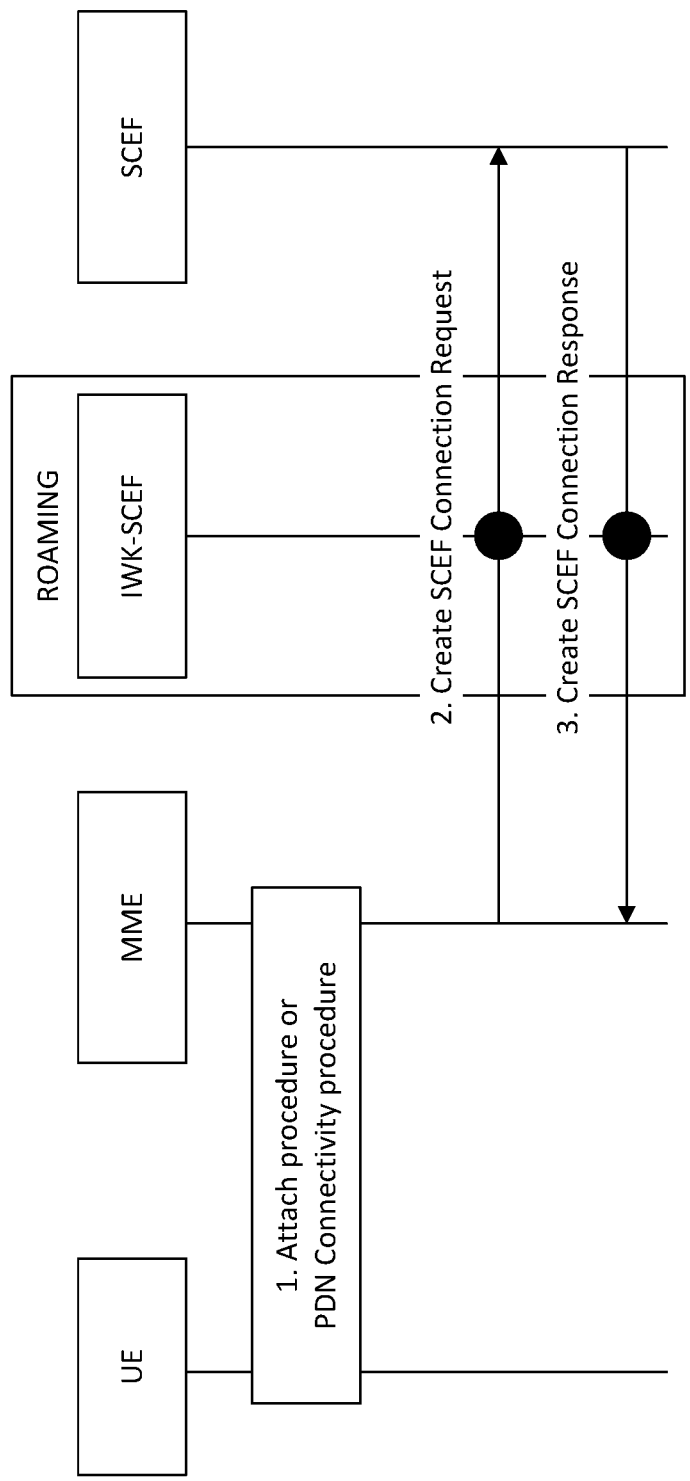
FIG. 7 illustrates a T6a connection establishment procedure.
Figure 8:
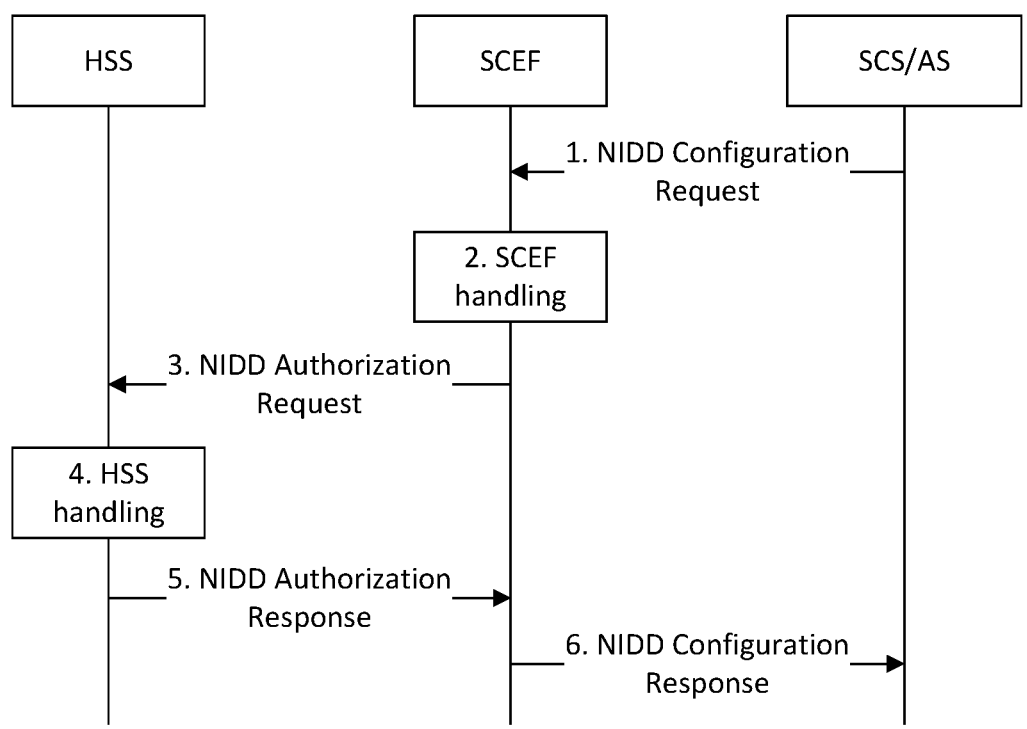
FIG. 8 illustrates a configuration for an NIDD procedure.
Figure 9:
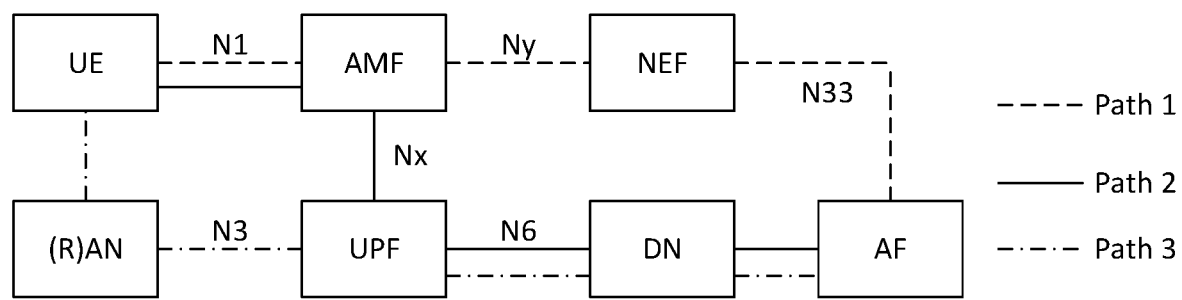
FIG. 9 illustrates an architecture for non-roaming NIDD without SMF involvement.
Figure 10:
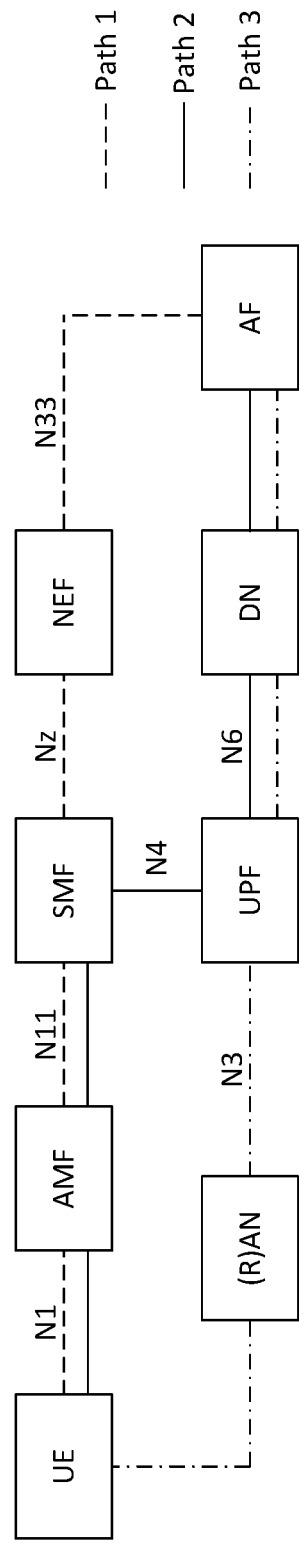
FIG. 10 illustrates an architecture for non-roaming NIDD with SMF involvement.

FIG. 9 illustrates a first architecture for NIDD. In this architecture, there are three possible paths for transferring the non-IP data between a UE and AF without involving the SMF. FIG. 10 illustrates a second architecture for NIDD. In this second architecture, there are also three possible paths for transferring non-IP data but with the involvement of the SMF. A difference between the two architectures is that the second architecture of FIG. 10 involves the SMF as the main network function to transfer the non-IP data through the non-IP data path. Specifically, a UE first inserts data into a NAS message, which is sent to the AMF. In the first architecture, AMF is capable of forwarding the data to the appropriate network functions (NEF or UPF), thus the SMF will not be involved. In the second architecture, AMF is not able to do that, or the AMF does not support the data forwarding/routing function. AMF will forward the data to the SMF via NAS-SM signal, and then the SMF is responsible for the data forwarding towards the destination AF (i.e., through the NEF). In summary, there are three different paths proposed for NIDD between a UE and an AF:

1. UE to AMF (to SMF in the second architecture) to NEF to AF (DN)
2. UE to AMF (to SMF in the second architecture) to UPF to DN (AF)
3. UE to UPF (via RAN) to DN (AF)

Note that the interfaces Nx, Ny and Nz are not defined in the 5G specifications. Also, note that when the SMF is involved, AMF may only perform the forwarding/routing regarding the SM information in NAS message. Note also that the two architectures of FIGS. 9 and 10 show the data path for NIDD. In other words, though the data paths in the first architecture of FIG. 9 do not include SMF, SMF may be involved for creating the data path.

Note also that when the UPF is used to send data to an AF, the non-IP data may be tunneled to the AF; the UPF may expose an API to the AF to allow it to send and receive data. Alternatively, the UPF may expose an API, or service, so that the AF can send and receive data via the NEF (option not shown).

To use the NIDD as a service, the UE may indicate this requirement to the network during the registration process. Since the 5G core network is built on the concept of network slice, there could be a certain network slice that is configured for specifically serving the NIDD, or some NFs that are optimized for NIDD. The following information may be used during the registration process for NIDD:

A NIDD only indicator may be used by UE in a registration request to indicate to the network that UE is requesting NIDD service, and will send and receive only non-IP data through the network.

A NIDD optimized NF/slice indicator may be used by network to label and identify a NF and/or a network slice that is optimized for NIDD. Therefore, the NF and/or slice will serve the UE only for NIDD. This indicator may include identification information of a network slice that the UE requests, such as requested S-NSSAI, subscribed S-NSSAI.

A NIDD subscription indicator may be used by the subscription database to indicate to the network that a UE is allowed to use the NIDD service provided by the network.

A security preference indicator may be indicated by UE about the preferred security method for the NIDD. In addition, this could be used as a preferred security method for connection between core network functions and SCS/AS for NIDD.

A method for establishing a network session for non-IP data delivery in a communication network may comprise receiving a request to configure the session for non-IP data delivery; retrieving policy information about the non-IP data delivery and determining, based on the policy information, a path for transferring the non-IP data; selecting an anchor point within the communications network and assigning an identity for the session to be established; sending a request to the selected anchor point to establish the session along the selected path; and sending a response indicating that the session has been established.

In various embodiments, the request to configure the session may be received from one of a user equipment (UE) or an application server (AS). The policy information may comprise source and destination IP address and port numbers. The selected anchor may comprise one of a user plane function (UPF) or a network exposure function (NEF). The selected path may comprise an AMF, the UPF, and an application function (AF). Alternatively, the selected path may comprise the AMF, the NEF, and the AF. In either case of selected path, the selected path may further comprise an SMF.

Figure 11:
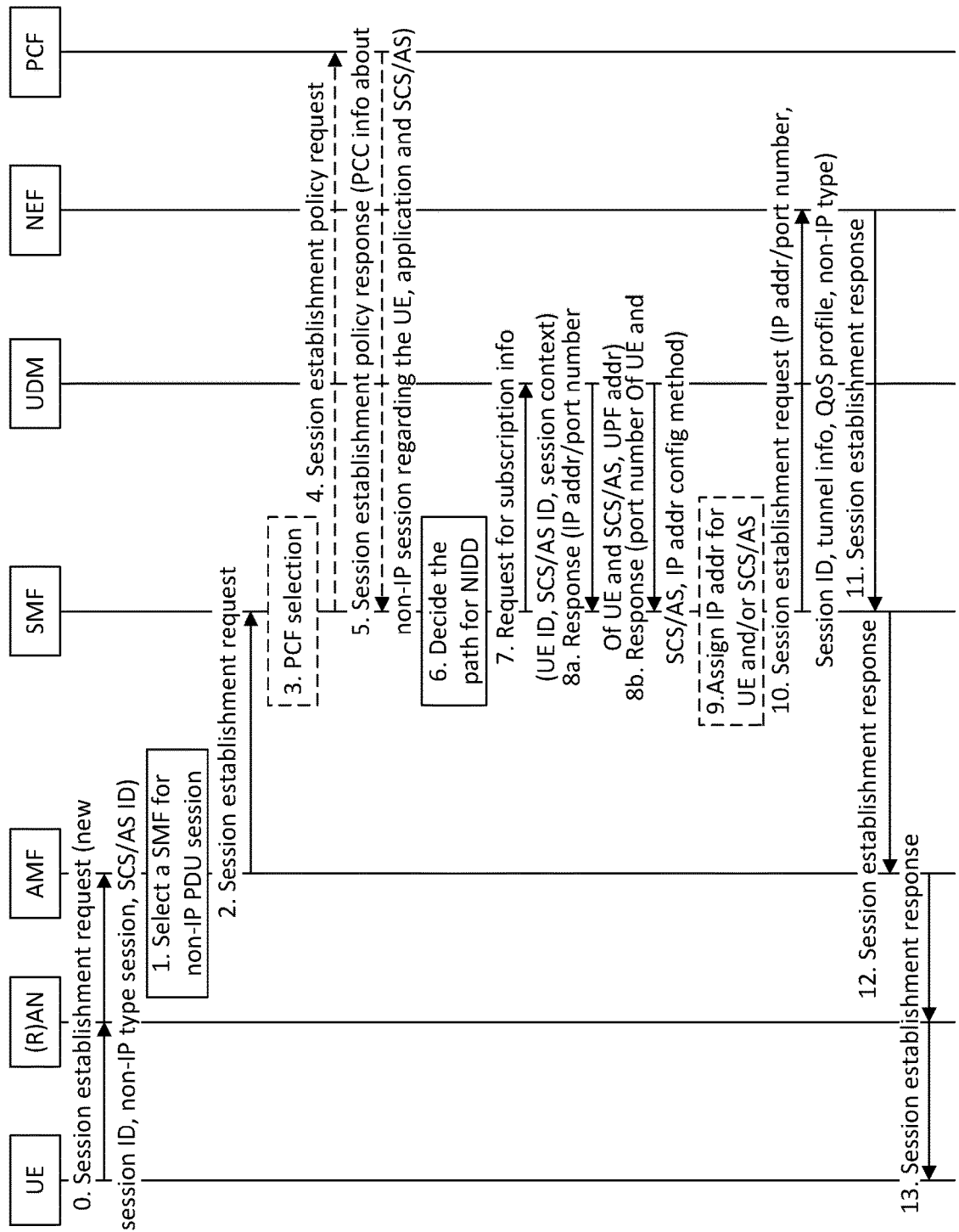
FIG. 11 is a call flow illustrating one embodiment of a method for PDU session establishment for NIDD.

FIG. 11 is a call flow illustrating one embodiment of a method for non-IP PDU session establishment for NIDD. Specifically, it illustrates mechanisms for establishing the connection (i.e., PDU session) for NIDD. Note that the procedure shown in FIG. 11 may be performed along with other core network procedures, such as registration, service request and PDU session establishment procedures.

In step 0, the UE may send a request (i.e. a registration or service request) to establish a new PDU session to AMF through the RAN. UE may provide the following information inserted in the NAS message:

Type of PDU session: non-IP

UE ID

New session ID generated by UE

SCS/AS ID: since it is non-IP data, this ID could be some external ID or Data Network Name (DNN) or APN instead of IP address of the SCS/AS UE Non-IP Port Number: will be used to identify the application on the UE SCS/AS Port Number: will be used to identify the application on the SCS/AS Downlink data buffering option (indicates if buffering should be enabled for the session)

Use NEF Indication—an indication of whether data should be routed to the SCS/AS via the NEF or whether data should be tunneled to the SCS/AS via a UPF Network slice identification, which will be used to help network slice selection for NIDD configuration.

Next, in step 1, once the AMF gets the NAS message including a session establishment request, it may select a SMF for the session establishment process. The selection of SMF may be done based on querying subscription information via the Unified Data Management (UDM) or policy information via the Policy Control Function (PCF) or it may be based on the following considerations:

Whether a SMF supports the NIDD

Whether a SMF supports all the possible NIDD options (i.e., via UPF, via NEF)

Whether a SMF is close enough to the UE or SCS/AS or DN

Whether a SMF has the required data buffering capability or access to the data buffering capability In step 2, the AMF forwards the session establishment request to the selected SMF with information discussed in step 0 and step 1.

In step 3, if the policy of session establishment is not pre-configured, or the policy is dynamically configured, the SMF needs to select a PCF and get the policy for establishing a non-IP PDU session for the particular UE and Data Network (DN) or SCS/AS. The selection of PCF may be done based on the following considerations:

Whether the PCF is in the network slice that is assigned to the UE, or the PCF is shared for non-IP PDU session management Whether the PCF supports dynamic policy configuration for the particular UE In step 4, the SMF sends a session establishment policy request to the selected PCF to query the policy for establishing a non-IP PDU session between the UE and DN.

In step 5, the PCF returns a session establishment policy response to SMF, which may include the Policy and Charging Control (PCC) information about the non-IP PDU session establishment between UE and destination DN or SCS/AS, such as Whether NEF path or User Plane (tunneling) is allowed for NIDD Whether NEF path or User Plane (tunneling) should be used for NIDD Policy control, e.g., which application is allowed to send non-IP data over the non-IP PDU session QoS profile, e.g., priority, maximum data rate Charging model, charging method and rate.

Some security information about the non-IP session: e.g., security protocol used on top of the non-IP session between UE and anchor point, security keys that the anchor point maintains for the session In step 6, if the path is not pre-configured for NIDD, i.e., through one of the proposed optional paths proposed above in connection with the descriptions of FIGS. 9 and 10 to reach the destination DN, the SMF may make a decision on the path of the non-IP data based on network operation configuration, the policy information obtained from the PCF in step 5 as well the information from AMF in step 2.

In step 7, the SMF sends a request to UDM to get the subscription information and possible session context of the UE. The request for session context may include any of the information that was obtained in step 1. For example, the port numbers that were provided in step 1 may be used to look up the appropriate session details from the UDM.

In step 8, the UDM returns the response including the required subscription information and session context of the UE. If the session is connecting to the data network via a UPF, the session context may include details for how data may be tunneled to the SCS/AS. For example, the response may include different contents:

In step 8a, in the case of fixed/static IP address configuration, i.e., the network operator pre-configures the IP address regarding the NIDD between the particular UE and the destination DN or SCS/AS, then the source and destination IP address/port numbers is simply returned to the SMF. The source and destination IP address/port numbers are used to derive the IP addresses and port number that will be used to tunnel the Non-IP data to the SCS/AS. Note that the port numbers that are used could be the same port numbers that were provided in step 1.

In step 8b, in the case of dynamic IP address configuration, the UDM may return the IP address configuration method (e.g., DHCPv6) or IP prefix, and port number. This information may be used to dynamically obtain a source IP Address and Port Number (of the UE) for the Non-IP session. The destination source IP Address and Port Number (of the SCS/AS) may be obtained in this message or the SMF may obtain it via a DNS lookup of the SCS/AS Identifier. Note that the port numbers that are used could be the same port numbers that were provided in step 1.

Note that it is possible that the hybrid configuration is adopted by the operator. In other words, for a set of UEs and SCS/AS, fixed/static IP address configuration is used; for other UEs and SCS/AS, dynamic IP address configuration is used. In addition, whether to use the static or dynamic configuration may depend on applications. In addition, a common piece of information included in both steps 8a and 8b is the ID of the default NEF. This NEF is the default NF that will provide the NIDD service for the UE in case no UPF is NIDD capable within the network slice for the UE.

In step 9, if the session is anchored at a UPF, the SMF will assign the IP address or contact DHCP server to configure the IP address. Since the NEF is assumed to be the anchor, the SMF does not need to select a UPF for the non-IP PDU session.

In step 10, the SMF sends the session establishment request to the NEF (or UPF in case UPF is used as the anchor point). The following information may be included:

IP address and port number of UE and SCS/AS
UE and SCS/AS Port Numbers that were provided in step 1.
Session ID
Tunnel information between AMF and NEF, between AMF and UPF, or between SMF and NEF for NIDD.
PDU session type: non-IP
QoS profile
Data buffering enablement: indicate if the data buffering mechanism is enabled for the downlink data destined to the UE
Data buffering scheme: indicate which entity or NF will buffer the downlink data for the UE when the UE is not reachable.
Security profile of the session: include some security information of the non-IP session just established, e.g., security protocol used on top of the session between the anchor point and the UE, between anchor point and the SCS/AS. Some parameters used in the security protocol.

In step 11, the NEF (or UPF) establishes the non-IP PDU session, and confirms with the SMF by sending a response message.

In step 12, the SMF confirms with the AMF about the completion of session establishment.

In step 13, the AMF notifies the RAN and UE about the completion of session establishment.

Note that FIG. 9 shows the procedure initiated by the UE to establish a connection for NIDD through the control plane (i.e., NAS signaling is used). It is possible that SCS/AS initiates the procedure to establish a connection for NIDD as well, where NEF will be used as the contact point between SCS/AS and the core network even if the UPF serves the anchor point for the NIDD.

Figure 12:
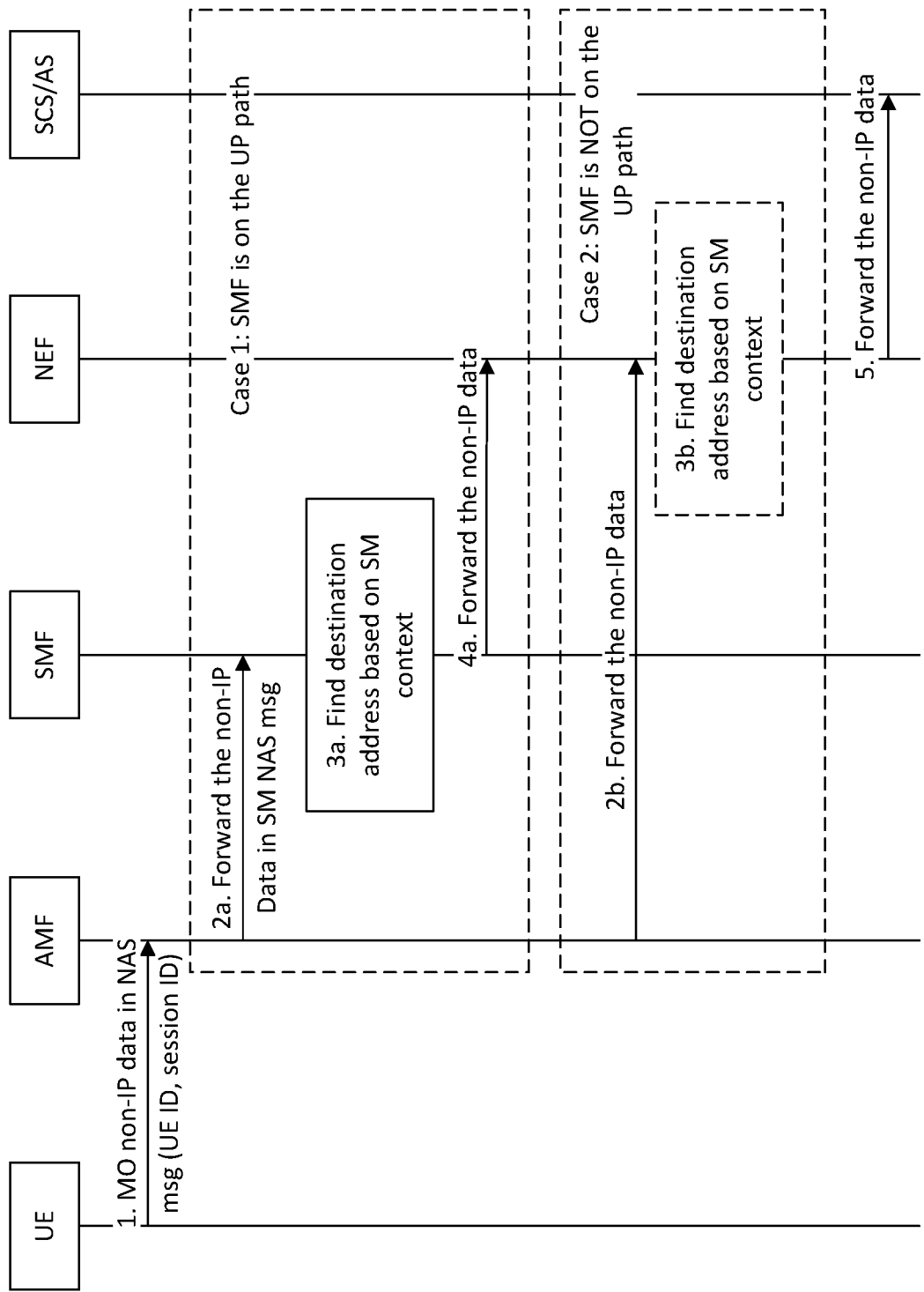
FIG. 12 is a call flow illustrating one embodiment of a method for MO non-IP data transfer, both with and without SMF respectively.

FIG. 12 is a call flow illustrating one embodiment of a method for MO non-IP data transfer, both with and without SMF respectively. As shown, in step 1, a UE application generates the uplink (UL) data, and sends it to the AMF with UE ID and session ID included within a NAS message. In addition, the UE may add a parameter indicating that the NAS message includes a non-IP data. The message may also include the source and destination port numbers (i.e. application identifiers) for the packet and the identity of the SCS/AS that the packet should be sent to. In addition, the UE may provide the following parameters to help the network for NIDD:
  SM configuration: used by the network to determine whether a non-IP session needs to be established, and SMF will be involved for NIDD.
  Roaming preference: indicates UE's preference for the NIDD when roaming, i.e., local breakout versus home routed.

In the first case, the SMF is in the data path. In this case, in step 2a, the AMF is not aware of any non-IP PDU session context. It will de-encapsulate the SM related information, which includes the non-IP data from the NAS message, find the SMF that is serving the UE, encapsulate the SM related information in a N11 message, and send the N11 message to the SMF. In the N11 message, the following information may be inserted:
  Indication that a non-IP data is appended
  UE ID and session ID for the NIDD In step 3a, upon receiving the N11 (e.g., SM NAS) message, the SMF finds the destination SCS/AS IP address and port number, and the ID of the NEF as the anchor point. The SMF could figure out this information based on UE ID, the non-IP PDU session ID, the SCS/AS identifier, and the source and destination port numbers (i.e. application identifiers). Then, in step 4a, the SMF sends the non-IP data to the NEF (or UPF) over the Nz interface as shown in FIG. 10, which further forwards the data the destination SCS/AS.

In the second case, the SMF is not in the data path. In this case, in step 2b, the AMF maintains some session context information about the non-IP PDU session, so it could figure out the information for non-IP data forwarding. The information is similar to those discussed in step 3a. Alternatively, the AMF may maintain no session context and the AMF could determine the NEF (or UPF) to which the packet should be forwarded based on UE ID, the non-IP PDU session ID, the SCS/AS identifier, and the source and destination port numbers (i.e. application identifiers).

In step 3b, if the AMF is not able to figure out the address of the destination SCS/AS, the NEF (or UPF) will do so in this step.

In step 5, the NEF (or UPF) forwards the non-IP data to the SCS/AS. This step is general for both cases. The non-IP packet may be forwarded to the SCS/AS by encapsulating in an IP tunnel. For example, it may be encapsulated in a UDP packet. The NEF (or UPF) may add additional information to the packet before sending it to the SCS/AS. For example, it may append a header that indicates the identity (IMSI, IMEI, SUPI, or external ID) of the sender and additional information about the sender, such as a return IP address and port number that can be used to send MT data to the UE, the UE's location, and the identity of an NEF that can be used to access services related to the UE.

Figure 13:
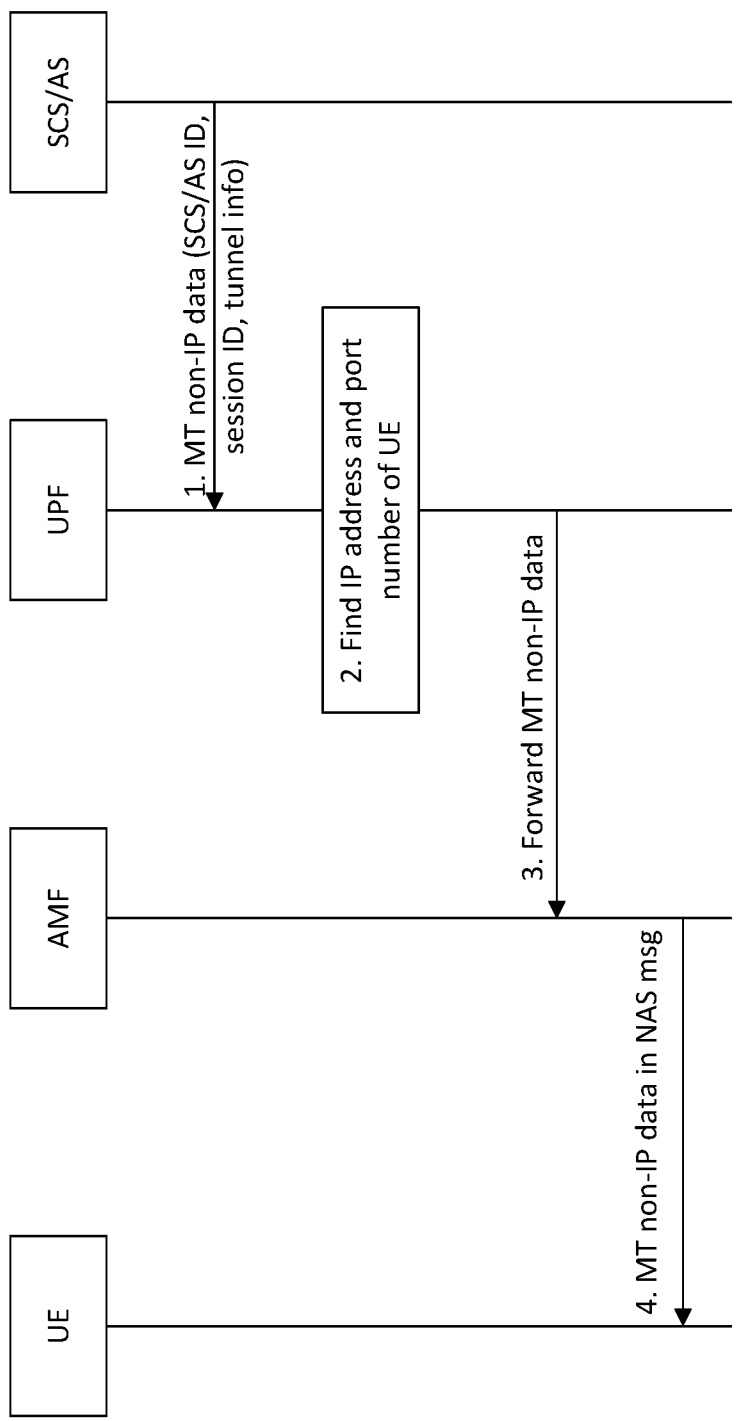
FIG. 13 is a call flow illustrating one embodiment of a method for MT non-IP data transfer via a UPF-AMF path.

FIG. 13 is a call flow illustrating one embodiment of a method for MT non-IP data transfer via a UPF-AMF path. As shown, in step 1, the SCS/AS sends the MT non-IP data to the UPF (or NEF), which acts as the anchor point. It is assumed that the connection (tunnel) between AMF and UPF for NIDD is already configured.

In step 2, for the NEF case, the NEF finds the identity of the UE based on the SCS/AS ID, session ID, and port numbers provided by the SCS/AS. For the UPF case, the UPF determines the identity of the UE based on the destination IP address and port number of the tunneled IP data packet.

In step 3, the UPF or NEF forwards the non-IP data to AMF through the established tunnel.

Then, in step 4, the AMF inserts the non-IP data packet in NAS message, and sends the message to UE. During this step, the AMF will notify RAN the QoS requirements, so that RAN could enforce the QoS. Specifically, the QoS requirements could be configured when the non-IP PDU session is created. AMF could get this information from UPF or store this information based on the PDU session ID. In addition, this QoS requirement is set for the NAS message between AMF and UE.

Alternative to the path shown in the FIG. 13, the downlink non-IP data could be delivered to NEF from SCS/AS via an API, which is defined by the NEF and exposed to the SCS/AS.

Alternatively, prior to Step 1, the SCS/AS may query the network to determine the address of the UPF or NEF anchor point for the UE that it wishes to send MT Non-IP data to. Each mobile operator may have a default NEF, that exposes information related to the network and UEs registered with the network. The SCS/AS may use this default NEF to ask the network for the address of the anchor point for a particular UE. The UE may be identified by its some external identifier. The network may respond with the address of the anchor point and an indication of whether the anchor point is a NEF or a UPF.

Figure 29:
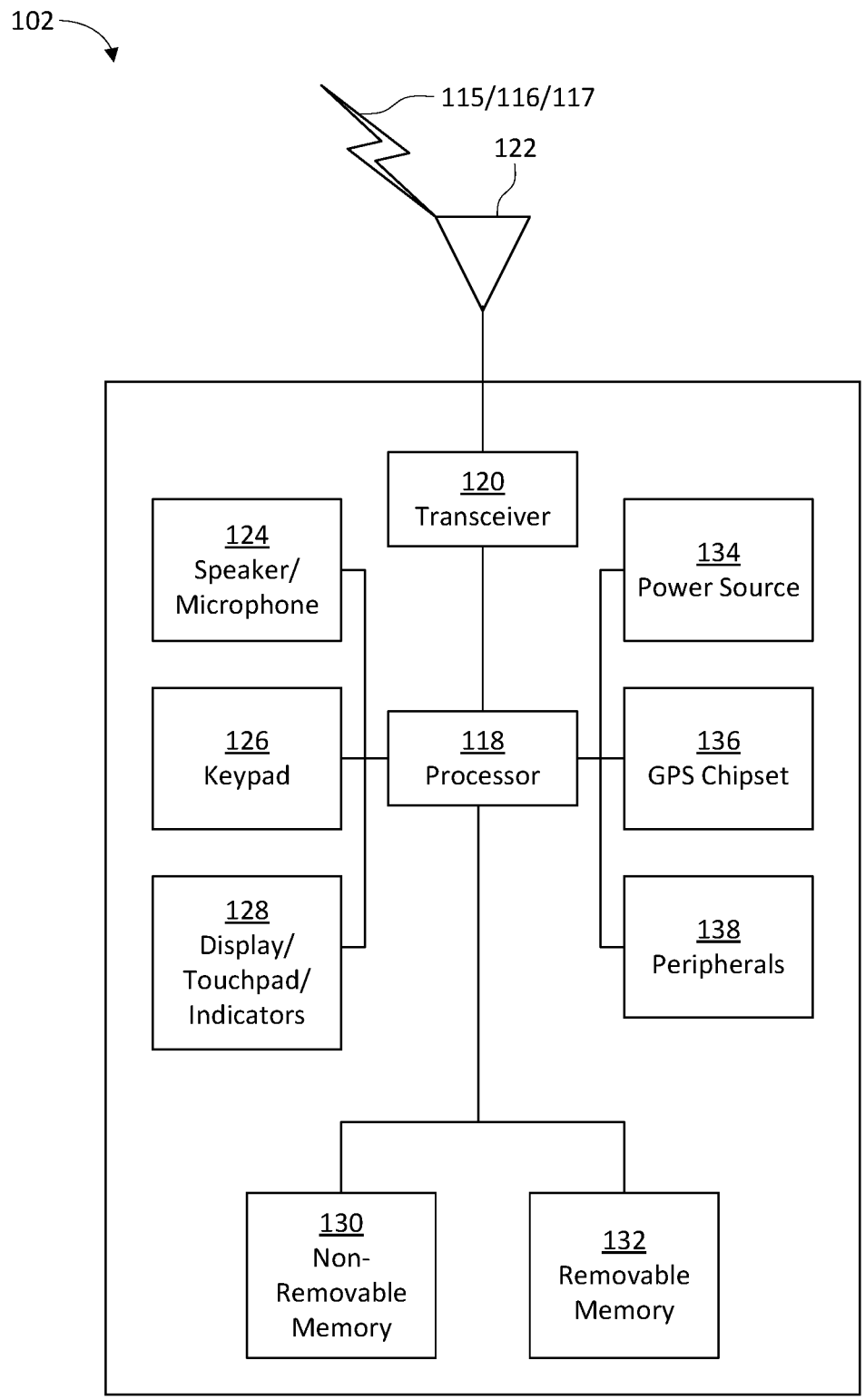
FIG. 29 is a block diagram of an example apparatus or device configured for wireless communications such as, for example, a wireless transmit/receive unit (WTRU)

It is understood that the entities performing the steps illustrated in FIGS. 9-13, such as the UE, AMF, UPF, SCS/AS, NEF, DN, AF, UDF, PCF, and the like, may be logical entities that may be implemented in the form of software (i.e., computer-executable instructions) stored in a memory of, and executing on a processor of, an apparatus configured for wireless and/or network communications or a computer system such as those illustrated in FIG. 29 or FIG. 34. That is, the method(s) illustrated in FIGS. 9-13 may be implemented in the form of software (i.e., computer-executable instructions) stored in a memory of an apparatus, such as the apparatus or computer system illustrated in FIG. 29 or FIG. 34, which computer executable instructions, when executed by a processor of the apparatus, perform the steps illustrated in FIGS. 9-13. It is also understood that the functionality illustrated in FIGS. 9-13 may implemented as a set of virtualized network functions. The network functions may not necessarily communicate directly, rather, they may communicate via forwarding or routing function. It is also understood that any transmitting and receiving steps illustrated in FIGS. 9-13 may be performed by communication circuitry of the apparatus under control of the processor of the apparatus and the computer-executable instructions (e.g., software) that it executes.

Described hereinafter are mechanisms for buffering downlink data at a Data Storage Function (DSF) when the network obtains an amount of downlink data for a UE, while the UE is in CM-IDLE state (e.g., sleeping mode or PSM) or in a forbidden area. Two methods are described herein for downlink data buffering during the network triggered service request process: (1) in the first method, the UPF buffers the data in UDSF under SMF's instruction, and (2) in the second method, the NEF buffers the data in SDSF if NEF is involved in the data path for NIDD.

Figure 14:
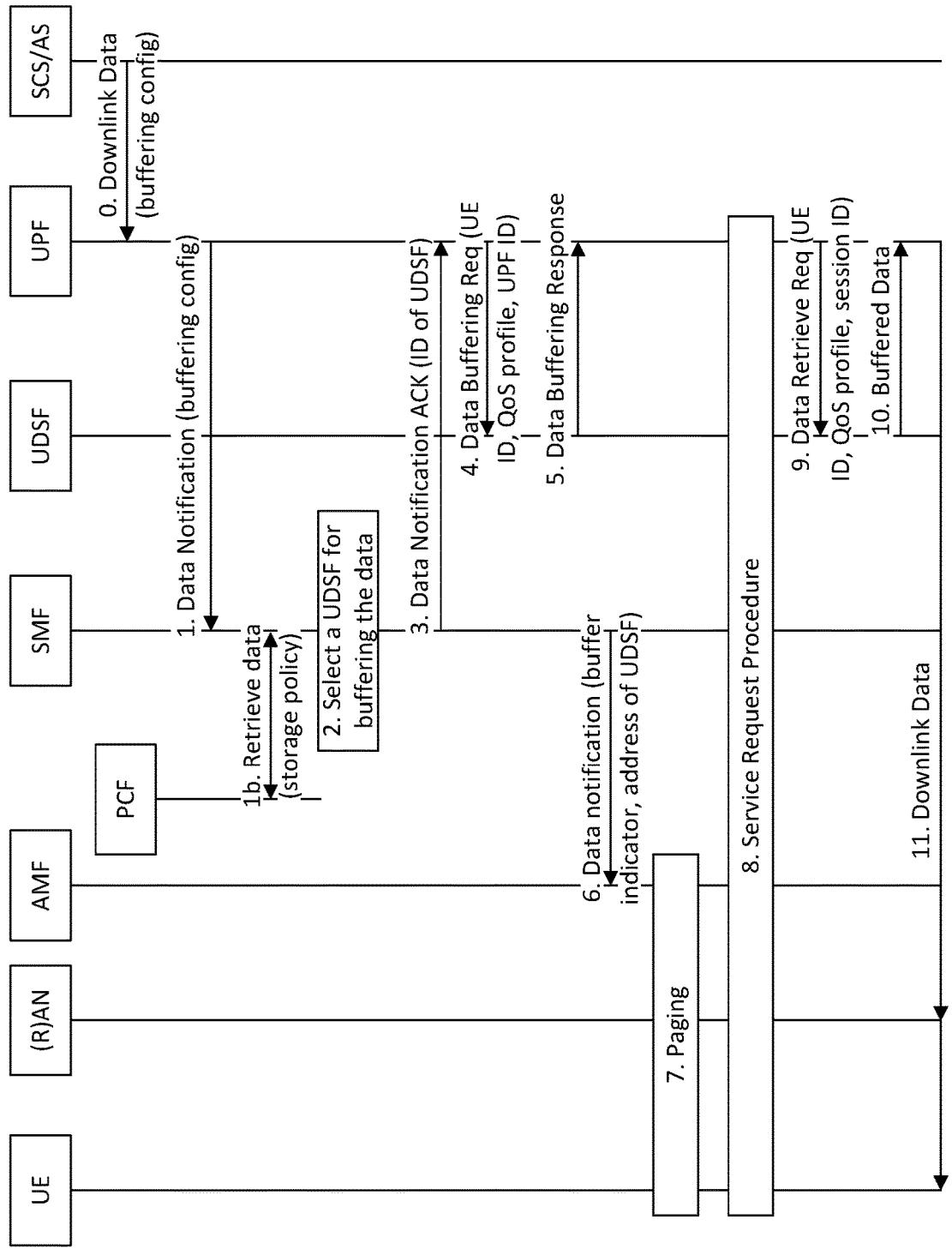
FIG. 14 is a call flow illustrating one embodiment of a method for downlink data buffering at a UDSF without roaming.

FIG. 14 is a call flow illustrating one embodiment of a method for downlink data buffering at a UDSF without roaming, where the user plane session is terminated at a UPF in the network. As shown, in step 0, the SCS/AS generates the downlink data and sends the data to the UPF, which serves as the anchor point. The SCS/AS may indicate the preferred data buffering method for the UE with the following information:

UE ID
PDU Session ID
Application ID
Application information: for the same UE and SCS/AS, data for different applications may be buffered at different places
Maximum buffering time: SCS/AS may propose the maximum buffering time to the network.

In step 1, since the UE is in IDLE state, there is no active connection between UE and AMF, thus no active PDU session. The UPF notifies the SMF about the downlink data. The address of the SMF could be determined based on the UE ID and session ID provided by the SCS/AS. Similarly, the UPF could insert some information related to the data buffering scheme as discussed in step 0.

Optionally, as illustrated in step 1b, the SMF may contact the PCF to enquire about the data storage policy about the following information for the particular UE, SCS/AS and application:

Max size of data for the storage
Max duration that a DSF may buffer the data for a UE
Security policy to manage the buffered data: e.g., access control policy to specify whether a UE or a group of UE is allowed to get the data, whether any NFs or SCS/AS can delete the buffered data before sending the data to the UE.

In step 2, based on the DL data notification from the UPF, the SMF selects a UDSF and possibly a location within the UDSF for buffering the downlink data for the UE, which is in IDLE state. The selection could be performed based on the following considerations:

Location of the UDSF close to the UE
UDSF for any specific application or provider (SCS/AS)
UDSF that supports a particular access control policy, e.g., support roaming, local data network.

In step 3, the SMF responds to the UPF with the information discussed in step 2. In addition, the ID of the UDSF will be provided and possibly a location within the UDSF.

In step 4, the UPF sends data buffering request to the selected UDSF with the following information:

UE ID
UPF ID
SCS/AS ID
Quality of Service (QoS) profile
Time duration of the data buffering
A location with the UDSF. This location, or identifier, may point to data that is already buffered in the UDSF. When the location points to data that is already buffered, the request should be interpreted as an indication that the already buffered data should be replaced with the new data.
Security profile for the buffered data as well as for the session over which the data will be sent In step 5, the UDSF responds the UPF to confirm that it stored the downlink data for the UE. In addition, the UDSF may provide a form of ID (e.g., URL) assigned to the newly buffered data. This ID will facilitate other NFs to access the data in case there are a large amount data buffered in the UDSF, each of which is identified by a URL.

In step 6, the SMF notifies the AMF that there is a downlink data for a particular UE, which is in IDLE state. This step is a follow-up step of step 2, where the SMF is notified of downlink data.

In steps 7 and 8, the AMF triggers the paging procedure, which further triggers the service request process initiated by the UE. During the paging procedure, the AMF will notify the UE that there are some buffered downlink data for it. Specifically, the type of data (i.e., IP or non-IP) is also present.

In step 9, once a PDU session is created during the service request procedure, the UPF sends a data retrieval request to UDSF to obtain the buffered data identified by the URL.

In step 10, the UDSF sends the buffered data to UPF.

And, in step 11, the UPF sends the downlink data to the UE via RAN over the established PDU session.

Figure 15:
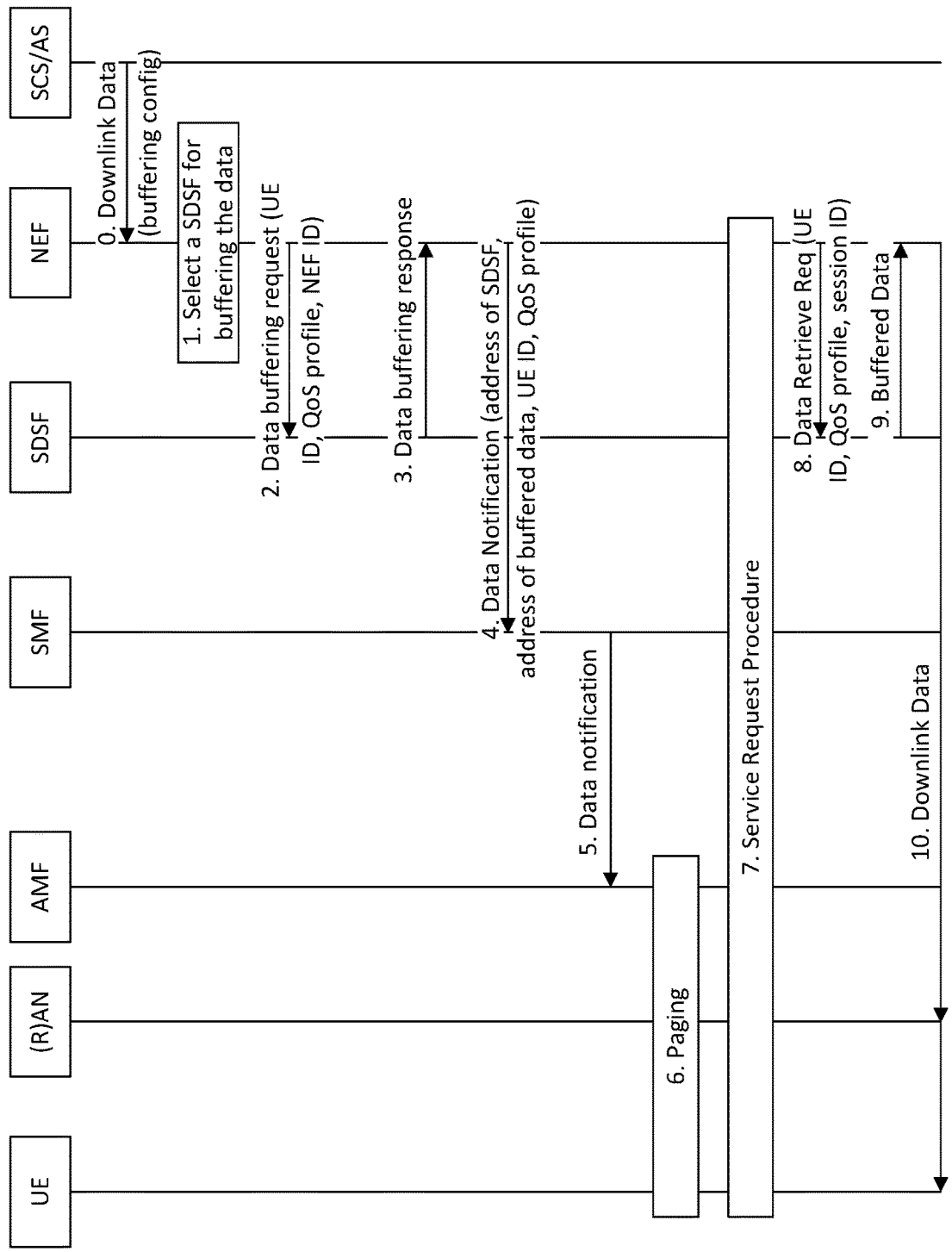
FIG. 15 is a call flow illustrating one embodiment of a method for downlink data buffering at a SDSF without roaming.

Alternatively, the UDSF selection may be done by the AMF instead of by the SMF if the SMF is not capable of performing the selection. For the non-IP data, if the AMF is involved in the data path for NIDD as illustrated above in connection with FIGS. 9 and 10, it is possible that the AMF directly retrieves the data buffered at the UDSF and then sends the data to the UE;

FIG. 15 is a call flow illustrating one embodiment of a method for downlink data buffering at a SDSF without roaming, where the NEF-AMF-UE is shown as the user plane path for illustration. In general, the method is substantially the same as the method shown in FIG. 14, except that the step 2 includes a NEF ID instead of UPF ID.

Figure 16:
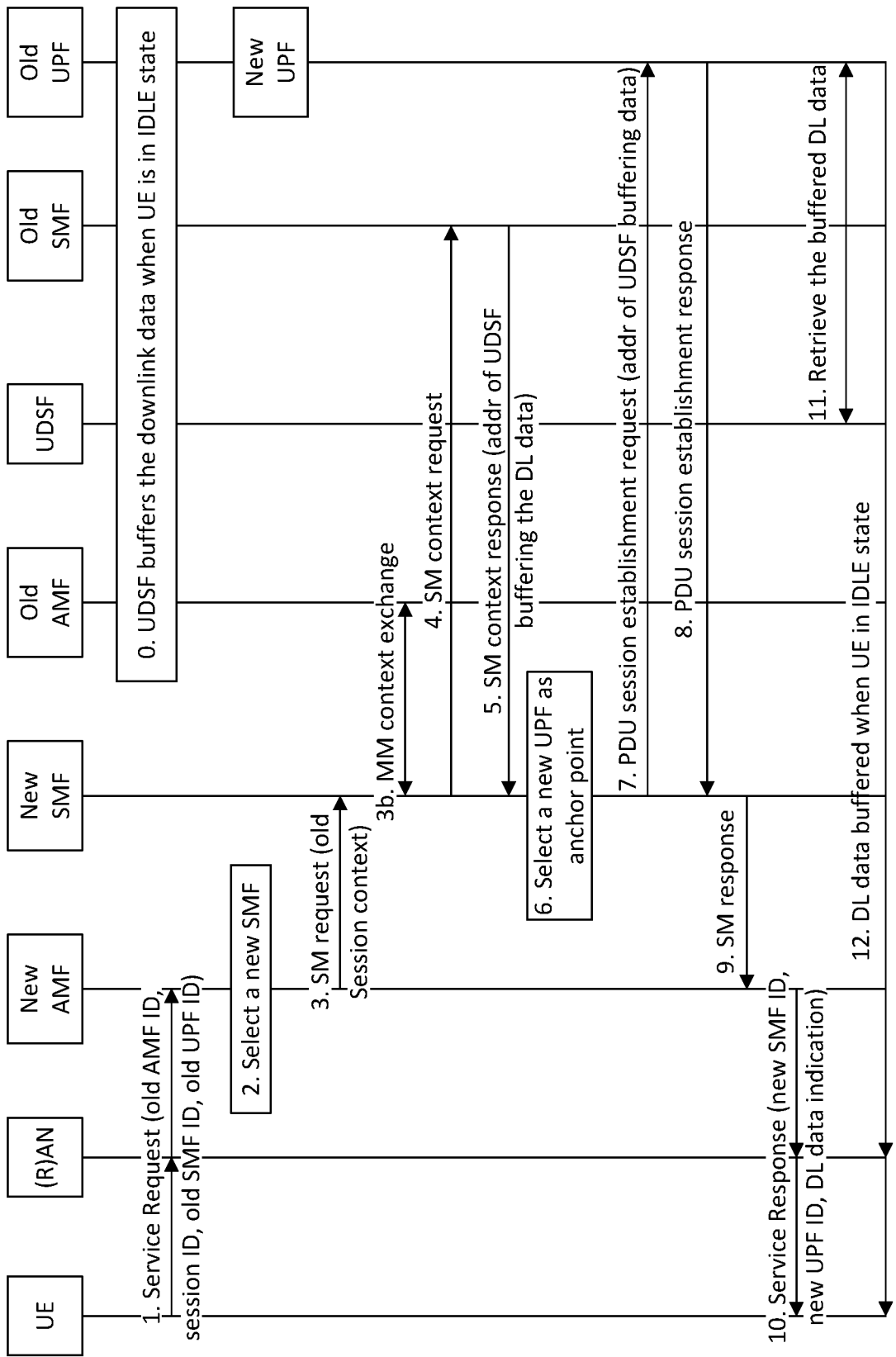
FIG. 16 is a call flow illustrating one embodiment of a method for downlink data buffering at a UDSF with roaming.

FIG. 16 is a call flow illustrating one embodiment of a method for downlink data buffering at a UDSF with roaming. In this embodiment, the UE is roaming in the IDLE state.

Note that the call flow focuses on the data buffering aspect, so some signaling about MM and SM are not shown in the figure, such as potential interaction between new AMF and old AMF for exchanging MM context, and potential messages between new AMF and old SMF for releasing the old PDU session.

As shown, in step 0, the old UPF buffered the downlink data at the UDSF when the UE is in IDLE state. This step follows the detailed process shown in FIG. 14.

Next, in step 1, the UE triggers the service request process by sending a service request to AMF via the RAN. Due to the mobility, it is assumed that a new AMF may be serving the UE. While the UE may not know it will be served by a new AMF, instead, it may provide the following information:

Old AMF ID
Old SMF ID
Old UPF ID
Session ID: this optional parameter could be the old session ID or a new session ID generated by the UE if the old session is released.
Old session context that UE has related to the old PDU session
Old network slice ID In step 2, the new AMF will select a new SMF to establish a PDU session upon receiving the service request message from the UE.

In step 3, the new AMF send SM request to the selected SMF for establishing a new PDU session, providing the information received in step 1. In step 3b, the new AMF exchanges the MM context information with the old AMF, such as suspended service request initiated by the network. This is not related to the data buffering aspect.

In step 4, the SMF gets the SM request, and sends SM context request to the old SMF to retrieve some session context stored in the old SMF.

In step 5, the old SMF returns a response message, which may include the following information:

Session context for the old PDU session
Address of the UDSF that is buffering the downlink data for the UE
Data buffering indication, which indicates that there are some downlink data buffered for the UE when UE is in IDLE state
ID of the buffered data in the UDSF: this is used to find and access the data stored at the UDSF In step 6, the new SMF selects a new UPF as the anchor point, and assign the IP address for UE and destination SCS/AS. In case of non-IP PDU session, the new SMF may follow the process presented above, for example in FIG. 11, to establish a new non-IP PDU session.

In step 7, the new SMF sends session establishment request to the selected UPF with the information received through steps 5 and 6.

In step 8, the UPF returns the response to the new SMF.

In step 9, the new SMF returns SM response to the new AMF notifying the AMF that the new session is established with new UPF ID.

In step 10, the new AMF returns the session context to the UE along with the service response, which may include the following information:

New SMF ID
New UPF ID
Downlink data buffering indication

In step 11, the new UPF retrieves the buffered DL data from UDSF, and in step 12, the new UPF sends the buffered DL data to the UE via the RAN.

It is worth noting that the method shown in FIG. 16 may take place along with the UE initiated service request assuming the UE is in the transition from IDLE state to CONNECTED state. It is also possible that the UE and/or SCS/AS configures the data buffering scheme during some Mobility Management (MM) procedures (e.g., registration and network initiated service request) and/or Session Management (SM) procedures (e.g., PDU session establishment/modification) proactively. Therefore, the core network entities could follow the configuration when receiving some downlink data while the UE is in the IDLE state.

As described above, the DL data buffering may comprise a service provided by a DSF (e.g., a UDSF or a SDSF). In general, this service allows the consumer to store and retrieve DL data that is buffered for a UE in the IDLE state. This aspect of the service is illustrated, for example, in steps 4 and 5 of FIG. 14 and steps 2 and 3 of FIG. 15. Consumers of the service may include the SMF, NEF, or UPF. As described, the method employs a request-response mechanism to provide the DL data buffering service.

It is understood that the entities performing the steps illustrated in FIGS. 14-16, such as the UE, AMF, SMF, UDSF, UPF, PCF, and the like, may be logical entities that may be implemented in the form of software (i.e., computer-executable instructions) stored in a memory of, and executing on a processor of, an apparatus configured for wireless and/or network communications or a computer system such as those illustrated in FIG. 29 or FIG. 34. That is, the method(s) illustrated in FIGS. 14-16 may be implemented in the form of software (i.e., computer-executable instructions) stored in a memory of an apparatus, such as the apparatus or computer system illustrated in FIG. 29 or FIG. 34, which computer executable instructions, when executed by a processor of the apparatus, perform the steps illustrated in FIGS. 14-16. It is also understood that the functionality illustrated in FIGS. 14-16 may implemented as a set of virtualized network functions. The network functions may not necessarily communicate directly, rather, they may communicate via forwarding or routing function. It is also understood that any transmitting and receiving steps illustrated in FIGS. 14-16 may be performed by communication circuitry of the apparatus under control of the processor of the apparatus and the computer-executable instructions (e.g., software) that it executes.

As discussed in the Background, a network may suspend the network triggered service request process with the RAN and a UE, and may resume the service request procedure with the RAN and the UE (i.e., synchronizes the session context with the RAN and the UE) when the UE enters the CM-CONNECTED state. However, it has not been clear how to resume the process if a UE is roaming when in the CM-IDLE state. Described herein is a method of resuming the network triggered service request process with roaming. The method follows essentially the same steps as shown in FIG. 16, except the data buffering steps are not performed and a new step 3b is performed. In the new step 3b, the new AMF sends a MM context request message to the old AMF. The new AMF gets this information in step 1. The old AMF may send the stored N11 message to the new AMF, which includes the MM context information, SM information and tunnel information between the RAN and the old UPF. Based on the information from the old AMF, the new AMF is able to figure out that there was a network initiated service request process that was suspended, and the new AMF may integrate the MM context and SM context into the new MM context and SM context.

Figure 17:
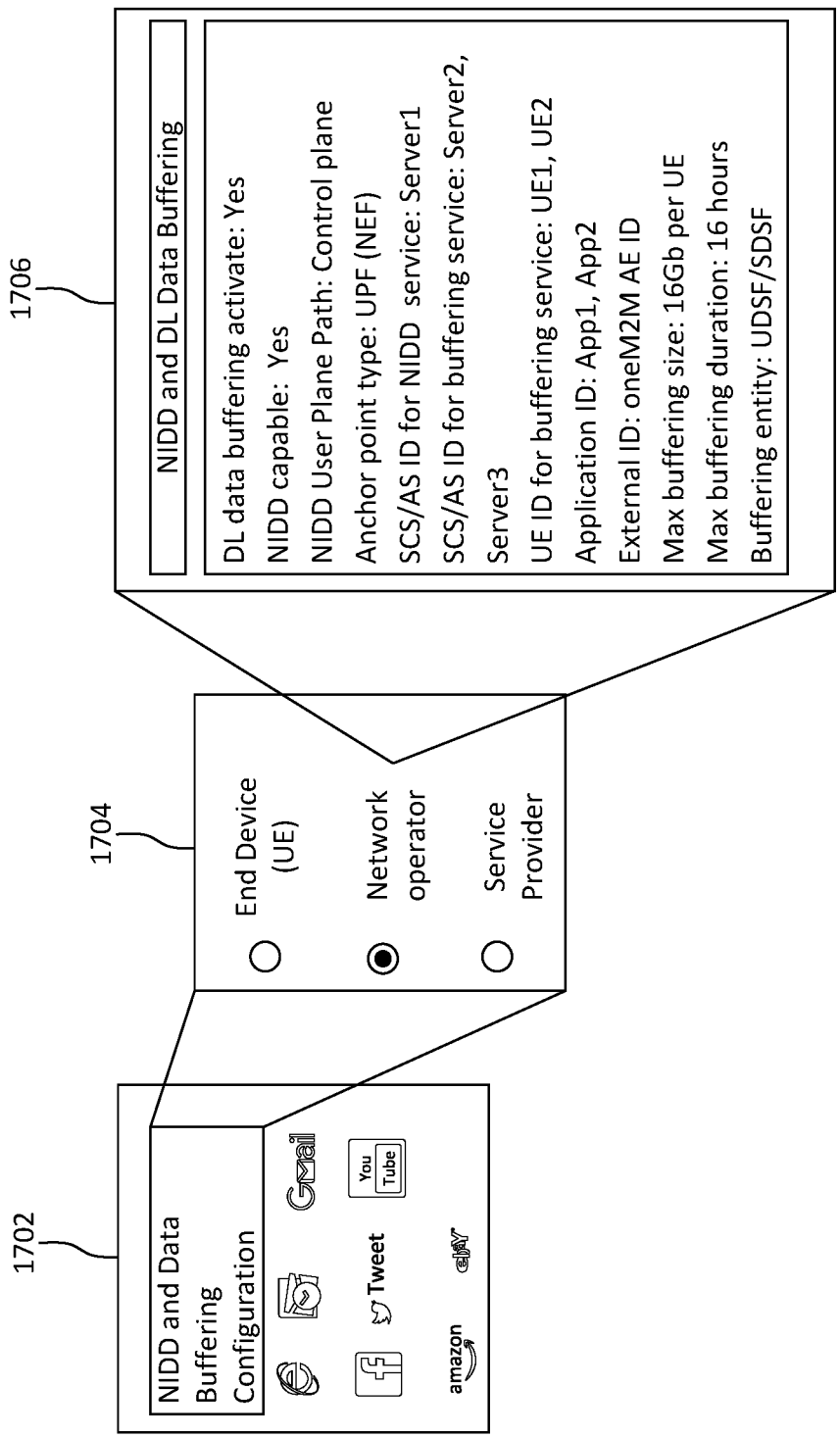
FIG. 17 is a diagram illustrating an example user interface for configuring a NIDD and data buffering service.

FIG. 17 is a diagram illustrating an example user interface for configuring a NIDD and data buffering service. The example user interface may be displayed on a display, such as for example, the display 128 of FIG. 29 or the display 86 of FIG. 34. As shown, a user may select an option 1702 for "NIDD and Data Buffering Configuration" from the user's display screen. Upon selection of that option, the user may be presented with a pop-up window 1704 that provides the user with the ability to set preferences and provide information for different entities involved in the methods presented herein, such as the UE, Network Operator, and Service Provider. For example, selecting "Network Operator" may then present the user with another window 1706 that displays configuration parameters for NIDD and/or data buffering. The user may view current settings and change one or more of the available settings via this user interface.

Figure 18:
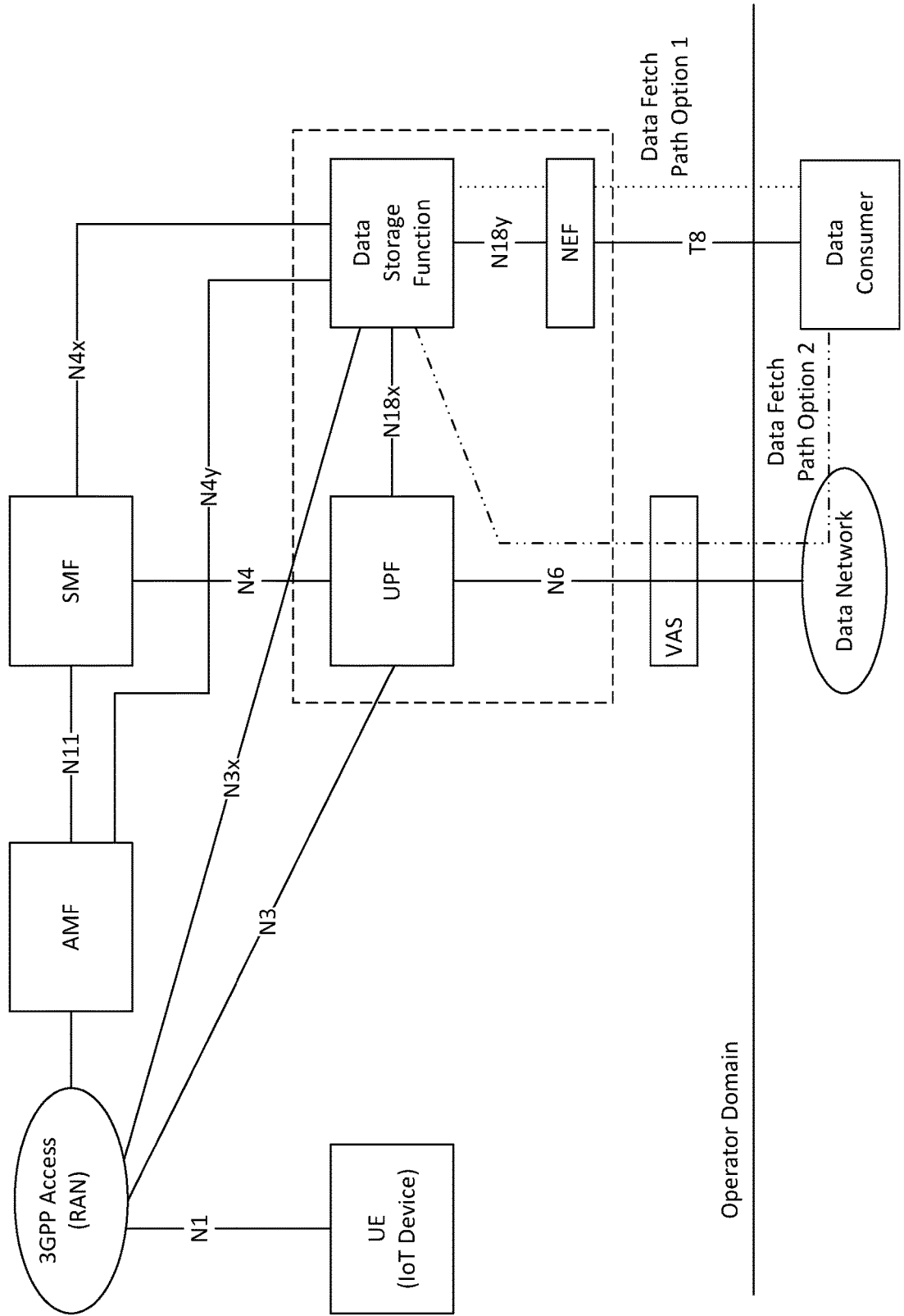
FIG. 18 illustrates an example enhanced 5G architecture.

In accordance with another aspect, FIG. 18 is a diagram illustrating how the 5G Core Network Architecture may be enhanced to support in-network storage of data from IoT devices. Enhancements are introduced to enable UEs to store data in a DSF and to enable Data Consumers to retrieve the stored data from the DSF. Each enhancement may include different options, such as a user plane option and a control plane option. Such options may be considered when enabling a UE to send data to the DSF so that the DSF in the network may be used to store data from IoT Devices.

In a user plane option, the UE may communicate with the DSF via a UPF, as shown in FIG. 18. However, it should be appreciated that the DSF may be integrated with a UPF or that the UE may communicate with the DSF directly via an interface, such as an N3x interface.

In a control plane option, the UE may communicate with the DSF via an AMF and NAS messaging. The AMF may forward data to the UPF via an interface, such as an N4y interface, or to the SMF via an interface, such as an N11 interface; this is also shown in FIG. 18.

By allowing the UE to store its data (e.g., sensor readings) in the DSF, the UE may only need to send its data over the air one time. After the data is stored in the DSF, Data Consumers may read the information directly from the DSF rather than interfacing with the UE. Decreased over the air activity may save bandwidth usage, increase battery life of the UE, and potentially increase reliability.

FIG. 18 illustrates two different example embodiments for how Data Consumers may access data that is stored in a DSF. These example embodiments may be independent of the UE data communication options described above and may be used via either User Plane or Control Plane. In a first example embodiment, labeled "Data Fetch Path Option 1", the Data Consumer may access the Data Storage Function via T8 interface API calls. The NEF may perform functions such as security, encryption, decryption, charging, access control checks, media or MIME type, protocol bindings (HTTP, CoAP), compression/decompression, etc. In a second example embodiment, labeled "Data Fetch Path Option 2", the Data Consumer may access the Data Storage Function by accessing an internet address (e.g., a URI via standard internet protocols, such as HTTP or CoAP). When the request to access the DSF reaches the operator's network, the request may be processed by Value-Added Services (VAS) in the operator's network. Examples of VASs may include security, encryption, decryption, and charging, among other VASs.

In an aspect, systems and methods are introduced to enable a UE to send data to a network, via a user plane or via control plane NAS messaging, to be stored in a DSF. Embodiments described herein describe how the UE may request the service from the network slice when the UE registers with the network, may establish the PDU session to send data to the DSF, and may send data to be stored in the DSF (e.g., via the user or control plane).

Figure 19:
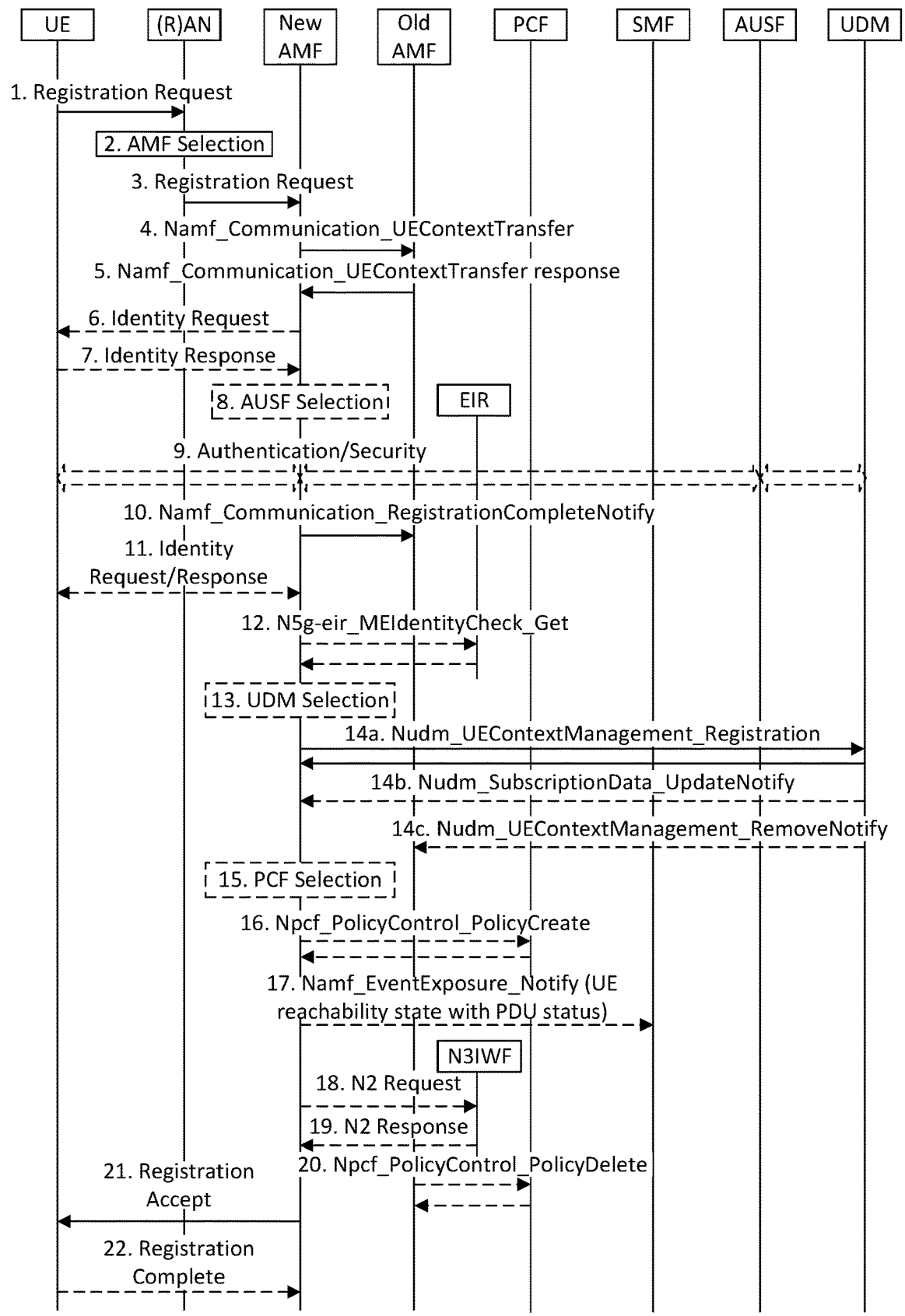
FIG. 19 illustrates an example general registration procedure.

FIG. 19 illustrates a general 5G registration procedure, as defined by 3GPP. In an embodiment, an indicator is introduced such that, during the General Registration procedure, the UE may indicate to the network that the UE wants to connect to a slice that allows the UE to store data in a Data Storage Function (DSF). Such an indicator may be introduced in the Registration Request (e.g., step 1 of FIG. 19) or it may be indicated in an S-NSSAI within the NSSAI that is included in the Registration Request message. For example, the SD field of an MIoT S-NSSAI may indicate that the UE would like to store data in a DSF. The UE may also indicate the details of the storage service that it wants or has been configured with. The UE may do so for both structured and unstructured data. For example, the UE may indicate the number of messages, size per message, total size, time per message to keep individual messages, media or MIME type, total time to store all messages, and other relevant information. The UE may also indicate details about how the UE wants the data to be consumed, e.g., by which devices, how long after storage is the data tagged as "expired" per consumer, and other relevant considerations. Alternatively, such information may be kept in the UE's subscription information in the UDM and retrieved based on the NSSAI. For example, the SD field of the NSSAI may be a pointer to information in the UDM that configures the service. The UE may send the point to the network when activating the server. An NF (such as an AMF, SMF, or other network function) may retrieve such information from the UDM when determining how to configure the service. It should be appreciated that the consumer of the information could be a UE, thus the consumer may be identified by SUPI, external identifier, IMSI, or other relevant entity.

In an alternative embodiment, the UE may provide an in-network storage indication as part of its registration request. The AMF may query the UDM to determine the requirements of the UE (e.g., number of messages, size per message, total size, time per message to keep individual message, media or MIME type, total time to store all messages, and other relevant requirements) and potentially select one or more DSFs to act as storage for the UE. In the registration request, the AMF may include details about the allocated storage, such as how much storage was allocated, how long the storage was allocated, and a Storage Location Identifier for the storage location. Such details may be indicated separately for unstructured and structured data so that the network may determine how much of each data storage to allocate.

When the AMF sends a Registration Accept message (e.g., step 21 of FIG. 19) to the UE, the network may indicate to the UE if the network supports the UE sending data to a DSF and what methods may be used to send data to a DSF. For example, the network may indicate that control plane messaging may be used to send data to a DSF or that user plane options may be used to send data to a DSF. The UE may then use this information to decide what type(s) of PDN connections to subsequently request. Alternatively, the UE, when later establishing a PDN connection, may indicate what types of PDN connections the UE may support (e.g., control plane, user plane, UPF terminated, NEF terminated, or DFS terminated) and that the UE wishes to send data to a DSF. The network may then be allowed to choose what type of PDN connection may be used. The network may signal to the UE, in the PDU Session Establishment Accept message, what type of PDN connection the UE should use.

The following information may be included as part of subscription/user information stored in the UDM. Such information may be associated with UEs that desire to use in-network storage at a DSF. Subscription/user information may comprise:

- an indication that in-network storage is allowed at the DSF;
- an identifier for each application running on a UE;
- a physical location of a UE (for UEs that are non-mobile and non-portable, and that remain in a fixed location), and such location information may be used by a network to determine where the associated storage (DSF) should be located; and
- a list of identifiers of devices (e.g., SCS/AS, or M2M Server, or AF, or IoT Server) that may consume the data. It should be appreciated that UE applications may also consume the data. Thus these identifiers may identify a UE or UE application. Additionally, other DSF's may be identified so that they may consume the data. For example, a second DSF may copy data from a first DSF so that the data may be consumed by an AS that is in the same network as the second DSF or is physically closer to the second DSF.

Additionally, for each application, the following information may be stored:

- the maximum storage requirement for the application;
- the default behavior for storage (e.g., overwrite in DSF or append in DSF);
- whether stored data requires encryption;
- whether Data Consumers may issue subscription requests to the data;
- access control limits on the data (e.g., to determine Data Consumers allowed to access the data);
- the identity of the DSF serving the application data;
- whether the storage operation requires a confirmation/acknowledgement;
- a qualifier for the type of data stored by the device, for example to assist in discovery; and
- a priority of the application. The network may reject lower priority applications if network resources are low (e.g., during times of congestion or if memory resources in the DSF are low). A statistics summary may be sent back to the UE so that the UE may not go to connected mode (and hence generate signaling or use battery) if the UE determines that the network resources are not available for low priority applications. A back-off timer may be sent to the UE so that the UE may determine when it is acceptable to try to connect again.

Alternatively, or additionally, the above information may also be defined for a UE and its applications.

At least some of the above information may be pre-provisioned in the network (e.g., storage requirements for a UE), provided during the initial registration of the UE (e.g., overwrite data in DSF), provided during periodic registration procedures, provided during registration procedures that are triggered by mobility events, provided when data is sent to the network, or determined dynamically by the core network (e.g., the identity of DSF).

The AMF may obtain such information during a general registration or PDU session establishment procedure and may use the information to determine to allocate network storage for the UE. If this information is provided during the registration procedure, the information may be provided to the AMF by the UDM in the Nudm_SubscriptionData_UpdateNotify message, shown in step 14 of FIG. 19.

Figure 20:
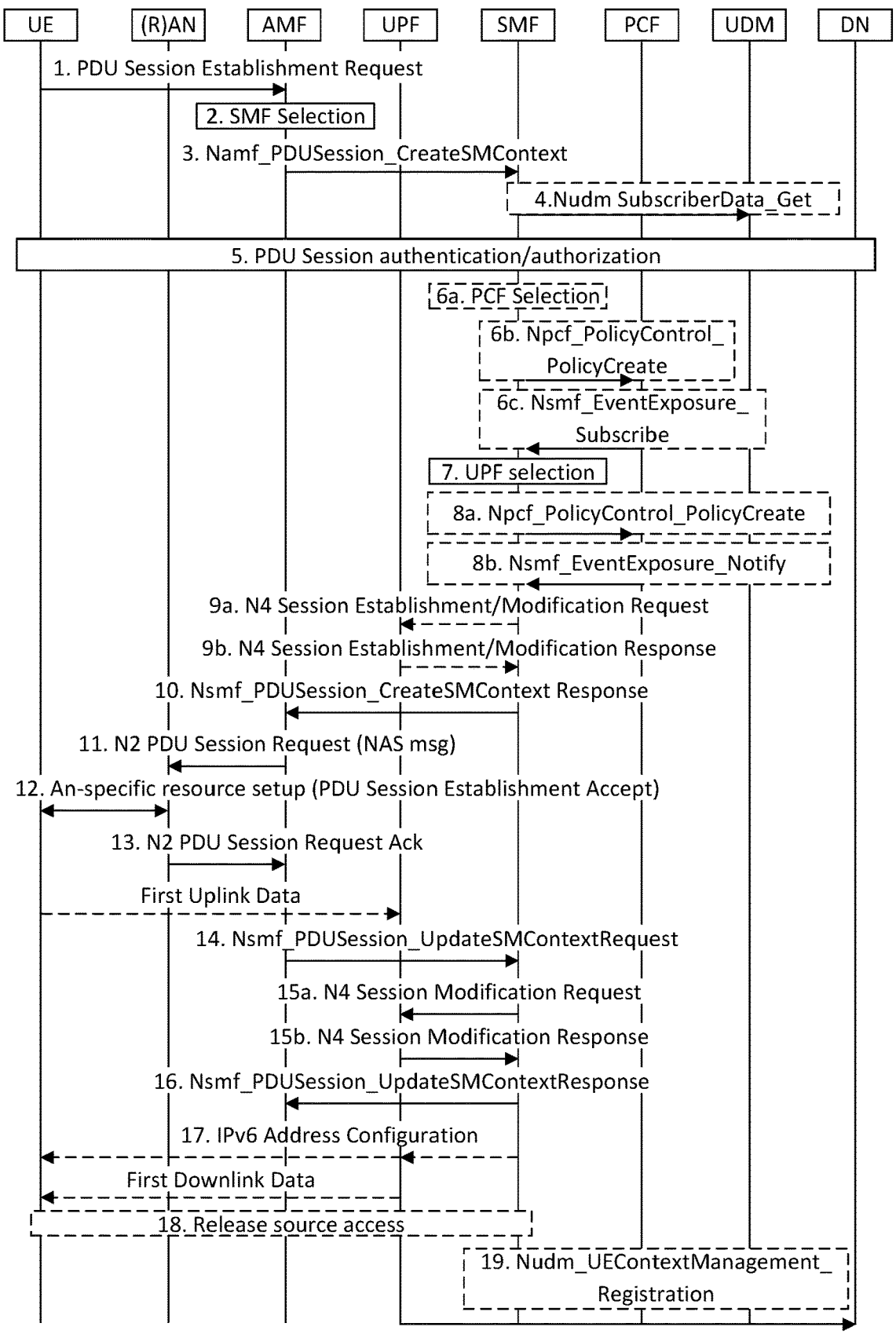
FIG. 20 illustrates an example session establishment procedure.

As discussed above, FIG. 11 shows how a session may be established in order to send and receive non-IP data. FIG. 20 illustrates how a 5G PDU session establishment procedure, as defined by 3GPP, may be further modified to support establishing a session that supports in network data storage. Modifications to the PDU Session Establishment procedure are introduced for the MIoT case so that, when the UE establishes PDU sessions within the MIoT slice, the UE may perform one of the following.

In a first example embodiment, the UE may establish two PDU sessions to the MIoT slice by executing the PDU Session Establishment procedure two times. One PDU session may provide the UE with IP connectivity to the data network (DN), and the other PDU session may provide the UE with a connection to the DSF. When establishing the PDU session to the DSF, message 1 in FIG. 20 may be modified so that the UE may include an indication in the NAS request message to indicate to the network that the PDU session is for sending data to the DSF. The following example options may be deployed. In an embodiment, the PDU session that is established between the UE and the DSF may be via the AMF and over the control plane and the N11, N4x, and N4y interfaces. In this example embodiment, the UPF in FIG. 20 may be replaced with a DSF. In another embodiment, the PDU session that is established between the UE and the DSF may be via a UPF and over the user plane and the N3 and N18x interfaces. In this example embodiment, the UPF in FIG. 20 may include an integrated DSF. In an additional embodiment, the PDU session that is established between the UE and the DSF may be direct and over the user plane and the N3x interface. It should be appreciated that the N3x interface may also be considered a control plane interface. In this example embodiment, the UPF in FIG. 20 may be replaced with a DSF.

In a second example embodiment, the UE may establish a single PDU session by executing the PDU Session Establishment procedure. Message 1 in FIG. 20 may be modified to include an indication that the PDU session should provide the UE with both IP connectivity and a connection to the DSF.

In either case, when the AMF sets up the PDU session with the SMF, the Nsmf_PDUSession_CreateSMRequest, or Namf_PDUSession_CreateSMContext, (e.g., message 3 in FIG. 20) from the AMF to the SMF may be updated to indicate to the SMF that a connection to the DSF is required. This indication may be part of the S-NSSAI, as described above. When the SMF receives such an Nsmf_PDUSession_CreateSMRequest request, the SMF may select a DSF and then send a new allocate storage request message, to the DSF to allocate storage for the PDU session. The DSF selection may be based on one or more of the following: the requirements of the UE; the capacity/capability of the DSF; and the location of the UE and DSF (for example, for latency issues, the network may select a DSF that is closer to the UE).

The allocate_storage_request message may be a new request message (i.e., not shown in FIG. 20) that is sent via the N4x interface as shown in FIG. 18. The request may indicate how much storage needs to be allocated. The SMF may determine how much storage to allocate based on an indication from the UE (for example, the storage amount may have been included in the SD field of the S-NSSAI), based on subscriber information that was obtained from the UDM, or based on provisioned polices. The request may also include the Subscriber Permanent ID and PDU Session ID. The PDU Session ID may be used by the DSF to correlate the storage allocation request to the data storage request that may later be received from the UE. If the PDU Session ID is not used, then some other identifier may be used to correlate the storage allocation request to the data storage request that may be received later from the UE. For example, the DSF may reply to the SMF with a new message, allocate_storage_response. The new message may include information such as how much storage was allocated, how long the storage was allocated for, and a Storage Location Identifier for the storage location. Such a Storage Location Identifier may be an alpha numeric string and may be a URI. The Storage Location Identifier may be set to the PDU Session ID. The Storage Location Identifier may be provided to the UE by the SMF. The UE may use the Storage Location Identifier to indicate where the UE data should be stored, as described below. Data Consumers may use the Storage Location Identifier to indicate what data the Data Consumers would like to retrieve, also described below.

It should be appreciated that the Storage Location Identifier may be formatted such that it identifies a DSF and a location within the DSF. The UE may then use the identifier to identify what DSF the data should be sent to and where the data should be stored within the DSF. If the identifier is structured in this way, the UE could replace, or overwrite, data that was previously stored in the DSF. For example, the identifier may be formatted as LOCATION@DSF-NAME. If the UE sends two messages to write data to the same LOCATION@DSF-NAME, then the data in the second message may overwrite the data in the first message. It should be appreciated that the location field of the identifier might not be translated to the physical location by the DSF based on DSF polices.

The PDU session ID in the request may identify a previously established PDU session to the DSF. When the UE provides such a PDU Session ID to the network, this may trigger the network to retrieve data stored in the DSF for the PDU session and transfer (i.e., move, relocate) the data to another DSF that may be used for a re-established session. The network may choose to use a different DSF for the PDU session for various reasons, for example, to account for a change in UE location, to account for a change in usage or allocation of network resources, because the PDU is being managed by a different network slice, or for any other relevant reason.

Referring to FIG. 20, in step 10, the Nsmf_PDUSession_CreateSM Response from the SMF to the AMF may be updated to include an indication of whether or not storage was allocated in the DSF, and the message may include the newly introduced Storage Location Identifier. The presence of the Storage Location Identifier may indicate that storage was successfully allocated. The Nsmf_PDUSession_CreateSM Response may include N3x tunnel information that may be used by the UE to send data to a UPF. Such information may configure the connection to send data to the DSF, rather than a UPF. For example, the connection may be an IP tunnel, or the information may identify a DSF, a communication session with a DSF, and/or a storage location(s) within the DSF. In steps 11 and 12, the AMF may transmit the indication of whether or not storage was allocated in the DSF and may also transmit the Storage Location Identifier to the UE.

It should be appreciated that the request from the UE may indicate that multiple data store locations are requested in the DSF (e.g., to hold different measurements). When multiple locations are requested, multiple Storage Location Identifiers may be allocated and provided to the UE. The request may also indicate a type of data to be stored in each location, how much data will be stored in each location, how long the data should be stored, and how the data should be stored. The phrase, "how the data should be stored" may refer to whether the data should replace previously stored data, be appended to previously stored data, and/or be stored and read out in a FIFO or LIFO manner.

It should also be appreciated that the PDU Session Establishment procedure may be initiated by the actions of a UE Application. For example, the procedure may be initiated when a UE Application requests to send data or allocate storage in the network.

It should additionally be appreciated that there may be situations where the PDU session is not dedicated to sending data to the DSF. For example, a regular PDU session that may be used to send IP data to the internet may also be used to send data to the DSF. The DSF may have an associated IP address. The UE may have a URI provisioned on it for the DSF. The UE may use a DNS lookup to resolve the URI of the DSF to an IP address so that the UE may determine what IP address to use to send data to the DSF. The UE may have a GUI that allows the user to enter the IP address or URI of a DSF. The GUI may further allow the user to configure a DSF URI or DSF IP Address for specific applications that are hosted in the UE. Data may then be sent from the UE to the DSF in protocols such as HTTP or CoAP.

In an aspect, systems and methods are introduced to enable a UE to send data to a network, via control plane or via user plane NAS messaging, to be stored in a DSF. An advantage of the control plane approach may be that the UE sends data in the same message that the UE may use to contact the AMF, thus reducing the overall number of messages that need to be sent between the UE and network. If the UE used the user plane to send data to the DSF, the UE may first need to send control plane messaging to the AMF to establish contact with the network. An advantage of the user plane approach is that data and control plane messaging may remain relatively separated in terms of what NF's are involved with each type of messaging; thus resulting in a more scalable architecture.

In general, such methods may comprise transmitting, to a mobile core network, a first request message indicating a request to allocate storage in a data storage function (DSF) of the mobile core network; receiving a parameter indicating a location of allocated storage in the DSF; transmitting, to the mobile core network, a storage request to store data in the DSF; and receiving an indication the data was stored, wherein the indication comprises a data pointer identifying a location of the stored data.

Figure 21:
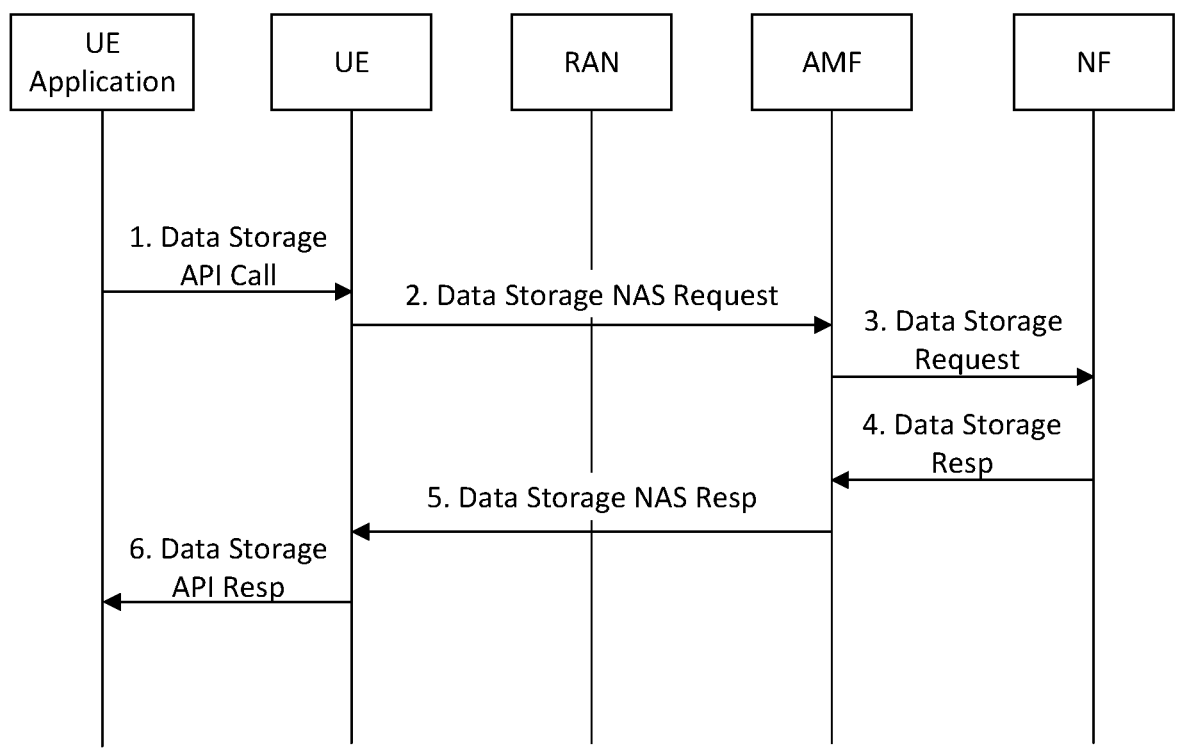
FIG. 21 illustrates an example call flow of a UE Application sending data to a storage function via a control plane.

As discussed above, FIG. 12 shows a procedure that may be used by a UE to send MO non-IP data. FIG. 21 shows an example call flow of how the procedure of FIG. 12 may be further enhanced to allow a UE Application to send data to a storage function via the control plane. For example, a UE Application that runs on a sensor may use such a procedure to stores environmental readings. Prior to this call flow, the UE Application may have called an API that may allow the UE to request that data storage be allocated, or reserved, in the network. Such an API may have provided the UE Application with a Storage Location Identifier that identifies the storage that was reserved for the application. Such a process may have occurred as part of the general registration procedure or during the PDU session establishment procedure, as they are described above.

At step 1, the UE Application may call a Data Storage API, which may comprise the following parameters (Storage Location Identifier, Data, Storage method, Data lifetime, Encryption Token, Data Type, Forwarding/Aggregation/Offloading Indication, Metadata Indication, Anonymization Indication, Discovery or Announcement Indication, Application Identifier, Target Data Consumers).

The Storage Location Identifier may identify a storage location where the data should be stored and may be associated with a previous request to allocate, or reserve, storage.

The Data field may be the data to be stored (e.g., a sensor reading).

The Storage method may indicate how the data should be stored, for example, if the new data should replace the old data or be appended to the any previously stored data.

The Data lifetime may indicate how long the data should be stored in the data storage function before being purged.

The Max data size may indicate the maximum amount of data to be stored. Information about rules for dealing with maximum buffer size may also be provided, e.g., delete oldest, delete all, and other feasible rules. Additional rules may specify if a data sample is to be deleted, for example, after N numbers of consumer readings have occurred.

The Encryption Token may be used by the UE to encrypt the Data. For example, the token may be hashed with a value in a SIM card and used to encrypt the Data.

The Data type may indicate the type of data to be stored.

The Forwarding/aggregation/offloading indication may be provided by a UE application and may provide information about how accumulated data may be handled. For example, the address of an M2M Server and a data size or time duration may be provided, which may indicate a request to the DMF to send blocks of data to the indicated M2M server after data accumulates to the given size or for the given duration of time.

The Metadata indication may be provided by a UE application and may indicate if the metadata available at the DSF (e.g., storage timestamp) should also be stored with the data and provided to authorized consumers. The indication may be global (i.e., use all metadata available), or the UE may be able to specify exactly what type of information may be included. In the latter case, the indication may also authorize the DSF to obtain certain types of information from other NFs, e.g., location information, and append that information to the stored data.

The Anonymization indication may indicate if data should be anonymized by the network before storage.

The Discovery or announcement indication may indicate how the DSF should handle the Data when exposing the Data to other entities. For example, such a parameter may indicate if other entities should be allowed to discover the data or if the DSF should be allowed to announce the data to other entities.

The Application identifier may identify a UE application when the UE hosts more than one application.

The Target consumers may identify what Application Servers are allowed to read the data.

At step 2, the UE may transmit the storage request to the network in a NAS message to the AMF. The Storage Location Identifier may be mapped to another identifier that may identify the storage location. The UE Application may provide in the request an external M2M Server identifier (or an identity of another UE or another UE application) and a request type identifier instead of all the information listed above. In such a case, the DSF may contact the M2M server with the UE identity and the request type identifier based on which M2M Server may provide the information listed above for the given UE. The first time that the UE application makes a data storage request, the UE application may trigger the UE to first initiate a PDU establishment request, as described above. The request may include the information that was provided in step 1, or the information that was provided in step 1 may influence what S-NSSAI may be used to establish the PDU session. Alternatively, the AMF may query the UDM to determine the storage location associated with the UE and UE applications.

At step 3, the AMF may transmit the storage request to another NF for storage. Before sending the request, the AMF may use the Encryption Token and any vectors that were obtained from the AUSF or UDM to decrypt the data payload. At least the following options may be considered when deciding what NF the AMF should forward the data towards: (1) The AMF may forward the data directly to a DSF; (2) The AMF may forward the data to an NEF, which may then forward the data to a DSF, or the storage function may be a logical part of the NEF; and (3) The AMF may forward the data to an SMF that forwards the data to a DSF, UPF, or NEF.

At step 4, the NF may respond to the AMF with an indication of whether or not the data was successfully stored. The response may also include a Data Pointer that may identify the stored data.

At step 5, the response from the NF may be transmitted to the UE.

At step 6, the UE may respond to the UE Application's API call with an indication of whether or not the data storage request was successful and with the Data Pointer identifying where the data was stored.

Figure 22:
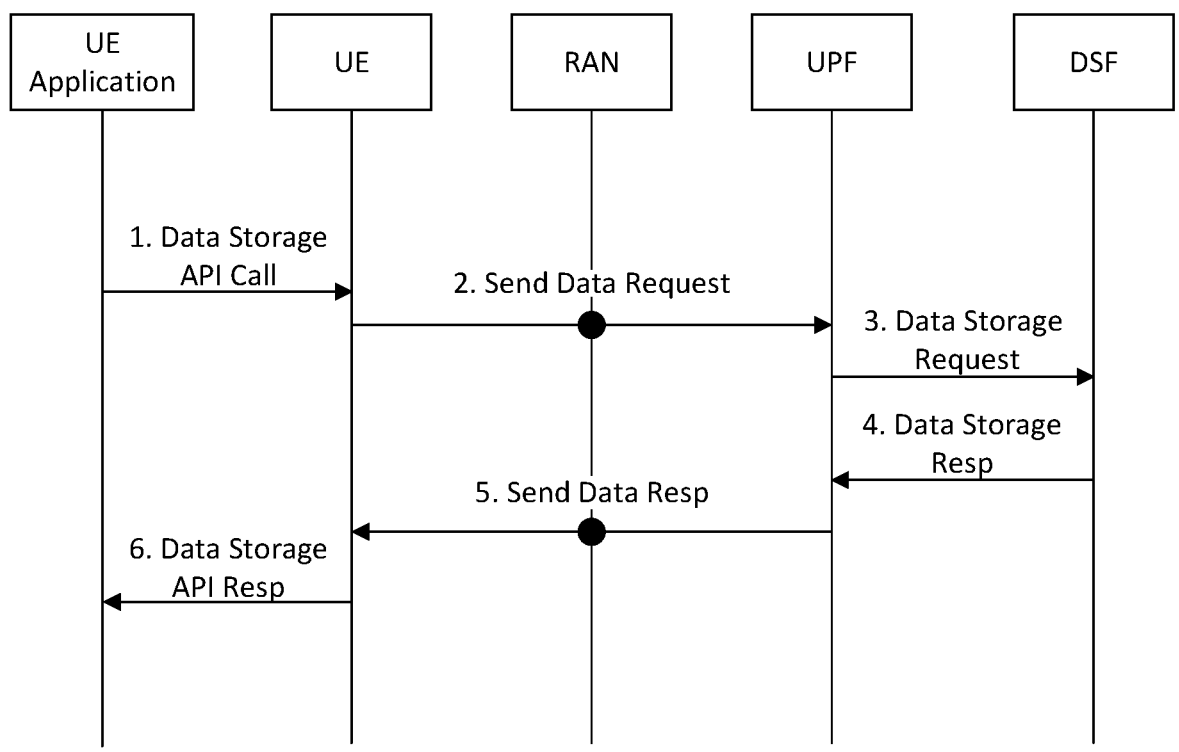
FIG. 22 illustrates an example call flow of a UE Application sending data to a storage function via a user plane.

As further discussed above, FIG. 13 shows a procedure that may be used by a UE to receive MT non-IP data. FIG. 22 shows an example call flow of how the procedure of FIG. 13 may be further enhanced to allow a UE Application may send data to a storage function via the user plane. It should be appreciated that the term "user plane" might not necessarily mean that data is transmitted or sent in an IP packet. Rather, "user plane" may refer to the path that the data takes. Because, in this example, data may not traverse a "control plane" network function and may terminate directly at a "user plane" network function (e.g., the UPF or DSF), this example may be considered a "user plane" option.

At step 1, the UE Application may call a Data Storage API, which may comprise the following parameters (Storage Location Identifier, Data, storage method, data lifetime, Encryption Token, Data Type, Forwarding/Aggregation/Offloading Indication, Metadata Indication, Anonymization Indication, Discovery or Announcement Indication, Application Identifier, Target Data Consumers). The parameters from step 1 of FIG. 21, above, may apply to this case as well.

At step 2, the UE may transmit the storage request to the network in packets, such as IP packet(s), to the UPF. The transmission may first be sent to the RAN, which may then forward the transmission to the UPF. The Storage Location Identifier may be mapped to N3 tunnel information by the UE. The message may be a RESTful message (i.e., CoAP or HTTP) with a particular media or MIME type (e.g., application/json, application/xml) that may address a particular resource. The resource identifier may be derived from the Storage Location Identifier. In an example alternative embodiment, the message from the UE to the RAN may include an indication that the message is not an N3 message, but is instead a message that should be sent directly to the DSF via the N3x interface. The N3x interface is a newly introduced interface between the RAN and DSF, and is shown in FIG. 18. After receiving the message, the RAN may then transmit the message to the UPF.

At step 3, the UPF may use the addressed resource or storage location information to identify the DSF and storage location with the DSF that is being addressed. The storage location with the DSF may be a resource that is identified in the resource name. The UPF may forward the data storage request to the DSF. The message to the DSF may be in the form of a database write.

At step 4, the DSF may respond to the UPF with an indication of whether or not the data was successfully stored. The response may also include a Data Pointer that identifies the stored data. As described in step 2, above, if the data was sent to the DSF directly from the RAN, the DSF may respond to the RAN.

At step 5, the response from the DSF may be transmitted or forwarded to the UE.

At step 6, the UE may respond to the UE Application's API call with an indication of whether or not the data storage request was successful and with the Data Pointer identifying where the data was stored.

In an aspect, systems and methods are introduced to enable Data Consumers to interact with a UE to determine what data is generated by the UE, determine where the data is stored, and gain permission to access the data.

As shown in FIG. 18, the UE may have IP connectivity to the data network, and thus, the Data Consumer and UE may communicate via an IP connection. Such a connection may be used to form a relationship between the UE and Data Consumer (i.e., Registration). The Data Consumer may register with the UE or the UE may register with the Data Consumer.

In an example embodiment, the Data Consumer may discover the UE, an identifier associated with the UE, and IP address associated with the UE, and the services (e.g., measurements) that the UE offers. After discovering the UE, the Data Consumer may register with the UE Application so that the Data Consumer may consume the UE's services (i.e., measurements or other information). This registration step may occur via messaging between the UE and Data Consumer. After a relationship is formed between the UE and Data Consumer, the following information may be provided to the Data Consumer by the UE.

Storage Location Identifier(s) and Data Descriptions may be provided. For example, the UE application may indicate what data it produces and provide a storage location identifier for each piece of data. In an example, this procedure may be used been an Application that senses the number of vehicles that pass a location and a server that is interested in receiving the information. The UE application may indicate that it produces traffic/vehicle volume information and may indicate the resource name where the traffic/vehicle volume information is stored. The resource name may point to a storage location in the DSF.

Storage Type may be provided. For example, the UE application may indicate how the data may be stored. Data may be stored such that only the latest value is stored or such that new values are concatenated with values that are already stored.

Data Format Information may be provided. For example, a media or MIME type (application/vnd.onem2m-res+xml) and an application protocol binding (HTTP, CoAP) may be provided.

Authorization Key(s) may be provided. For example, the UE Application may provide the Data Consumer with authorization keys that may be used to retrieve or decrypt data from the DSF. A key may also be provided for charging purposes. When the Data Consumer retrieves the data, the Data Consumer may provide the key to the mobile core network so that the Data Consume may be part of a CDR. The CDR may later be correlated with charging information that was captured by the UE application or Data Consumer.

A Slice Identifier may be provided. The slice identifier may identify the network slice that hosts the data. The slice identifier may be part of the Storage Location Identifier or may be resolved based on the Storage Location Identifier.

Figure 23:
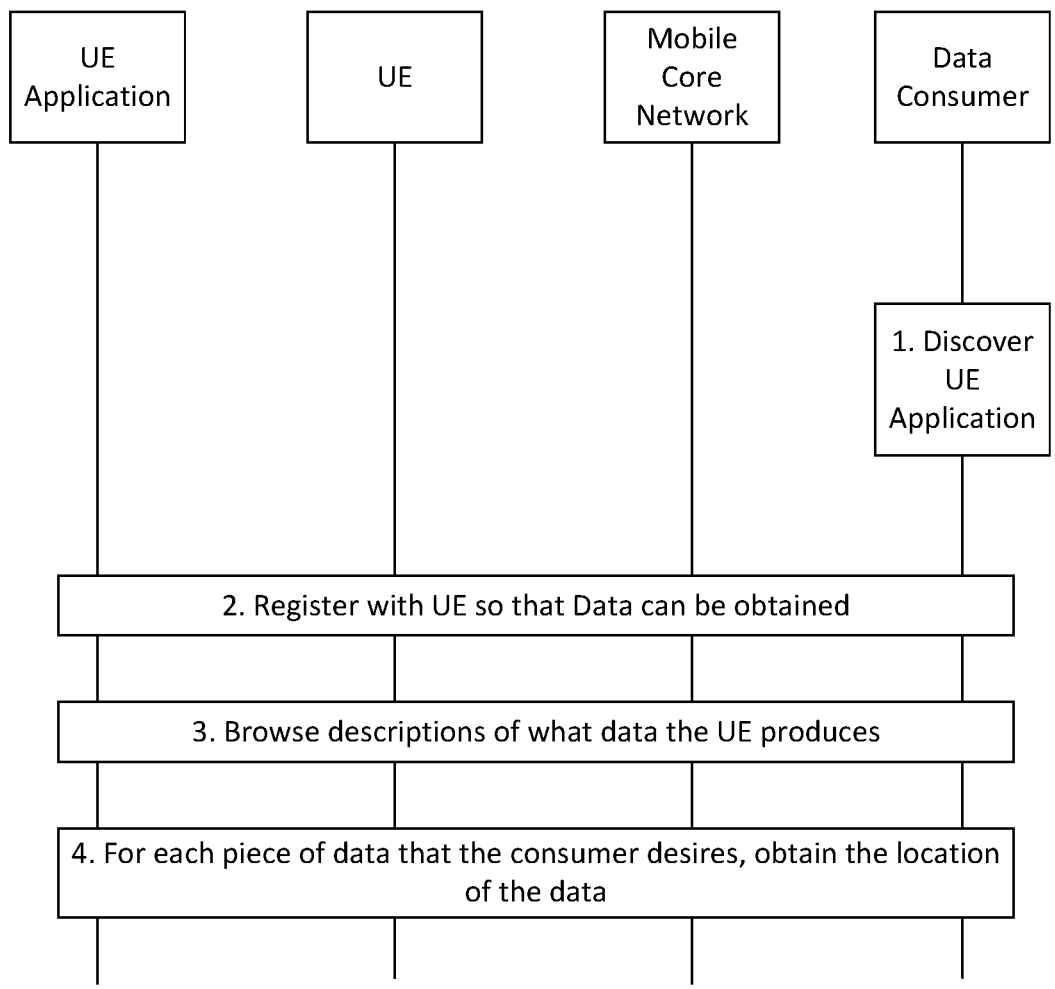
FIG. 23 illustrates an example sequence diagram of a Data Consumer obtaining data location information.

FIG. 23 shows an example sequence diagram of a Data Consumer discovering a UE Application, determining available services provided by the UE Application, and obtaining location information for data. At step 1, the Data Consumer may discover a UE Application at a UE. At step 2, the Data Consumer may register with the UE so that Data may be obtained. At step 3, the Data Consumer may browse descriptions of what data the UE produces. At step 4, for each piece of data that the consumer determines to obtain, the Data Consumer may obtain the location of the data.

In alternative example embodiments, the mobile core network may provide a lightweight discovery service for data that is stored in the DSF. In such embodiments, the mobile core network may expose discovery information through the NEF or via a DSF front end that may expose an IP based interface to M2M Servers. A Data Consumer may issue a Discovery Request to the NEF or DSF Front End, which may include the identity of the UE and the type of data to be consumed. The NEF may issue a query to the UDM, or another NF such as the NRF, to discover information matching the query. The UDM may use the access control limits to determine if the Data Consumer has the suitable access rights for discovering and accessing this data. The NEF may issue a Discover Response to the Data Consumer with the UE identity as well as the identity of the DSF to contact in order to access the data. It should be appreciated that the Data Consumer may be an application that is hosted in a UE that is different than the UE that hosts the data producer. Instead of connecting via the mobile core network, the Data Consumer and data producer may communicate directly via a suitable protocol, such as Bluetooth. The Data Consumer may use direct communication to obtain the location of the data and then use the procedures described below to obtain the data. It should also be appreciated that when the UE registers to the M2M server, the UE may set its Point of Access (PoA) attribute to the DSF identifier where the data is stored. Thus, the M2M Server may retarget requests that are directed at the UE to the DSF.

In an aspect, systems and methods are introduced to enable Data Consumers to read the information stored in the DSF directly from the DSF rather than interfacing with the UE.

Figure 24:
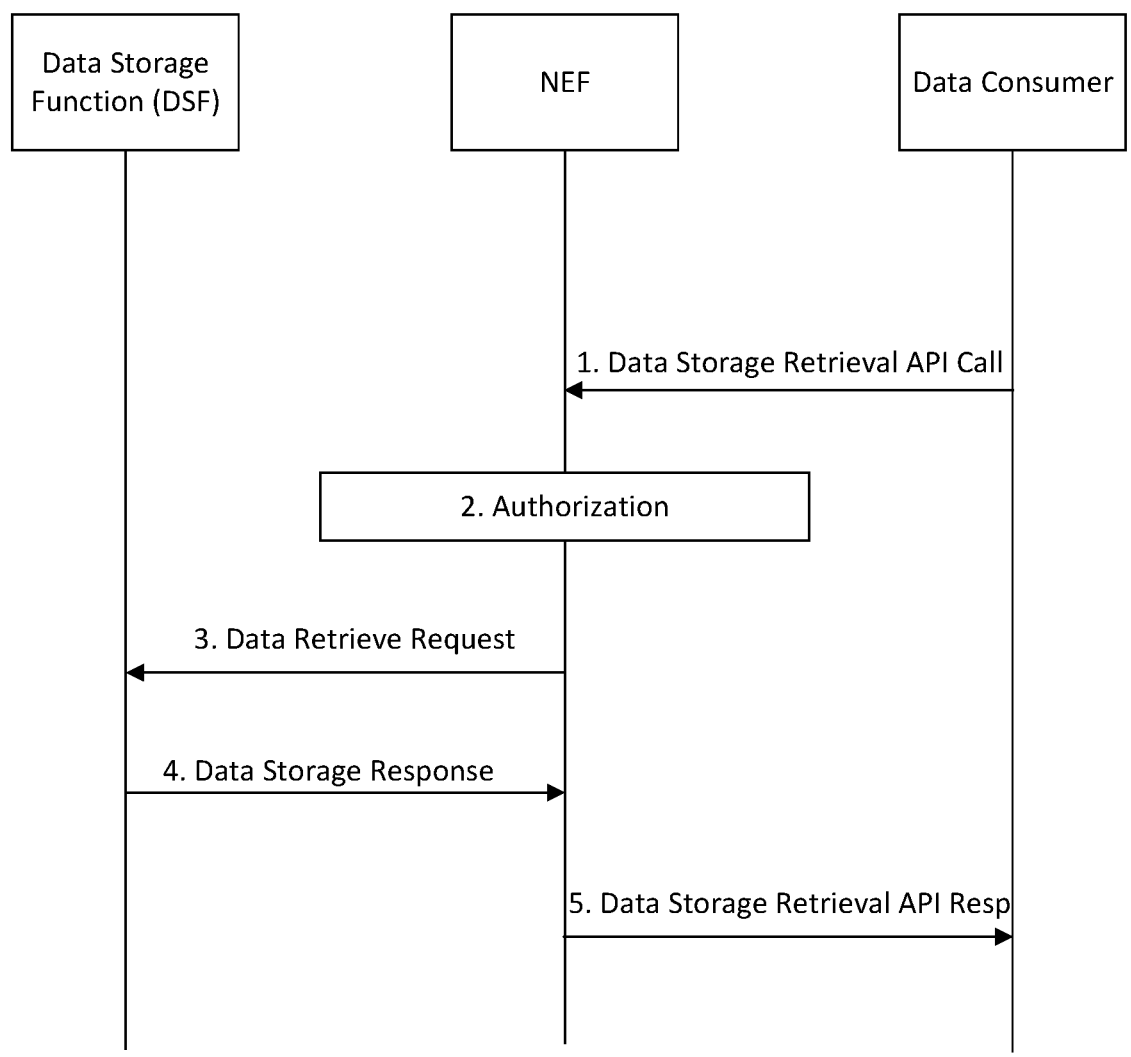
FIG. 24 illustrates an example call flow of a Data Consumer obtaining data from a DSF.

FIG. 24 illustrates an example call flow of a Data Consumer obtaining data from a DSF via the NEF.

At step 1, the Data Consumer may use the T8 interface to call a Data Storage Retrieval API. The API call may include the following information: a Data Consumer Identifier, which may identify the requestor; a Storage Location Identifier(s), which may be the Storage Location Identifier(s) that were obtained from the UE; Authorization Key(s), which may be the Authorization Key(s) that were obtained from the UE; a Response Address, which may be the address, or identity, that should receive the API response (i.e., where the data should be sent to); a Subscription Option, which may be an indication as to when the Data Consumer should be notified when the data changes; a UE Identifier, which may identify the UE that generated the requested data and provided the Storage Location Identifier(s) and Authorization Key(s); a Duration, which may be how long the Data Consumer may be willing to wait for a response, or which may be the duration of the subscription; a Data Consumer Reference Id; a Pre-processing option, which may be a simple pre-processing function requested to be provided by the DSF before providing the data (e.g., averaging, aggregation, and other pre-processing functions); and a Metadata option, which may indicate if additional metadata available at the DSF should be included, such as for example, a timestamp of data storage.

At step 2, the NEF may authorize the request by checking that the Data Consumer is authorized to read data from the data producer (UE). This step may require interaction with the AUSF or the UDM. This step may be performed by verifying that the UE identifier is associated with the Authorization Key(s) or the Storage Location Identifier(s) and that the Data Consumer is authorized to read data that was generated by the UE.

At step 3, the NEF may forward the request from step 1 to the DSF, along with an NEF Reference ID. The DSF may authorize the request by checking that the Data Consumer is authorized to retrieve data that was provided by the UE that generated the data. If the subscription option is selected, the DSF may store an indication that there is now a subscription associated with the data and may set a timer equal to the provided duration. The subscription may be deleted upon expiration of the timer. The DSF may use a combination of the Storage Location Identifier(s) and UE Identifier to locate and retrieve the stored data. The DSF may use the Authorization Key(s) to decrypt the stored data.

At step 4, the DSF may respond to the NEF with the requested data and the NEF Reference ID. If the subscription option was asserted, then this step may occur each time the data is updated. The DSF may need to format the data according to the media or MIME type requested by the Data Consumer.

At step 5, the NEF may respond to the Data Consumer with the requested Data and the Data Consumer Reference ID. If the subscription option was asserted, then this step may occur each time updated data is received from the DSF.

The DSF may maintain a record about which Data Consumer accesses which data and at what time data was accessed. Such information may be stored in a charging data recorded. This information may also be provided to the UE so that may determine what data is being accessed. For example, after observing that certain measurements are never read, the UE may stop generating the measurements or reduce the frequency at which the measurements are generated. The UE may request the access records during registration, when sending data, or when a PDU session is established.

Figure 25:
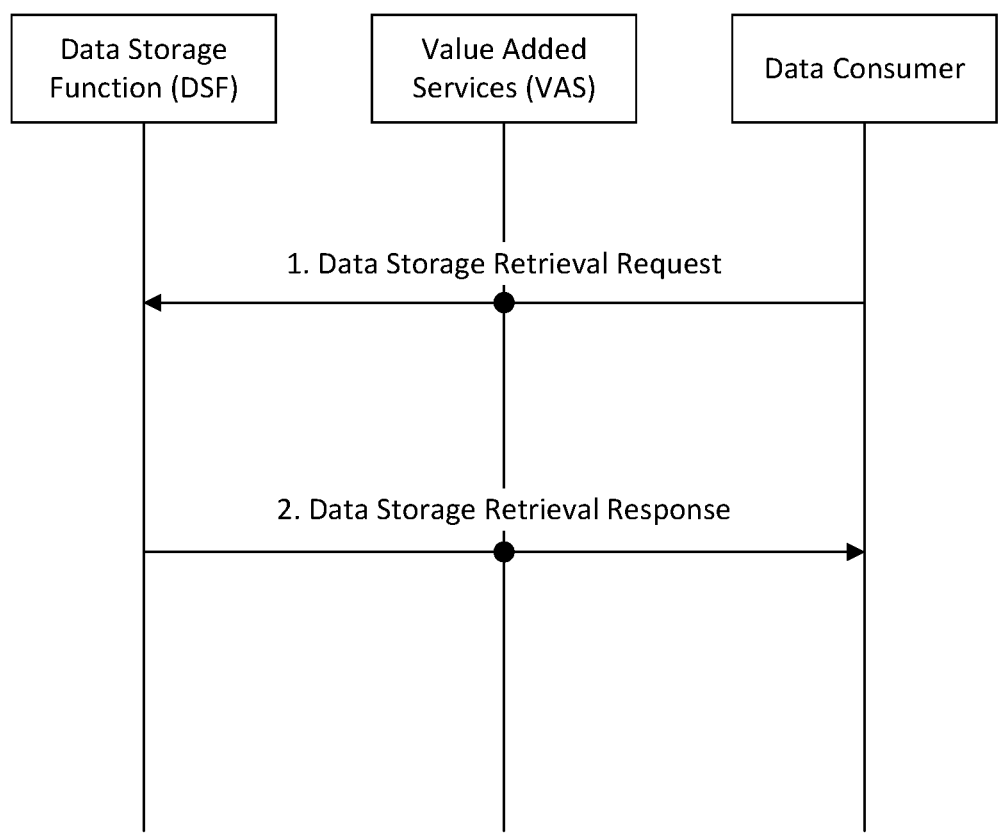
FIG. 25 illustrates another example call flow of a Data Consumer obtaining data from a DSF.

FIG. 25 illustrates an example call flow of how a Data Consumer may obtain data from the storage function via the NEF. This flow corresponds to Data Fetch Path Option 2 in FIG. 18.

At step 1, the Data Consumer may send a request to fetch the data. The request may be a RESTful GET request addressing a resource. The resource name may have been obtained from the UE and may be the Storage Location Identifier. The request may be bound to a RESTful protocol such as HTTP or CoAP and may specify a certain media or MIME type to format the message. The following information may be included in the request: a Data Consumer Identifier, which may identify the requestor; a Storage Location Identifier(s), which may be the Storage Location Identifier(s) that were obtained from the UE; Authorization Key(s), which may be the Authorization Key(s) that were obtained from the UE; a Response Address, which may be the address, or identity, that should receive the API response (i.e., where the data should be sent to); a Subscription Option, which may be an indication as to when the Data Consumer should be notified when the data changes; a UE Identifier, which may identify the UE that generated the requested data and provided the Storage Location Identifier(s) and Authorization Key(s); a Duration, which may be how long the Data Consumer may be willing to wait for a response, or which may be the duration of the subscription; a Data Consumer Reference Id; and a Pre-processing option, which may indicate value added services to be used.

The network operator may have value added services deployed in the SGi-LAN that may process the request from the Data Consumer. For example, the request may be routed to specific value added service(s) based on the sender address, recipient address, or the content of the request. In another example, a security VAS may authenticate the Data Consumer and check that the Data Consumer is authorized to access the addressed data. A security VAS may also decrypt an encrypted request from the Data Consumer. In yet another example, if the request includes an indication that the Data Consumer would like to subscribe to the data, a VAS may configure the subscription, its associated duration, and the response address in a data base. In an additional example, if the request indicates that additional pre-processing is requested, the VAS may provide data pre-processing, e.g., aggregation, averaging, and other pre-processing functions.

At step 2, the DSF may receive the request, retrieve the data and respond to the NEF with the requested data and the NEF Reference ID. It should be appreciated that the DSF may perform the functions that were described as being performed by the VASs in step 1. The DSF may use a combination of the Storage Location Identifier(s) and UE Identifier to locate and retrieve the stored data. The DSF may use the Authorization Key(s) to decrypt the stored data. If the subscription option was asserted, this step may occur each time updated data is received from the DSF.

The network operator may have value added services deployed in the SGi-LAN that process the request from the Data Consumer. For example, the response may be routed to specific value added service(s) based on the sender address, recipient address, or the content of the request. In another example, a security VAS may encrypt the response to the Data Consumer. In yet another example, a VAS may be called to format the data according to the media or MIME type provided by the Data Consumer. As stated above, the DSF may perform any of the functions that are described as being performed by a VAS.

It should be appreciated that a UE hosted application may use the procedures associated with FIGS. 24 and 25, above. For example, the UE hosted application may subscribe to events such as the application's data being updated by other producers or the application's data being consumed.

The Data Storage Function may expose an interface that allows users to manage the stored data. For example, a subscriber may own devices that store data in DSFs. An MNO may provide an interface, such as a console or GUI, that allows the subscriber to log in and manage (e.g., view, delete, download, change, manipulate, or add to) the stored data.

Such an interface may be exposed to the Data Consumer via APIs on the T8 interface, as shown in FIG. 18, or via a separate set of APIs that are exposed via a GUI or management console. The interface may allow a subscriber to log in and view the data that has been stored in the DSF. When the user logs in, the user may be required to provide a user name, a password, a device identifier, and a slice identifier. The slice identifier may be used by the network to locate the DSF. For example, a set of DSFs may be allocated to a slice. The slice identifier may be used to locate the set of DSFs, and then the device identifier may be used to locate the particular DSF within the slice where the data is stored. Once the subscriber is logged into the system, the interface may also allow the subscriber to indicate what servers (AS/SCS) are permitted to access the storage data. The system may also allow the subscriber to indicate if other UEs are permitted to access the stored data. For each consumer that is permitted to access the data, the subscriber may provide a charging identifier, or reference identifier, that the system may store in charging records. The reference identifier could be used to correlate the charging records of the MNO with the charging records of the subscriber/service provider.

Figure 26:
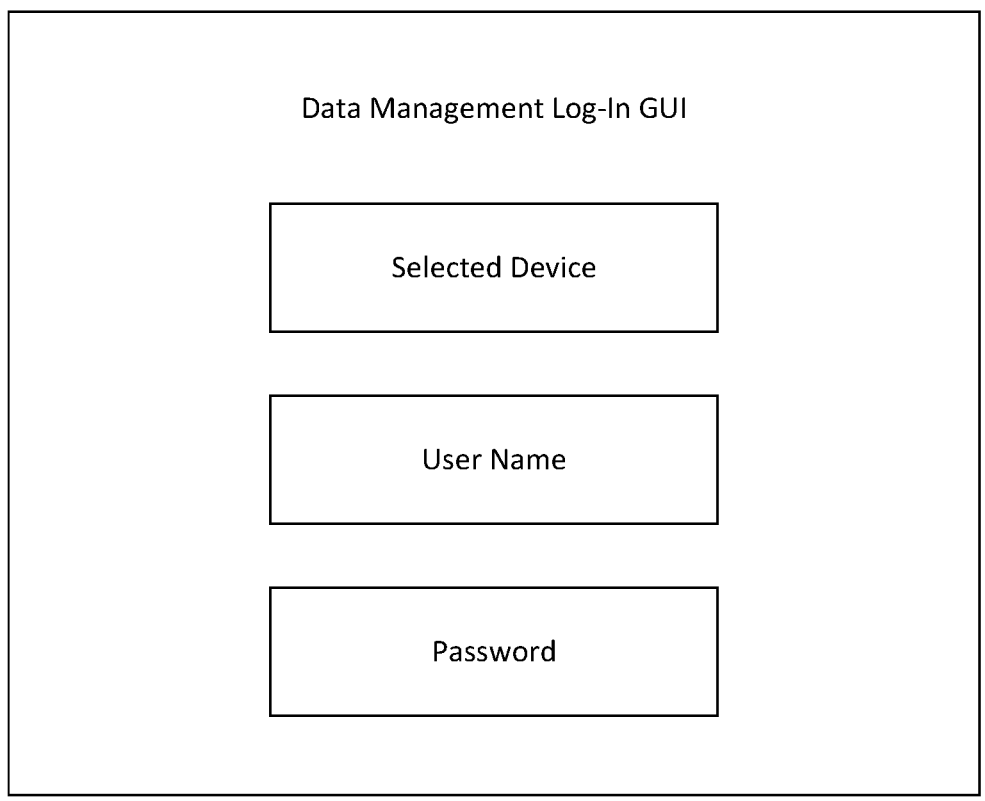
FIG. 26 illustrates an example graphical user interface.

FIG. 26 illustrates an example of a Data Management Log-In GUI. Such a GUI may be displayed by an MNO to a customer who has devices connected to the MNO's network. For example, the GUI may be displayed when the customer logs in to manage the data that is generated by the user's devices. The customer's connection to the network may be made via the T8 interface, through a separate interface that terminates at the NEF. However, the purpose of the interface may be to log in and manage data that is stored in the DSF. The selected device text input box of the GUI may be used to enter a device identifier. For example, the device identifier may be an External ID, an IMSI, or a SUPI. The user name and password fields may be used to enter the user's user name and password, respectively. The example user interface of FIG. 26 may be displayed on a display, such as for example, the display 128 of FIG. 29 or the display 86 of FIG. 34.

Figure 27:
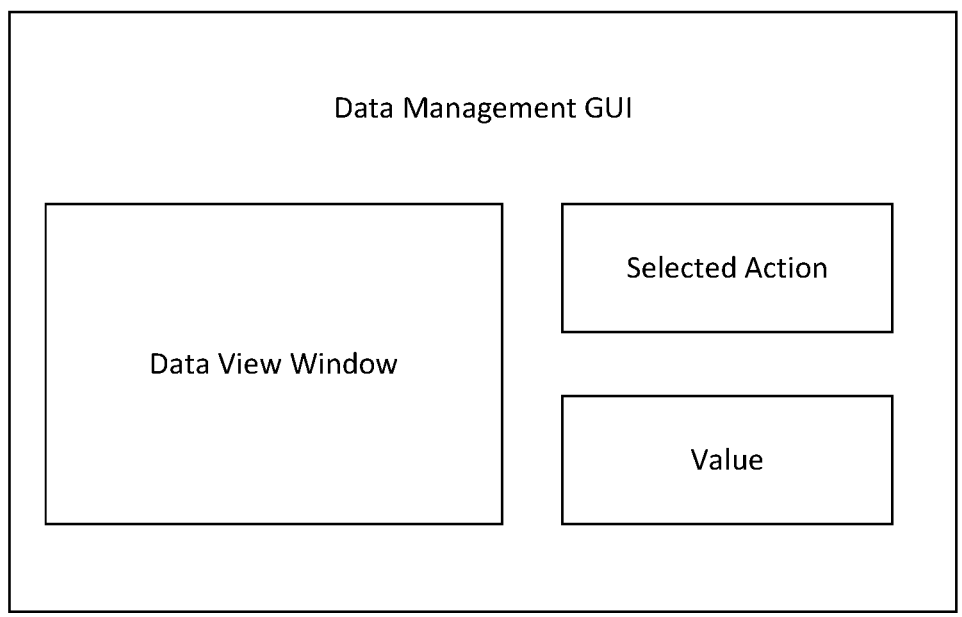
FIG. 27 illustrates another example graphical user interface.

FIG. 27 illustrates an example of a Data Management GUI that may be displayed to a user after log-in. The Data Management GUI may include a Data View Window that displays the data, which was generated by the UE and stored in the DSF, to the user. The display may also display additional metadata associated with the data, such as a date and time of generation, a location of the UE when the data was generated, and other relevant information. A drop-down box may also be included to allow the user to select actions to perform on the data. For example, the selected action drop down box may allow the user to select actions such as delete, over-write, or download. When download is selected, a new window may pop up that may request the user enter a file name. Data that is stored in the DSF may then be downloaded to the selected file name. The download may include all data that was generated by the UE, or the user may limit the download to include values that were generated in a certain time range, or the user may select the desired values in the display window. The example user interface of FIG. 27 may be displayed on a display, such as for example, the display 128 of FIG. 29 or the display 86 of FIG. 34.

It is understood that the entities performing the steps illustrated in FIGS. 18-25, such as the UE, AMF, UPF, NEF, DN, VAS, PCF, AUSF, UDM, DN, NF, RAN, DSF, Data Consumer, and the like, may be logical entities that may be implemented in the form of software (i.e., computer-executable instructions) stored in a memory of, and executing on a processor of, an apparatus configured for wireless and/or network communications or a computer system such as those illustrated in FIG. 29 or FIG. 34. That is, the method(s) illustrated in FIGS. 18-25 may be implemented in the form of software (i.e., computer-executable instructions) stored in a memory of an apparatus, such as the apparatus or computer system illustrated in FIG. 29 or FIG. 34, which computer executable instructions, when executed by a processor of the apparatus, perform the steps illustrated in FIGS. 18-25. It is also understood that the functionality illustrated in FIGS. 18-25 may implemented as a set of virtualized network functions. The network functions may not necessarily communicate directly, rather, they may communicate via forwarding or routing function. It is also understood that any transmitting and receiving steps illustrated in FIGS. 18-25 may be performed by communication circuitry of the apparatus under control of the processor of the apparatus and the computer-executable instructions (e.g., software) that it executes.

The 3rd Generation Partnership Project (3GPP) develops technical standards for cellular telecommunications network technologies, including radio access, the core transport network, and service capabilities—including work on codecs, security, and quality of service. Recent radio access technology (RAT) standards include WCDMA (commonly referred as 3G), LTE (commonly referred as 4G), and LTE-Advanced standards. 3GPP has begun working on the standardization of next generation cellular technology, called New Radio (NR), which is also referred to as "5G." 3GPP NR standards development is expected to include the definition of next generation radio access technology (new RAT), which is expected to include the provision of new flexible radio access below 6 GHz, and the provision of new ultra-mobile broadband radio access above 6 GHz. The flexible radio access is expected to consist of a new, non-backwards compatible radio access in new spectrum below 6 GHz, and it is expected to include different operating modes that can be multiplexed together in the same spectrum to address a broad set of 3GPP NR use cases with diverging requirements. The ultra-mobile broadband is expected to include cmWave and mmWave spectrum that will provide the opportunity for ultra-mobile broadband access for, e.g., indoor applications and hotspots. In particular, the ultra-mobile broadband is expected to share a common design framework with the flexible radio access below 6 GHz, with cmWave and mmWave specific design optimizations.

3GPP has identified a variety of use cases that NR is expected to support, resulting in a wide variety of user experience requirements for data rate, latency, and mobility. The use cases include the following general categories: enhanced mobile broadband (e.g., broadband access in dense areas, indoor ultra-high broadband access, broadband access in a crowd, 50+ Mbps everywhere, ultra-low cost broadband access, mobile broadband in vehicles), critical communications, massive machine type communications, network operation (e.g., network slicing, routing, migration and interworking, energy savings), and enhanced vehicle-to-everything (eV2X) communications. Specific service and applications in these categories include, e.g., monitoring and sensor networks, device remote controlling, bi-directional remote controlling, personal cloud computing, video streaming, wireless cloud-based office, first responder connectivity, automotive recall, disaster alerts, real-time gaming, multi-person video calls, autonomous driving, augmented reality, tactile internet, and virtual reality to name a few. All of these use cases and others are contemplated herein.

Figure 28:
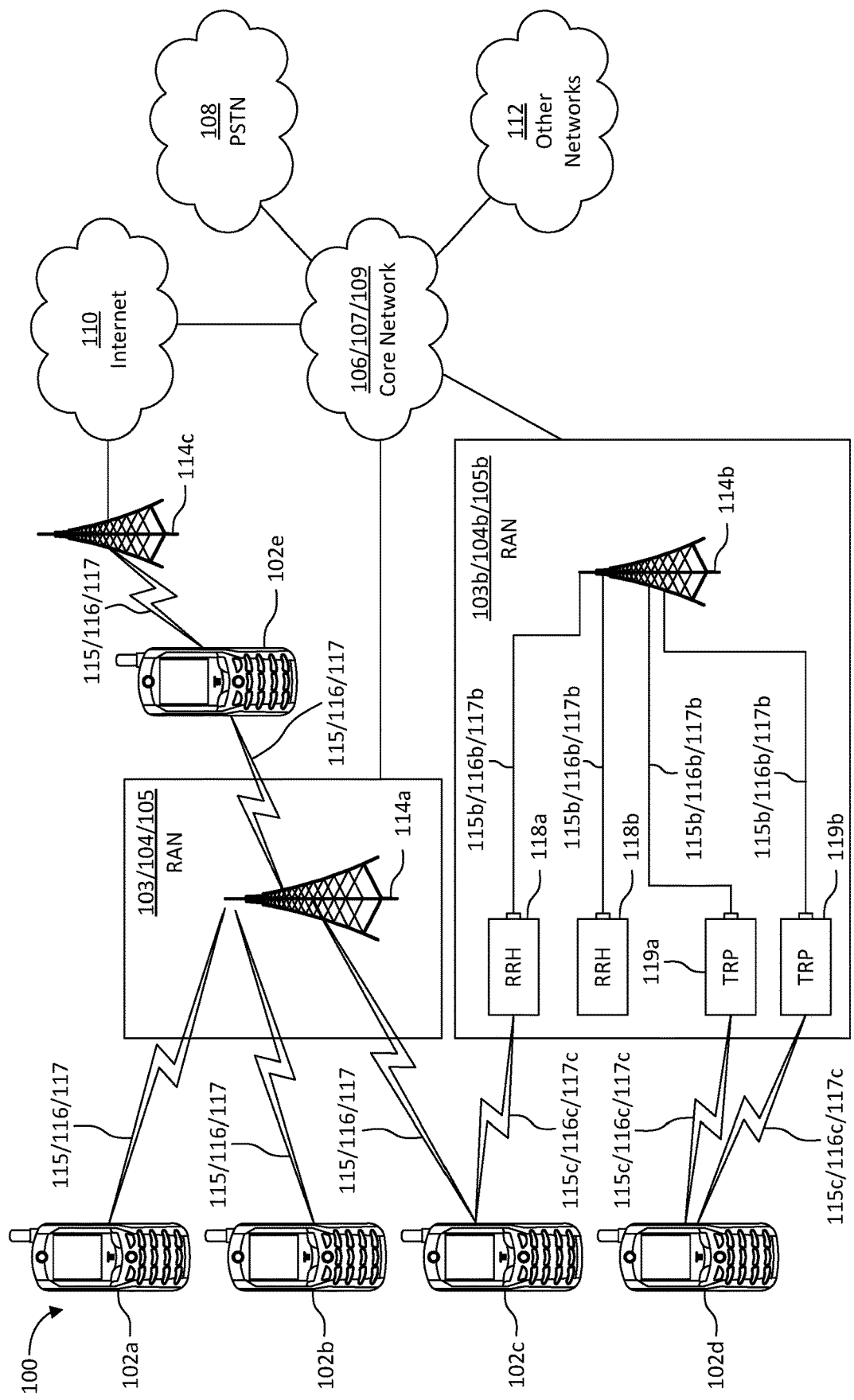
FIG. 28 illustrates an example communications system.

FIG. 28 illustrates one embodiment of an example communications system 100 in which the methods and apparatuses described and claimed herein may be embodied. As shown, the example communications system 100 may include wireless transmit/receive units (WTRUs) 102a, 102b, 102c, and/or 102d (which generally or collectively may be referred to as WTRU 102), a radio access network (RAN) 103/104/105/103b/104b/105b, a core network 106/107/109, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d, 102e may be any type of apparatus or device configured to operate and/or communicate in a wireless environment. Although each WTRU 102a, 102b, 102c, 102d, 102e is depicted in FIGS. 28-33 as a hand-held wireless communications apparatus, it is understood that with the wide variety of use cases contemplated for 5G wireless communications, each WTRU may comprise or be embodied in any type of apparatus or device configured to transmit and/or receive wireless signals, including, by way of example only, user equipment (UE), a mobile station, a fixed or mobile subscriber unit, a pager, a cellular telephone, a personal digital assistant (PDA), a smartphone, a laptop, a tablet, a netbook, a notebook computer, a personal computer, a wireless sensor, consumer electronics, a wearable device such as a smart watch or smart clothing, a medical or eHealth device, a robot, industrial equipment, a drone, a vehicle such as a car, truck, train, or airplane, and the like.

The communications system 100 may also include a base station 114a and a base station 114b. Base stations 114a may be any type of device configured to wirelessly interface with at least one of the WTRUs 102a, 102b, 102c to facilitate access to one or more communication networks, such as the core network 106/107/109, the Internet 110, and/or the other networks 112. Base stations 114b may be any type of device configured to wiredly and/or wirelessly interface with at least one of the RRHs (Remote Radio Heads) 118a, 118b and/or TRPs (Transmission and Reception Points) 119a, 119b to facilitate access to one or more communication networks, such as the core network 106/107/109, the Internet 110, and/or the other networks 112. RRHs 118a, 118b may be any type of device configured to wirelessly interface with at least one of the WTRU 102c, to facilitate access to one or more communication networks, such as the core network 106/107/109, the Internet 110, and/or the other networks 112. TRPs 119a, 119b may be any type of device configured to wirelessly interface with at least one of the WTRU 102d, to facilitate access to one or more communication networks, such as the core network 106/107/109, the Internet 110, and/or the other networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114b may be part of the RAN 103b/104b/105b, which may also include other base stations and/or network elements (not shown), such as a base station controller (BSC), a radio network controller (RNC), relay nodes, etc. The base station 114a may be configured to transmit and/or receive wireless signals within a particular geographic region, which may be referred to as a cell (not shown). The base station 114b may be configured to transmit and/or receive wired and/or wireless signals within a particular geographic region, which may be referred to as a cell (not shown). The cell may further be divided into cell sectors. For example, the cell associated with the base station 114a may be divided into three sectors. Thus, in an embodiment, the base station 114a may include three transceivers, e.g., one for each sector of the cell. In an embodiment, the base station 114a may employ multiple-input multiple output (MIMO) technology and, therefore, may utilize multiple transceivers for each sector of the cell.

The base stations 114a may communicate with one or more of the WTRUs 102a, 102b, 102c over an air interface 115/116/117, which may be any suitable wireless communication link (e.g., radio frequency (RF), microwave, infrared (IR), ultraviolet (UV), visible light, cmWave, mmWave, etc.). The air interface 115/116/117 may be established using any suitable radio access technology (RAT).

The base stations 114b may communicate with one or more of the RRHs 118a, 118b and/or TRPs 119a, 119b over a wired or air interface 115b/116b/117b, which may be any suitable wired (e.g., cable, optical fiber, etc.) or wireless communication link (e.g., radio frequency (RF), microwave, infrared (IR), ultraviolet (UV), visible light, cmWave, mmWave, etc.). The air interface 115b/116b/117b may be established using any suitable radio access technology (RAT).

The RRHs 118a, 118b and/or TRPs 119a, 119b may communicate with one or more of the WTRUs 102c, 102d over an air interface 115c/116c/117c, which may be any suitable wireless communication link (e.g., radio frequency (RF), microwave, infrared (IR), ultraviolet (UV), visible light, cmWave, mmWave, etc.). The air interface 115c/116c/117c may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c, or RRHs 118a, 118b and TRPs 119a, 119b in the RAN 103b/104b/105b and the WTRUs 102c, 102d, may implement a radio technology such as Universal Mobile Telecommunications System (UNITS) Terrestrial Radio Access (UTRA), which may establish the air interface 115/116/117 or 115c/116c/117c respectively using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In an embodiment, the base station 114a and the WTRUs 102a, 102b, 102c, or RRHs 118a, 118b and TRPs 119a, 119b in the RAN 103b/104b/105b and the WTRUs 102c, 102d, may implement a radio technology such as Evolved UMTS Terrestrial Radio Access (E-UTRA), which may establish the air interface 115/116/117 or 115c/116c/117c respectively using Long Term Evolution (LTE) and/or LTE-Advanced (LTE-A). In the future, the air interface 115/116/117 may implement 3GPP NR technology.

In an embodiment, the base station 114a in the RAN 103/104/105 and the WTRUs 102a, 102b, 102c, or RRHs 118a, 118b and TRPs 119a, 119b in the RAN 103b/104b/105b and the WTRUs 102c, 102d, may implement radio technologies such as IEEE 802.16 (e.g., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114c in FIG. 28 may be a wireless router, Home Node B, Home eNode B, or access point, for example, and may utilize any suitable RAT for facilitating wireless connectivity in a localized area, such as a place of business, a home, a vehicle, a campus, and the like. In an embodiment, the base station 114c and the WTRUs 102e, may implement a radio technology such as IEEE 802.11 to establish a wireless local area network (WLAN). In an embodiment, the base station 114c and the WTRUs 102d, may implement a radio technology such as IEEE 802.15 to establish a wireless personal area network (WPAN). In yet another embodiment, the base station 114c and the WTRUs 102e, may utilize a cellular-based RAT (e.g., WCDMA, CDMA2000, GSM, LTE, LTE-A, etc.) to establish a picocell or femtocell. As shown in FIG. 28, the base station 114b may have a direct connection to the Internet 110. Thus, the base station 114c may not be required to access the Internet 110 via the core network 106/107/109.

The RAN 103/104/105 and/or RAN 103b/104b/105b may be in communication with the core network 106/107/109, which may be any type of network configured to provide voice, data, applications, and/or voice over internet protocol (VoIP) services to one or more of the WTRUs 102a, 102b, 102c, 102d. For example, the core network 106/107/109 may provide call control, billing services, mobile location-based services, pre-paid calling, Internet connectivity, video distribution, etc., and/or perform high-level security functions, such as user authentication.

Although not shown in FIG. 28, it will be appreciated that the RAN 103/104/105 and/or RAN 103b/104b/105b and/or the core network 106/107/109 may be in direct or indirect communication with other RANs that employ the same RAT as the RAN 103/104/105 and/or RAN 103b/104b/105b or a different RAT. For example, in addition to being connected to the RAN 103/104/105 and/or RAN 103b/104b/105b, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d, 102e to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 and/or RAN 103b/104b/105b or a different RAT.

Some or all of the WTRUs 102a, 102b, 102c, 102d in the communications system 100 may include multi-mode capabilities, e.g., the WTRUs 102a, 102b, 102c, 102d, and 102e may include multiple transceivers for communicating with different wireless networks over different wireless links. For example, the WTRU 102e shown in FIG. 28 may be configured to communicate with the base station 114a, which may employ a cellular-based radio technology, and with the base station 114c, which may employ an IEEE 802 radio technology.

FIG. 29 is a block diagram of an example apparatus or device configured for wireless communications in accordance with the embodiments illustrated herein, such as for example, a WTRU 102. As shown in FIG. 29, the example WTRU 102 may include a processor 118, a transceiver 120, a transmit/receive element 122, a speaker/microphone 124, a keypad 126, a display/touchpad/indicators 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment. Also, embodiments contemplate that the base stations 114a and 114b, and/or the nodes that base stations 114a and 114b may represent, such as but not limited to, transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 29 and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 29 depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in an embodiment, the transmit/receive element 122 may be an antenna configured to transmit and/or receive RF signals. Although not shown in FIG. 28, it will be appreciated that the RAN 103/104/105 and/or the core network 106/107/109 may be in direct or indirect communication with other RANs that employ the same RAT as the RAN 103/104/105 or a different RAT. For example, in addition to being connected to the RAN 103/104/105, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 or a different RAT.

Some or all of the WTRUs 102a, 102b, 102c, 102d in the communications system 100 may include multi-mode capabilities, e.g., the WTRUs 102a, 102b, 102c, and 102d may include multiple transceivers for communicating with different wireless networks over different wireless links. For example, the WTRU 102c shown in FIG. 28 may be configured to communicate with the base station 114a, which may employ a cellular-based radio technology, and with the base station 114b, which may employ an IEEE 802 radio technology.

FIG. 29 is a block diagram of an example apparatus or device configured for wireless communications in accordance with the embodiments illustrated herein, such as for example, a WTRU 102. As shown in FIG. 29, the example WTRU 102 may include a processor 118, a transceiver 120, a transmit/receive element 122, a speaker/microphone 124, a keypad 126, a display/touchpad/indicators 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 29 and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 29 depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in an embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet an embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 29 as a single element, the WTRU 102 may include any number of transmit/receive elements 122. More specifically, the WTRU 102 may employ MIMO technology. Thus, in an embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad/indicators 128 (e.g., a liquid crystal display (LCD) display unit or organic light-emitting diode (OLED) display unit). The processor 118 may also output user data to the speaker/microphone 124, the keypad 126, and/or the display/touchpad/indicators 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In an embodiment, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries, solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include various sensors such as an accelerometer, biometrics (e.g., finger print) sensors, an e-compass, a satellite transceiver, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The WTRU 102 may be embodied in other apparatuses or devices, such as a sensor, consumer electronics, a wearable device such as a smart watch or smart clothing, a medical or eHealth device, a robot, industrial equipment, a drone, a vehicle such as a car, truck, train, or airplane. The WTRU 102 may connect to other components, modules, or systems of such apparatuses or devices via one or more interconnect interfaces, such as an interconnect interface that may comprise one of the peripherals 138.

Figure 30:
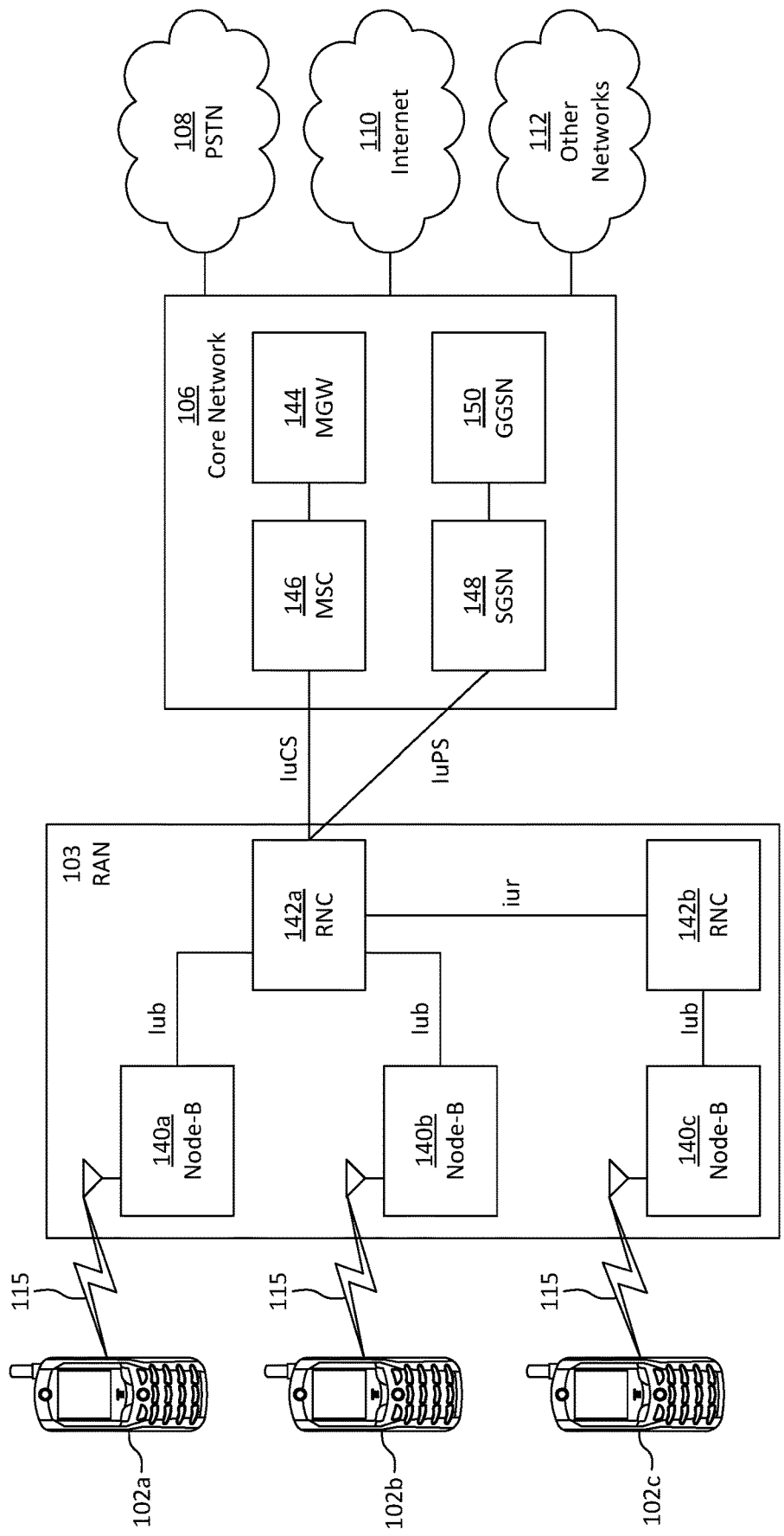
FIG. 30 is a system diagram of a first example radio access network (RAN) and core network.

FIG. 30 is a system diagram of the RAN 103 and the core network 106 according to an embodiment. As noted above, the RAN 103 may employ a UTRA radio technology to communicate with the WTRUs 102a, 102b, and 102c over the air interface 115. The RAN 103 may also be in communication with the core network 106. As shown in FIG. 30, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an embodiment.

As shown in FIG. 30, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macro-diversity, security functions, data encryption, and the like.

The core network 106 shown in FIG. 30 may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 31:
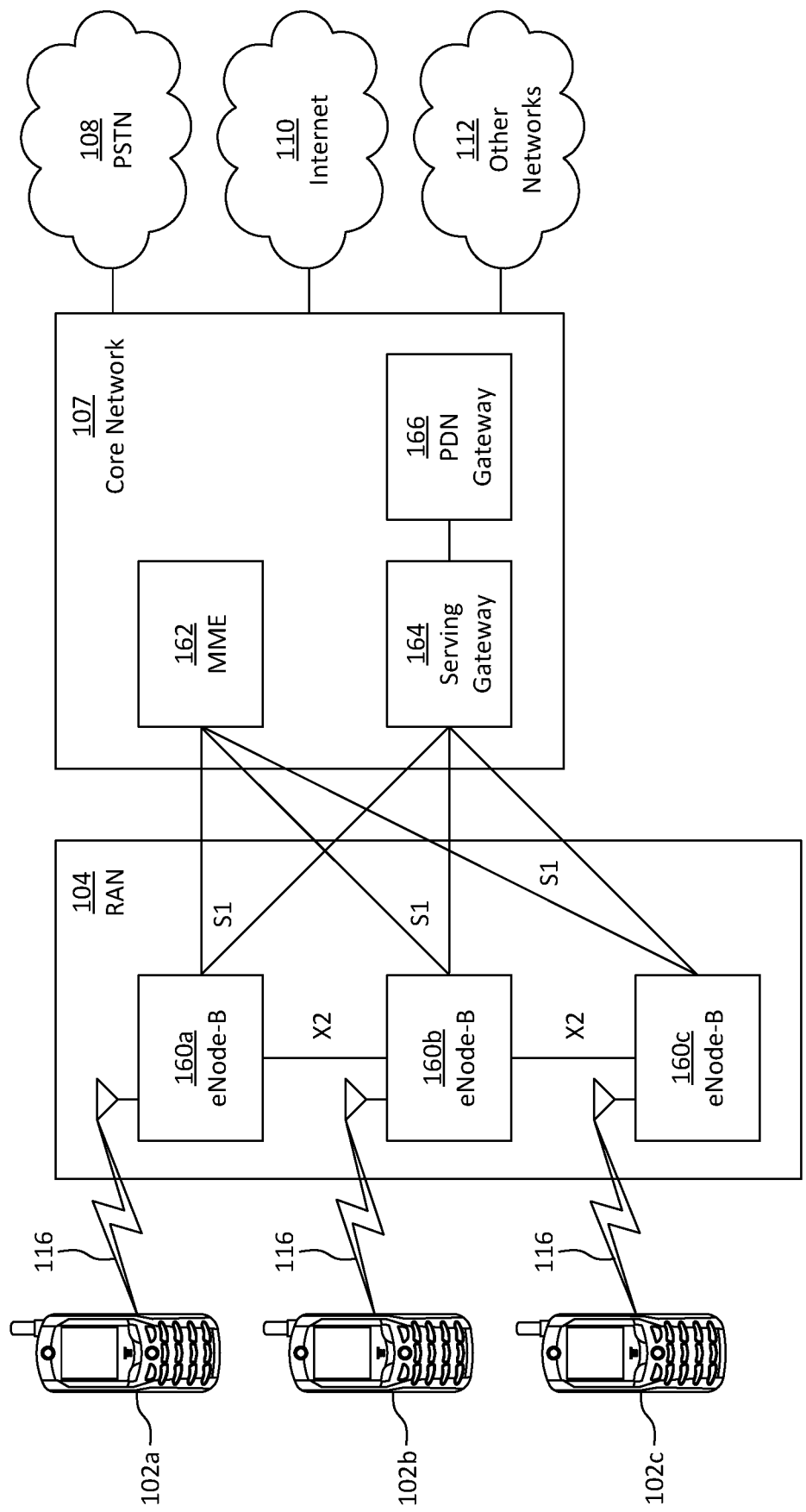
FIG. 31 is a system diagram of a second example RAN.

FIG. 31 is a system diagram of the RAN 104 and the core network 107 according to an embodiment. As noted above, the RAN 104 may employ an E-UTRA radio technology to communicate with the WTRUs 102a, 102b, and 102c over the air interface 116. The RAN 104 may also be in communication with the core network 107.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In an embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, and 160c may be associated with a particular cell (not shown) and may be configured to handle radio resource management decisions, handover decisions, scheduling of users in the uplink and/or downlink, and the like. As shown in FIG. 31, the eNode-Bs 160a, 160b, 160c may communicate with one another over an X2 interface.

The core network 107 shown in FIG. 31 may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, and 160c in the RAN 104 via an Si interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, and 160c in the RAN 104 via the Si interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 107 may facilitate communications with other networks. For example, the core network 107 may provide the WTRUs 102a, 102b, 102c with access to circuit-switched networks, such as the PSTN 108, to facilitate communications between the WTRUs 102a, 102b, 102c and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, 102c with access to the networks 112, which may include other wired or wireless networks that are owned and/or operated by other service providers.

Figure 32:
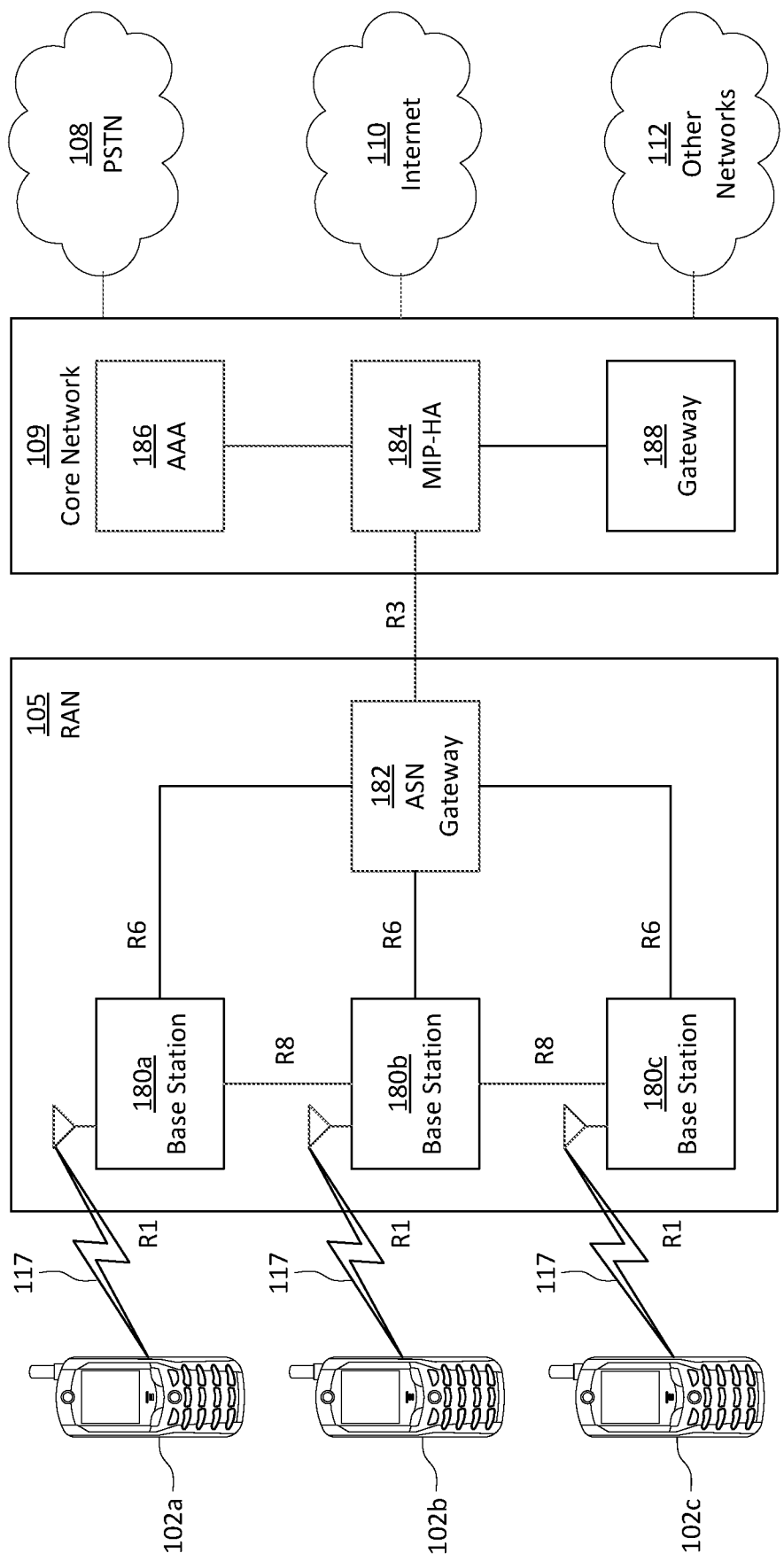
FIG. 32 is a system diagram of a third example radio access network RAN.

FIG. 32 is a system diagram of the RAN 105 and the core network 109 according to an embodiment. The RAN 105 may be an access service network (ASN) that employs IEEE 802.16 radio technology to communicate with the WTRUs 102a, 102b, and 102c over the air interface 117. As will be further discussed below, the communication links between the different functional entities of the WTRUs 102a, 102b, 102c, the RAN 105, and the core network 109 may be defined as reference points.

As shown in FIG. 32, the RAN 105 may include base stations 180a, 180b, 180c, and an ASN gateway 182, though it will be appreciated that the RAN 105 may include any number of base stations and ASN gateways while remaining consistent with an embodiment. The base stations 180a, 180b, 180c may each be associated with a particular cell in the RAN 105 and may include one or more transceivers for communicating with the WTRUs 102a, 102b, 102c over the air interface 117. In an embodiment, the base stations 180a, 180b, 180c may implement MIMO technology. Thus, the base station 180a, for example, may use multiple antennas to transmit wireless signals to, and receive wireless signals from, the WTRU 102a. The base stations 180a, 180b, 180c may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, 102c and the RAN 105 may be defined as an R1 reference point that implements the IEEE 802.16 specification. In addition, each of the WTRUs 102a, 102b, and 102c may establish a logical interface (not shown) with the core network 109. The logical interface between the WTRUs 102a, 102b, 102c and the core network 109 may be defined as an R2 reference point, which may be used for authentication, authorization, IP host configuration management, and/or mobility management.

The communication link between each of the base stations 180a, 180b, and 180c may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, 102c.

As shown in FIG. 32, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102a, 102b, and 102c to roam between different ASNs and/or different core networks. The MIP-HA 184 may provide the WTRUs 102a, 102b, 102c with access to packet-switched networks, such as the Internet 110, to facilitate communications between the WTRUs 102a, 102b, 102c and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b, 102c and traditional land-line communications devices. In addition, the gateway 188 may provide the WTRUs 102a, 102b, 102c with access to the networks 112, which may include other wired or wireless networks that are owned and/or operated by other service providers.

Although not shown in FIG. 32, it will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102a, 102b, 102c between the RAN 105 and the other ASNs. The communication link between the core network 109 and the other core networks may be defined as an R5 reference, which may include protocols for facilitating interworking between home core networks and visited core networks.

Figure 33:
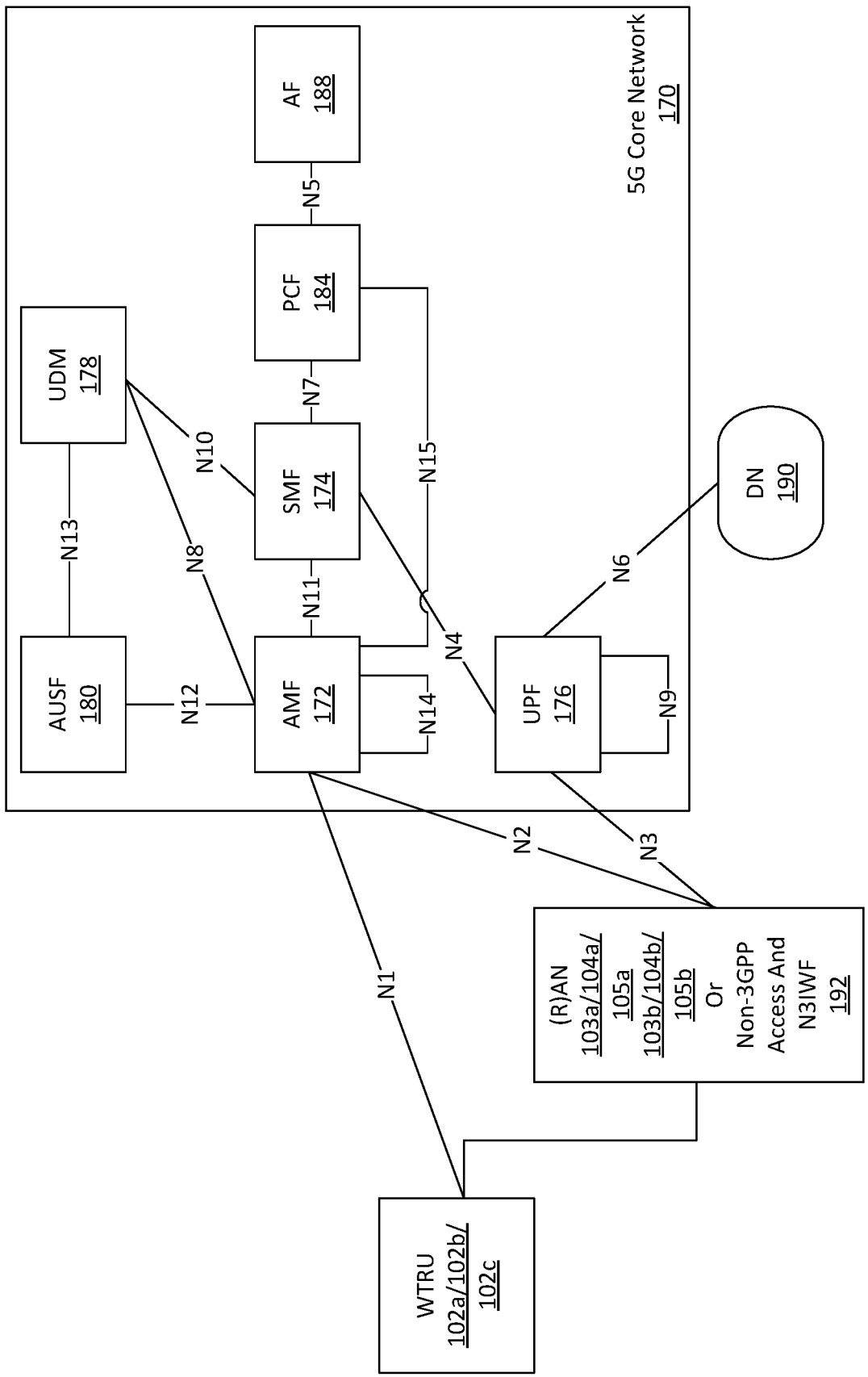
FIG. 33 is a system diagram of a fourth example radio access network RAN.

FIG. 33 shows another example of a 5G core network. The 5G core network 170 shown in FIG. 33 may include an access and mobility management function (AMF) 172, a session management function (SMF) 174, a user plane function (UPF) 176, a user data management function (UDM) 178, an authentication server function (AUSF) 180, a Network Exposure Function (NEF), a policy control function (PCF) 184, a non-3GPP interworking function (N3IWF) 192 and an application function (AF) 188. While each of the foregoing elements are depicted as part of the 5G core network 170, it will be appreciated that any one of these elements may be owned and/or operated by an entity other than the core network operator. It should also be appreciated that a 5G core network may not consist of all of these elements, may consist of additional elements, and may consist of multiple instances of each of these elements. FIG. 33 shows that network functions directly connect to one another, however, it should be appreciated that they may communicate via routing agents such as diameter routing agents or message buses.

The AMF 172 may be connected to each of the RAN 103/104/105/103b/104b/105b via an N2 interface and may serve as a control node. For example, the AMF 172 may be responsible for registration management, connection management, reachability management, access authentication, access authorization. The AMF 172 may generally route and forward NAS packets to/from the WTRUs 102a, 102b, 102c.

The SMF 174 may be connected to the AMF 172 via an N11 interface, may be connected to a PCF 184 via an N7 interface, and may be connected to the UPF 176 via an N4 interface. The SMF 174 may serve as a control node. For example, the SMF 174 may be responsible for Session Management, WTRUs 102a, 102b, 102c IP address allocation & management and configuration of traffic steering rules in the UPF 176, and generation of downlink data notifications.

The SMF 174 may also be connected to the UPF 176, which may provide the WTRUs 102a, 102b, 102c with access to a data network (DN) 190, such as the Internet 110, to facilitate communications between the WTRUs 102a, 102b, 102c and IP-enabled devices. The SMF 174 may manage and configure traffic steering rules in the UPF 176 via the N4 interface. The UPF 176 may be responsible for interconnecting a packet data unit (PDU) session with a data network, packet routing and forwarding, policy rule enforcement, quality of service handling for user plane traffic, and downlink packet buffering.

The AMF 172 may also be connected to the N3IWF 192 via an N2 interface. The N3IWF facilities a connection between the WTRUs 102a, 102b, 102c and the 5G core network 170 via radio interface technologies that are not defined by 3GPP.

The PCF 184 may be connected to the SMF 174 via an N7 interface, connected to the AMF 172 via an N15 interface, and connected to an application function (AF) 188 via an N5 interface. The PCF 184 may provide policy rules to control plane nodes such as the AMF 172 and SMF 174, allowing the control plane nodes to enforce these rules.

The UDM 178 acts as a repository for authentication credentials and subscription information. The UDM may connect to other functions such as the AMF 172, SMF 174, and AUSF 180.

The AUSF 180 performs authentication related operations and connects to the UDM 178 via an N13 interface and to the AMF 172 via an N12 interface.

The NEF exposes capabilities and services in the 5G core network 170. The NEF may connect to an AF 188 via an interface and it may connect to other control plane and user plane functions (180, 178, 172, 172, 184, 176, and N3IWF) in order to expose the capabilities and services of the 5G core network 170.

The 5G core network 170 may facilitate communications with other networks. For example, the core network 170 may include, or may communicate with, an IP gateway (e.g., an IP multimedia subsystem (IMS) server) that serves as an interface between the 5G core network 170 and the PSTN 108. For example, the core network 170 may include, or communicate with a short message service (SMS) service center that facilities communication via the short message service. For example, the 5G core network 170 may facilitate the exchange of non-IP data packets between the WTRUs 102a, 102b, 102c and servers. In addition, the core network 170 may provide the WTRUs 102a, 102b, 102c with access to the networks 112, which may include other wired or wireless networks that are owned and/or operated by other service providers.

The core network entities described herein and illustrated in FIGS. 9-16 and 18-25 are identified by the names given to those entities in certain existing 3GPP specifications, but it is understood that in the future those entities and functionalities may be identified by other names and certain entities or functions may be combined in future specifications published by 3GPP, including future 3GPP NR specifications. Thus, the particular network entities and functionalities described and illustrated in FIGS. 9-16 and 18-25 are provided by way of example only, and it is understood that the subject matter disclosed and claimed herein may be embodied or implemented in any similar communication system, whether presently defined or defined in the future.

FIG. 34 is a block diagram of an exemplary computing system 90 in which one or more apparatuses of the communications networks illustrated or described herein may be embodied, such as certain nodes or functional entities in the RAN 103/104/105, Core Network 106/107/109, PSTN 108, Internet 110, or Other Networks 112, including for example one or more of the entities illustrated in FIG. 9-16 or 18-25.

Computing system 90 may comprise a computer or server and may be controlled primarily by computer readable instructions, which may be in the form of software, wherever, or by whatever means such software is stored or accessed. Such computer readable instructions may be executed within a processor 91, to cause computing system 90 to do work. The processor 91 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 91 may perform signal coding, data processing, power control, input/output processing, and/or any other functionality that enables the computing system 90 to operate in a communications network. Coprocessor 81 is an optional processor, distinct from main processor 91, that may perform additional functions or assist processor 91. Processor 91 and/or coprocessor 81 may receive, generate, and process data related to the methods and apparatuses disclosed herein.

In operation, processor 91 fetches, decodes, and executes instructions, and transfers information to and from other resources via the computing system's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 can be read or changed by processor 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode can access only memory mapped by its own process virtual address space; it cannot access memory within another process's virtual address space unless memory sharing between the processes has been set up.

In addition, computing system 90 may contain peripherals controller 83 responsible for communicating instructions from processor 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. The visual output may be provided in the form of a graphical user interface (GUI).

Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain communication circuitry, such as for example a network adapter 97, that may be used to connect computing system 90 to an external communications network, such as the RAN 103/104/105, Core Network 106/107/109, PSTN 108, Internet 110, or Other Networks 112 of FIGS. 28-33, to enable the computing system 90 to communicate with other nodes or functional entities of those networks. The communication circuitry, alone or in combination with the processor 91, may be used to perform the transmitting and receiving steps of certain apparatuses, nodes, or functional entities described herein.

It is understood that any or all of the apparatuses, systems, methods and processes described herein may be embodied in the form of computer executable instructions (e.g., program code) stored on a computer-readable storage medium which instructions, when executed by a processor, such as processors 118 or 91, cause the processor to perform and/or implement the systems, methods and processes described herein. Specifically, any of the steps, operations or functions described herein may be implemented in the form of such computer executable instructions, executing on the processor of an apparatus or computing system configured for wireless and/or wired network communications. Computer readable storage media include volatile and nonvolatile, removable and non-removable media implemented in any non-transitory (e.g., tangible or physical) method or technology for storage of information, but such computer readable storage media do not includes signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which can be used to store the desired information and which can be accessed by a computing system.

The following is a list of acronyms relating to service level technologies that may appear in the above description. Unless otherwise specified, the definitions and acronyms used herein refer to the corresponding terms listed below.

AF Application Function
AMF Access and Mobility Management Function
API Application Protocol Interface
AS Application Server
CM Connection Management
CoAP Constrained Application Protocol
CP Control Plane
DN Data Network
DPI Deep Packet Inspection
DSF Data Storage Function
eMBB Enhanced Mobile Broadband
GGSN Gateway GPRS Support Node
HTTP Hypertext Transfer Protocol
IoT Internet of Things
MIoT Massive IoT
NAS Non Access Stratum
NAT Network Address Translation
NEF Network Exposure Function
NF Network Function
NSSAI Network Slice Selection Assistance Information
OTT Over the Top
PDN Packet Data Network
PDU Protocol Data Unit
P-GW PDN Gateway
RAN Radio Access Network
RM Registration Management
SCS Service Capability Server
SD Slice Differentiator
SDSF Structured Data Storage Function
SMF Session Management Function
S-NSSAI Single-NSSAI
SST Slice/Service Type
SUPI Subscriber Permanent Identifier
TCP Transmission Control Protocol
UDM User Data Management
UDSF Unstructured Data Storage Function
UE User Equipment
UPF User Plane Function
URLLC Ultra-Reliable Low Latency Communication
URI Uniform Resource Identifier
T8 The API Interface between the SCEF and an Application Server
VAS Value Added Service The illustrations of the aspects described herein are intended to provide a general understanding of the structure of the various aspects. The illustrations are not intended to serve as a complete description of all of the elements and features of apparatus and systems that utilize the structures or methods described herein. Many other aspects may be apparent to those of skill in the art upon reviewing the disclosure. Other aspects may be utilized and derived from the disclosure, such that structural and logical substitutions and changes may be made without departing from the scope of the disclosure. Accordingly, the disclosure and the figures are to be regarded as illustrative rather than restrictive.

The description of the aspects is provided to enable the making or use of the aspects. Various modifications to these aspects will be readily apparent, and the generic principles defined herein may be applied to other aspects without departing from the scope of the disclosure. Thus, the present disclosure is not intended to be limited to the aspects shown herein but is to be accorded the widest scope possible consistent with the principles and novel features as defined by the following claims.

What is claimed:

1. A first core network apparatus comprising a processor and a memory, the first core network apparatus being connected to a communications network, the first core network apparatus further including computer-executable instructions stored in the memory of the first core network apparatus which, when executed by the processor of the first core network apparatus, cause the first core network apparatus to perform operations comprising:

receiving, from a second core network apparatus, a second request to configure a network session for non-IP data delivery in the communications network, wherein the second request is transmitted in response to a first request, from a user equipment, to establish a session, the first request comprising a network exposure function (NEF) indication;

retrieving policy information about the non-IP data delivery and determining, based on the policy information, a path within the communications network for transferring the non-IP data;

selecting an anchor point within the communications network and assigning an identity for the session to be established, wherein the NEF is selected as the anchor based on the NEF indication;

sending a third request to the selected anchor point to establish the session along the determined path, wherein the third request comprises a first identity associated with the network session for non-IP data delivery, a second identity associated with the user equipment and indication about non-IP data; and sending, to the second core network apparatus, a second response indicating that the network session has been configured, wherein the second core network apparatus is configured to transmit a first response, to the user equipment, indicating that the session has been established.

2. The first core network apparatus recited in claim 1, wherein the second request to configure the network session is received from one of a user equipment (UE) or an application server (AS).

3. The first core network apparatus recited in claim 1, wherein the second request to configure the network session comprises a Non Access Stratum (NAS) message including one or more of an indication that the session is for the non-IP data, an identifier of a sender of the non-IP data, and an identifier of the destination of the non-IP data.

4. The first core network apparatus recited in claim 1, wherein the non-IP data comprises one of mobile originated (MO) or mobile terminated (MT) non-IP data.

5. The first core network apparatus recited in claim 1, wherein the policy information comprises source and destination IP address and port numbers.

6. The first core network apparatus recited in claim 1, wherein the determined path comprises one of (i) an access and mobility management function (AMF), the user plane function (UPF), and an application function (AF), or (ii) the access and mobility management function (AMF), the NEF, and the AF.

7. The first core network apparatus recited in claim 6, wherein the determined path further comprises a session management function (SMF).

8. The first core network apparatus recited in claim 1, wherein the computer-executable instructions, when executed by the processor of the first core network apparatus, further cause the first core network apparatus to transmit IP data via the established session.

9. A method for establishing a network session for non-IP data delivery in a communication network, comprising:

receiving, from a core network apparatus, a second request to configure the network session for non-IP data delivery in the communications network, wherein the second request is transmitted in response to a first request, from a user equipment, to establish the network session, the first request comprising a network exposure function (NEF) indication;

retrieving policy information about the non-IP data delivery and determining, based on the policy information, a path for transferring the non-IP data;

selecting an anchor point within the communications network and assigning an identity for the session to be established, wherein the NEF is selected as the anchor based on the NEF indication;

sending a third request to the selected anchor point to establish the session along the determined path, wherein the third request comprises a first identity associated with the network session for non-IP data delivery, a second identity associated with the user equipment and indication about non-IP data; and sending, to the core network apparatus, a second response indicating that the network session has been configured, wherein the core network apparatus is configured to transmit a first response, to the user equipment, indicating that the session has been established.

10. The method recited in claim 9, wherein the second request to configure the network session comprises a Non Access Stratum (NAS) message including one or more of an indication that the session is for the non-IP data, an identifier of a sender of the non-IP data, and an identifier of the destination of the non-IP data.

11. The method recited claim 9, wherein the determined path comprises one of (i) an access and mobility management function (AMF), the user plane function (UPF), and an application function (AF), or (ii) the access and mobility management function (AMF), the network exposure function (NEF), and the application function (AF).

12. The method recited in claim 11, wherein the determined path further comprises a session management function (SMF).

13. The method recited in claim 9, further comprising transmitting IP data via the established session.

14. A user equipment comprising a processor and a memory, the user equipment being connected to a communications network, the user equipment further including computer-executable instructions stored in the memory of the user equipment which, when executed by the processor of the user equipment, cause the user equipment to perform operations comprising:

transmitting, to a first core network apparatus, a first request to establish a session, the first request comprising a network exposure function (NEF) indication, wherein the first core network apparatus is configured to transmit a second request to configure a network session for non-IP data delivery in the communications network in response to the first request, wherein the first core network apparatus is configured to select the NEF as an anchor point within the communication network and send a third request to the selected NEF, the third request comprising a first identity associated with the network session for non-IP data delivery, a second identity associated with the user equipment, and indication about non-IP data; and receiving, from the second core network apparatus, a second response indicating that the session has been established, wherein the second core network apparatus is configured to transmit the second response in response to a first response, from a first core network apparatus, indicating that the network session has been configured.

* * * * *